US012799663B2

(12) United States Patent
Seo et al.

(10) Patent No.: US 12,799,663 B2
(45) Date of Patent: Nov. 17, 2026

(54) FILTER APPARATUS AND METHOD OF MANAGING THE SAME

(71) Applicant: SAMSUNG ELECTRONICS CO., LTD., Suwon-si (KR)

(72) Inventors: Dongpil Seo, Suwon-si (KR); Kanghyun Lee, Suwon-si (KR); Jaebok Lee, Suwon-si (KR); Youngjin Cho, Suwon-si (KR); Jaewan Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 429 days.

(21) Appl. No.: 18/368,073

(22) Filed: Sep. 14, 2023

(65) Prior Publication Data

US 2024/0165544 A1 May 23, 2024

Related U.S. Application Data

(63) Continuation of application No. PCT/KR2023/012626, filed on Aug. 25, 2023.

(30) Foreign Application Priority Data

Nov. 22, 2022 (KR) ........................ 10-2022-0157701
Jan. 11, 2023 (KR) ........................ 10-2023-0004333

(51) Int. Cl.
*D06F 39/10* (2006.01)
*B01D 29/62* (2006.01)
(Continued)

(52) U.S. Cl.
CPC ............. *D06F 39/10* (2013.01); *B01D 29/62* (2013.01); *B01D 35/143* (2013.01); *D06F 33/43* (2020.02);
(Continued)

(58) Field of Classification Search
CPC .......... D06F 33/43; D06F 33/47; D06F 34/04; D06F 34/05; D06F 39/083; D06F 39/10;
(Continued)

(56) References Cited

U.S. PATENT DOCUMENTS 9,631,311 B2 4/2017 Ha et al.
9,758,918 B2 9/2017 Hwang
(Continued)

FOREIGN PATENT DOCUMENTS

CN 111957095 A 11/2020
EP 3511628 A1 * 7/2019 .............. F24C 7/082
(Continued)

OTHER PUBLICATIONS

Machine translation of EP-3511628-A1 to Langhammer. (Year: 2019).*

(Continued)

*Primary Examiner* — Joseph L. Perrin
(74) *Attorney, Agent, or Firm* — STAAS & HALSEY LLP

(57) ABSTRACT

A method of managing a filter apparatus a filter apparatus positionable outside a washing machine and connectable to a drain device of the washing machine to filter water discharged from the washing machine, the method comprising: storing, by a server, information of the washing machine; registering, by the server, the filter apparatus in association with a user account based on receiving a registration request signal to register the filter apparatus; and transmitting, by the server, the information of the washing machine to the filter apparatus based on the filter apparatus being registered in association with the user account.

15 Claims, 41 Drawing Sheets

(51) Int. Cl.

| | |
|---|---|
| ***B01D 35/143*** | (2006.01) |
| ***D06F 33/43*** | (2020.01) |
| ***D06F 33/47*** | (2020.01) |
| ***D06F 34/04*** | (2020.01) |
| ***D06F 34/05*** | (2020.01) |
| ***D06F 39/08*** | (2006.01) |
| *D06F 103/14* | (2020.01) |
| *D06F 103/42* | (2020.01) |
| *D06F 105/34* | (2020.01) |
| *D06F 105/52* | (2020.01) |

(52) U.S. Cl.
CPC .............. *D06F 33/47* (2020.02); *D06F 34/04* (2020.02); *D06F 34/05* (2020.02); *D06F 39/083* (2013.01); *D06F 2103/14* (2020.02); *D06F 2103/42* (2020.02); *D06F 2105/34* (2020.02); *D06F 2105/52* (2020.02)

(58) Field of Classification Search
CPC ............. D06F 2103/14; D06F 2103/42; D06F 2105/34; D06F 2105/52; B01D 29/62; B01D 35/143
See application file for complete search history.

(56) References Cited

U.S. PATENT DOCUMENTS

| | | | | |
|---|---|---|---|---|
| 10,904,028 | B2 | 1/2021 | Jang et al. | |
| 11,368,824 | B2 | 6/2022 | Park | |
| 2006/0060512 | A1* | 3/2006 | Astle | C02F 9/20 210/90 |
| 2018/0202093 | A1 | 7/2018 | Park et al. | |
| 2020/0240066 | A1* | 7/2020 | Ko | D06F 34/32 |
| 2024/0052547 | A1 | 2/2024 | Lee et al. | |

FOREIGN PATENT DOCUMENTS

| | | | | |
|---|---|---|---|---|
| JP | 10-263277 | | 10/1998 | |
| JP | 2013-032500 | | 7/2013 | |
| JP | 6149251 | | 6/2017 | |
| JP | 6530349 | | 6/2019 | |
| JP | WO2020/054475 | | 3/2020 | |
| KR | 2003-0034646 | | 5/2003 | |
| KR | 10-0781137 | | 11/2007 | |
| KR | 10-2013-0013236 | | 2/2013 | |
| KR | 10-2014-0122109 | | 10/2014 | |
| KR | 10-1980039 | | 5/2019 | |
| KR | 10-2019-0134922 | | 12/2019 | |
| KR | 10-2020-0022405 | | 3/2020 | |
| KR | 10-2212754 | | 2/2021 | |
| KR | 10-2021-0104394 | | 8/2021 | |
| KR | 10-2022-0129872 | | 9/2022 | |
| KR | 10-2595074 | | 10/2023 | |
| WO | WO-2021165850 | A1 * | 8/2021 | B01D 33/805 |
| WO | WO 2024/034792 | A1 | 2/2024 | |

OTHER PUBLICATIONS

International Search Report dated Dec. 20, 2023 for corresponding application PCT/KR2023/012626.
Written Opinion dated Dec. 20, 2023 for corresponding application PCT/KR2023/012626.
Ho, Sally, "PlanetCare: How This Slovenian Startup's Laundry Machine Filter is Solving Microplastic Fibre Pollution," https://www.greenqueen.com.hk, Mar. 26, 2021.
Extended European Search Report issued Sep. 26, 2025 for Application No. 23894731.1.

* cited by examiner

FIG. 36

| WASHING MACHINE | ALGORITHM | | |
|---|---|---|---|
| A1 | DRAINAGE DETECTION -> ON | OPERATION RATE 100% | DRAINAGE STOP -> OFF |
| A2 | DRAINAGE DETECTION -> ON AFTER 10 SECONDS | OPERATION RATE 50% | DRAINAGE STOP -> OFF |
| A3 | DRAINAGE DETECTION -> ON AFTER 5 SECONDS | OPERATION RATE 30% | OFF AFTER 5 MINUTES OF DRAINAGE DETECTION |
| ⋮ | ⋮ | ⋮ | ⋮ |

FILTER APPARATUS AND METHOD OF MANAGING THE SAME

CROSS-REFERENCE TO RELATED APPLICATION

This application is a continuation application, under 35 U.S.C. § 111(a), of international application No. PCT/KR2023/012626, filed on Aug. 25, 2023, which claims priority under 35 U. S. C. § 119 to Korean Patent Application No. 10-2022-0157701, filed Nov. 22, 2022 and Korean Patent Application No. 10-2023-0004333, filed Jan. 11, 2023, the disclosures of which are incorporated herein by reference in their entireties.

BACKGROUND

1. Field

The disclosure relates to a filter apparatus connectable to a washing machine and a method of managing the same.

2. Description of the Related Art

A washing machine is an apparatus for washing laundry put inside of a tub through friction by stirring the laundry, water, and a detergent together by using a driving force of a driving motor.

Operations that are performed by the washing machine include, regardless of the type of the washing machine, a washing operation for washing laundry put into the tub by supplying a detergent and water to the tub and rotating the drum, a rinsing operation for rinsing the laundry by supplying water to the tub and rotating the drum, and a dehydrating operation for dehydrating water of the laundry by discharging water from the tub and rotating the drum.

The washing machine may include a drain device configured to discharge water stored in the tub to the outside of the washing machine while performing the washing operation, the rinsing operation, and/or the dehydrating operation.

The water discharged from the drain device contains pollutants (e.g., micro plastics), and it is required to filter out the pollutants to protect the environment.

SUMMARY

According to an aspect of the disclosure, there is provided a method of managing a filter apparatus positionable outside a washing machine and connectable to a drain device of the washing machine to filter water discharged from the washing machine, the method including: storing, by a server, information of the washing machine; registering, by the server, the filter apparatus in association with a user account based on receiving a registration request signal to register the filter apparatus; and transmitting, by the server, the information of the washing machine to the filter apparatus based on the filter apparatus being registered in association with the user account.

According to an aspect of the disclosure, there is provided a method of managing a filter apparatus positionable outside a washing machine and connectable to a drain device of the washing machine to filter water discharged from the washing machine, the method including: establishing a communication between the filter apparatus and the washing machine through a wired communication module or a short-distance communication module; transmitting, by the filter apparatus, information of the filter apparatus to the washing machine through the communication established with the filter apparatus by the washing machine; transmitting, by the washing machine, information of the washing machine to the filter apparatus; transmitting, by the washing machine, a registration request signal to register the filter apparatus including the information of the filter apparatus to a server; and registering, by the server, the filter apparatus in association with a user account based on receiving the registration request signal to register the filter apparatus.

According to an aspect of the disclosure, there is provided a filter apparatus positionable outside a washing machine and connectable to a drain device of the washing machine to filter water discharged from the washing machine, the filter apparatus including: a housing; a filter case, arrangeable inside the housing, and having an inlet and an outlet; a filter attachable to and detachable from the filter case; a filter cleaning device including a cleaning member configured to rotate while in contact with a surface of the filter through which foreign substances are filtered and a cleaning motor configured to rotate the cleaning member; and a circuitry located between the housing and the filter case and including a controller and a communicator, wherein the controller is configured to receive information of the washing machine from external devices through the communicator, and control an operation of the filter cleaning device based on the information of the washing machine.

The technical objectives of the disclosure are not limited to the above, and other objectives may become apparent to those of ordinary skill in the art based on the following description.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 36 illustrates an example of a lookup table for modifying an operation algorithm of a filter apparatus according to an embodiment.

DETAILED DESCRIPTION

Figure 1:
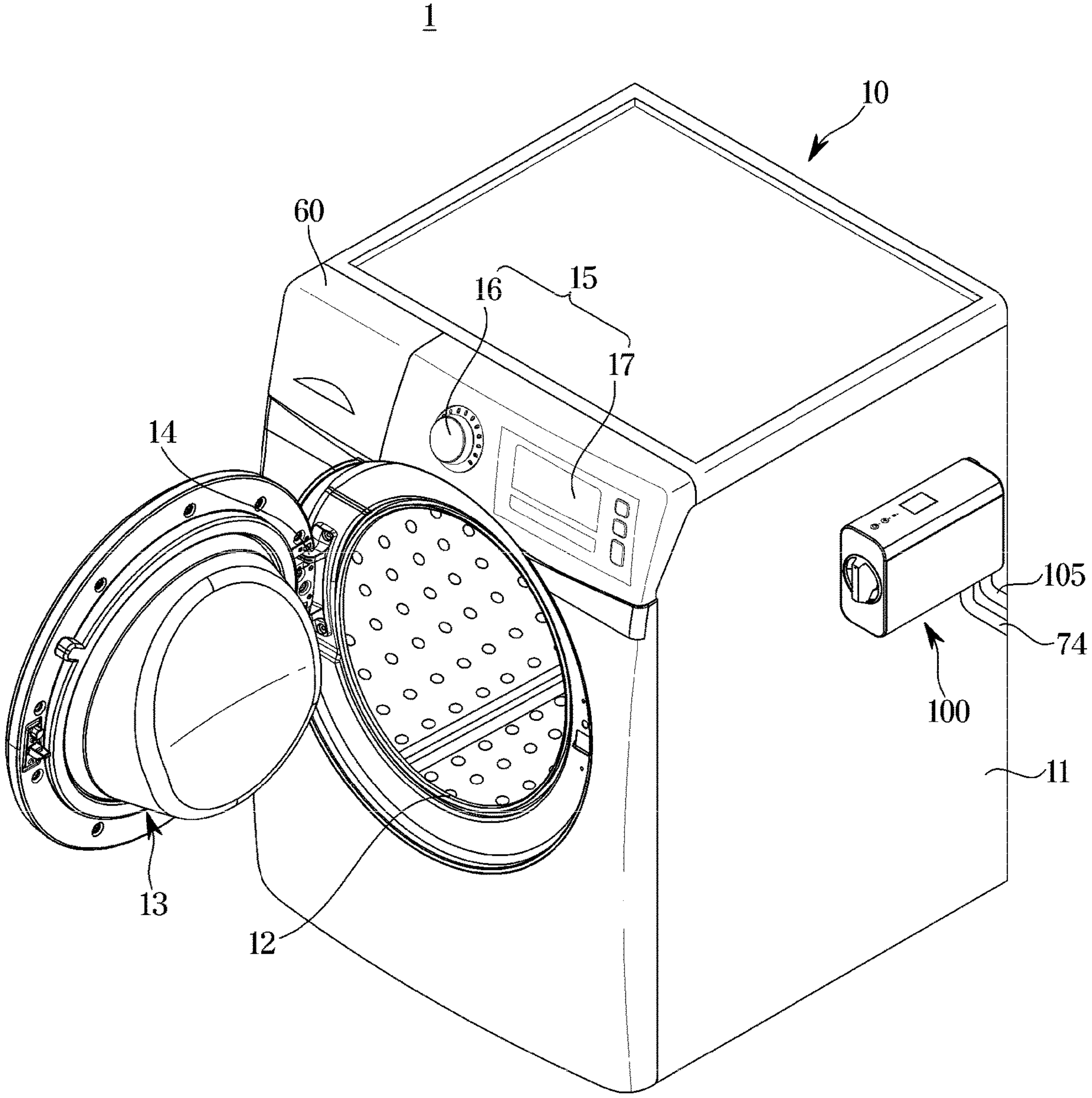
FIG. 1 illustrates a clothes treating apparatus according to an embodiment.

The embodiments described in the specification and the configurations shown in the drawings are only examples of preferred embodiments of the disclosure, and various modifications may be made at the time of filing of the disclosure to replace the embodiments and drawings of the specification.

The terms used herein are for the purpose of describing the embodiments and are not intended to restrict and/or to limit the disclosure.

For example, the singular expressions herein may include plural expressions, unless the context clearly dictates otherwise.

In the disclosure, a phrase such as "A or B," "at least one of A and B," "at least one of A or B," "A, B or C," "at least one of A, B and C," and "at least one of A, B, or C" may include any one of the items listed together in the corresponding phrase of the phrases, or any possible combination thereof.

The term "and/or" includes combinations of one or all of a plurality of associated listed items.

As used herein, such terms as "1st" and "2nd," or "first" and "second" may be used to simply distinguish a corresponding component from another, and does not limit the components in other aspect (for example, importance or order).

Terms, such as "first," "second," etc. are used to distinguish one element from another and do not modify the elements in other aspects (e.g., importance or sequence). When one (e.g., a first) element is referred to as being "coupled" or "connected" to another (e.g., a second) element with or without the term "functionally" or "communicatively," it means that the one element is connected to the other element directly, wirelessly, or via a third element.

It will be understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It is to be understood that if a certain component is referred to as being "coupled with," "coupled to," "supported on" or "in contact with" another component, it means that the component may be coupled with the other component directly or indirectly via a third component.

Throughout the specification, when a member is referred to as being “on” another member, the member is in contact with another member or yet another member is interposed between the two members.

The terms, such as “~ part”, “~device”, “~block”, “~member”, “~module”, and the like may refer to a unit for processing at least one function or act. For example, the terms may refer to at least process processed by at least one hardware, such as field-programmable gate array (FPGA)/application specific integrated circuit (ASIC), software stored in memories, or processors.

Therefore, it is an object of the disclosure to provide a filter apparatus that is easy to manage.

It is another object of the disclosure to provide a filter apparatus capable of communicating with an external device.

It is another object of the disclosure to provide a filter apparatus that allows a user to easily check the state thereof.

It is another object of the disclosure to provide a filter apparatus that is easily controlled by a user.

A washing machine, according to various embodiments, may perform washing, rinsing, draining, and dehydrating operations. A washing machine may also be a drying combination washing machine capable of performing a drying operation on the dehydrated laundry. A washing machine may be an example of a clothes treating apparatus. The clothes treating apparatus is a concept that includes a device for washing clothes (objects to be washed or dried), a device for drying clothes, and a device capable of washing and drying clothes.

The washing machine according to various embodiments of the disclosure may include a top-loading washing machine, wherein an inlet through which laundry is put into the top-loading washing machine is provided upward, or a front-loading washing machine, wherein an inlet through which laundry is put into the front-loading washing machine is provided forward. The washing machine according to various embodiments of the disclosure may include another loading type of washing machine, except for the top-loading washing machine and the front-loading washing machine.

The top-loading washing machine may wash laundry by using water streams generated by a rotating body such as a pulsator. The front-loading washing machine may wash laundry by rotating a drum to repeatedly raise and drop the laundry. The front-loading washing machine may include a lift for raising laundry. The front-loading washing machine may include a drying combination washing machine capable of drying laundry stored in a drum. The drying combination washing machine may include a heating device for high-temperature air. The drying combination washing machine may further include a condensing device for dry air. For example, the drying combination washing machine may include a heat pump. The washing machine according to various embodiments of the disclosure may include a washing machine using another washing method, except for a washing machine using the above-described washing method.

Hereinafter, a washing machine according to various embodiments of the disclosure will be described in detail with reference to the accompanying drawings.

Figure 2:
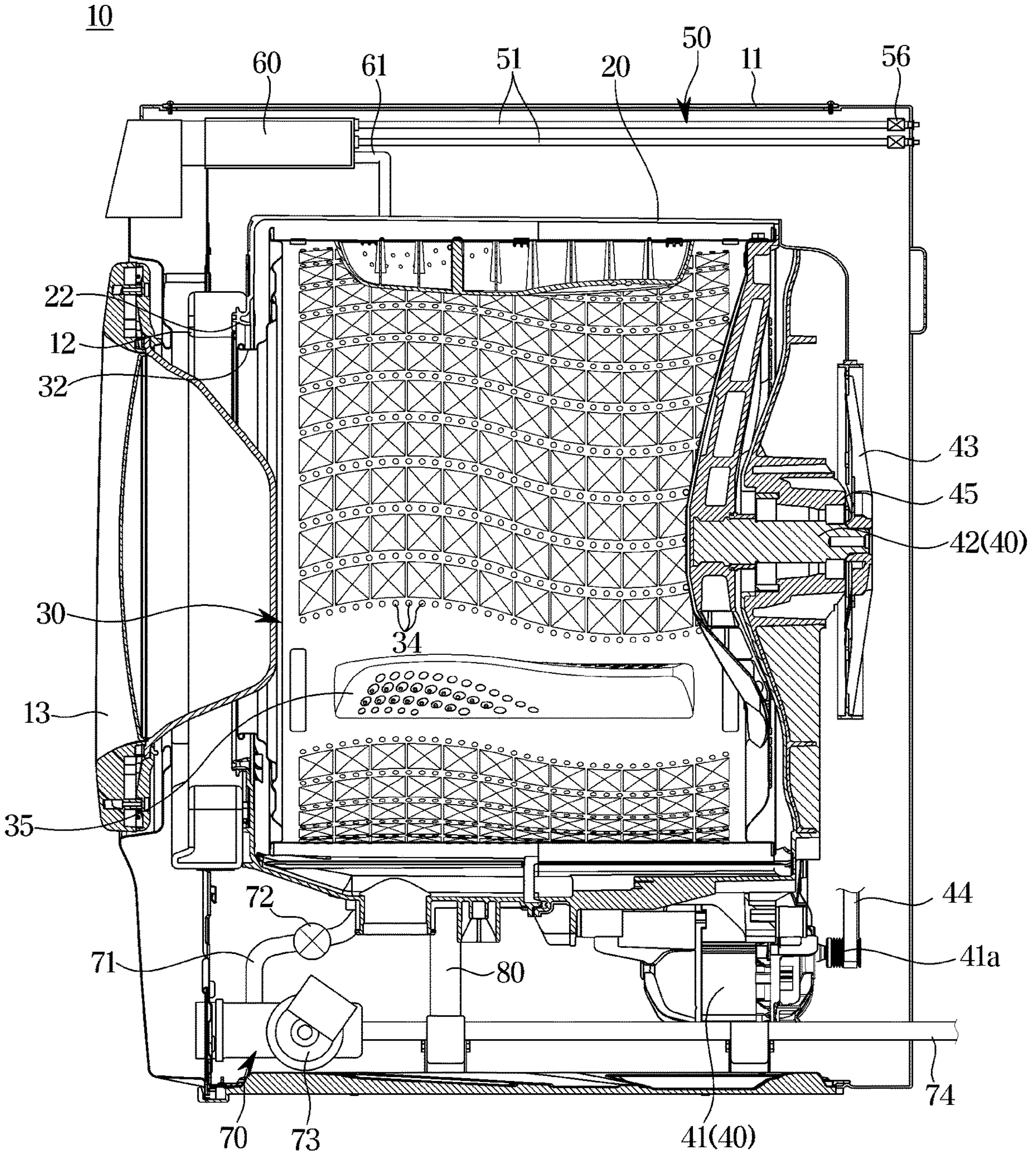
FIG. 2 illustrates a cross section of the washing machine shown in FIG. 1 according to an embodiment.

FIG. 1 illustrates a clothes treating apparatus according to an embodiment. FIG. 2 illustrates a cross section of the washing machine shown in FIG. 1.

Referring to FIGS. 1 and 2, a washing machine 10 of a clothes treating apparatus may include a washing machine housing 11 accommodating various components therein. The washing machine housing 11 may form an exterior of the washing machine 10. The washing machine housing 11 may have the shape of a box that is at least partially open.

The washing machine housing 11 may include a housing opening 12 for allowing an access to inside of a drum 30. The housing opening 12 may open approximately forward.

The washing machine 10 may include a door 13 for opening or closing the housing opening 12 provided in the washing machine housing 11. The door 13 may be rotatably mounted on the washing machine housing 11 by a hinge 14. At least one portion of the door 13 may be transparent or translucent to show the inside of the washing machine housing 11.

The washing machine 10 may include a tub 20 provided inside the washing machine housing 11 to store water. The tub 20 may be disposed inside the washing machine housing 11. The tub 20 may include a tub opening 22 provided to correspond to the housing opening 12. The tub opening 22 may open substantially forward. The tub 20 may be supported on an inner surface of the washing machine housing 11. The tub 20 may have a substantially cylindrical shape of which one side opens.

The tub 20 may be elastically supported from the washing machine housing 11 by a damper 80. The damper 80 may connect the tub 20 to the washing machine housing 11. While vibrations generated according to a rotation of the drum 30 are transferred to the tub 20 and/or the washing machine housing 11, the damper 80 may absorb vibration energy between the tub 20 and the washing machine housing 11 to attenuate the vibrations.

The washing machine 10 may include the drum 30 accommodating laundry. The drum 30 may be rotatably provided inside the tub 20. The drum 30 may perform washing, rinsing, and/or dehydrating while rotating inside the tub 20. The drum 30 may include a through hole 34 that connects an inside space of the drum 30 to an inside space of the tub 20. The drum 30 may have a substantially cylindrical shape of which one side opens. On an inner circumferential surface of the drum 30, at least one lifter 35 may be provided to raise and drop laundry according to a rotation of the drum 30.

The drum 30 may include a drum opening 32 corresponding to the housing opening 12 and the tub opening 22. Laundry may be put into or withdrawn from the drum 30 through the housing opening 12, the tub opening 22, and the drum opening 32.

The washing machine 10 may include a washing machine driving device 40 configured to rotate the drum 30. The washing machine driving device 40 may include a driving motor 41, and a rotating shaft 42 for transferring a driving force generated in the driving motor 41 to the drum 30. The rotating shaft 42 may penetrate the tub 20 and be connected to the drum 30.

The washing machine 10 may be divided into a direct drive type in which the rotating shaft 42 is directly connected to the driving motor 41 to rotate the drum 30, and an indirect drive type in which a pulley 43 is connected between the driving motor 41 and the rotating shaft 42 to drive the drum 30.

The washing machine 10 according to an embodiment may be arranged as an indirect drive type, but may also be arranged as a direct drive type, without being limited thereto.

One end of the rotating shaft 42 may be connected to the drum 30, and another end of the rotating shaft 42 may be connected to the pulley 43 to obtain a driving force from the driving motor 41. A motor pulley 41*a* may be formed on the rotating axis of the driving motor 41. A driving belt 44 is provided between the motor pulley 41*a* and the pulley 43 so that the rotating shaft 42 may be driven by the driving belt 44.

In the rear portion of the tub 20, a bearing housing 45 may be installed to rotatably support the rotating shaft 42. The bearing housing 45 may be made of an aluminum alloy and may be inserted into the rear portion of the tub 20 upon injection-molding of the tub 20.

The washing machine driving device 40 may be provided to perform washing, rinsing, and/or dehydration or drying operations by rotating the drum 30 regularly or reversely.

The washing machine 10 may include a water supply device 50. The water supply device 50 may supply water to the tub 20. The water supply device 50 may be located above the tub 20. The water supply device 50 may include a water supply pipe 51, and a water supply valve 56 provided in the water supply pipe 51. The water supply pipe 51 may be connected to an external water supply source. The water supply pipe 51 may extend to a detergent supply device 60 and/or the tub 20 from the external water supply source. Water may be supplied to the tub 20 via the detergent supply device 60. Water may be supplied to the tub 20 not via the detergent supply device 60.

The water supply valve 56 may open or close the water supply pipe 51 in response to an electrical signal from a controller 90. The water supply valve 56 may allow or block supply of water from the external water supply source to the tub 20. The water supply valve 56 may include, for example, a solenoid valve that is opened or closed in response to an electrical signal.

The washing machine 10 may include the detergent supply device 60 configured to supply a detergent to the tub 20. The detergent supply device 60 may supply a detergent to the inside of the tub 20 during a water supply process. Water supplied through the water supply pipe 51 may be mixed with a detergent via the detergent supply device 60. The water mixed with the detergent may be supplied to the inside of the tub 20. The detergent may include a conditioner for dryer, a deodorant, a sterilizer, or an air freshener, as well as a washing detergent. The detergent supply device 60 may be connected to the tub 20 through a connection pipe 61.

The washing machine 10 may include a drain device 70. The drain device 70 may be configured to discharge water accommodated in the tub 20 to outside. The drain device 70 may include a drain pump 73 for discharging water from the tub 20 to the outside of the washing machine housing 11, a connection hose 71 connecting the tub 20 and the drain pump 73 so that water inside the tub 20 flows into the drain pump 73, and a drain hose 74 for guiding water pumped by the drain pump 73 to the outside of the washing machine housing 11. The drain device 70 may include a drain valve 72 provided on the connection hose 71 to open and close the connection hose 71.

The washing machine 10 may provide a user interface device 15 for interaction between the user and the washing machine 10.

The washing machine 10 may include at least one user interface device 15. The user interface device 15 may include at least one input interface 16 and at least one output interface 17.

At least one input interface 16 may convert sensory information received from a user into an electrical signal.

At least one input interface 16 may include a power button, an operation button, a course selection dial (or a course selection button), and a washing/rinsing/dehydrating setting button. At least one input interface 16 may include, for example, a tact switch, a push switch, a slide switch, a toggle switch, a micro switch, a touch switch, a touch pad, a touch screen, a jog dial, and/or microphone, etc.

At least one output interface 17 may transmit various types of information related to the operation of the washing machine 10 to the user by generating sensory information.

For example, at least one output interface 17 may transmit information related to a washing course, an operating time of the washing machine 10, and washing setting/rinsing setting/dehydrating setting to the user. Information on the operation of the washing machine 10 may be output through a screen, indicator, or voice. At least one output interface 17 may include, for example, a Liquid Crystal Display (LCD) panel, a Light Emitting Diode (LED) panel, an LED module, a speaker, etc.

The clothes treating apparatus 1 may include a filter apparatus 100 provided to be connectable to the drain device 70 of the washing machine 10. For example, the filter apparatus 100 may be provided to be connectable to the drain hose 74.

The filter apparatus 100 may be disposed outside the washing machine 10. For example, the filter apparatus 100 may be provided outside the washing machine housing 11. The filter apparatus 100 may be provided to filter foreign substances from water discharged from the washing machine 10. The filter apparatus 100 may be provided to filter foreign substances having a size smaller than that of foreign substances filterable by the washing machine 10. For example, the filter apparatus 100 may be provided to filter foreign substances having a size smaller than that of foreign substances filterable by the drain device 70 of the washing machine 10.

Figure 3:
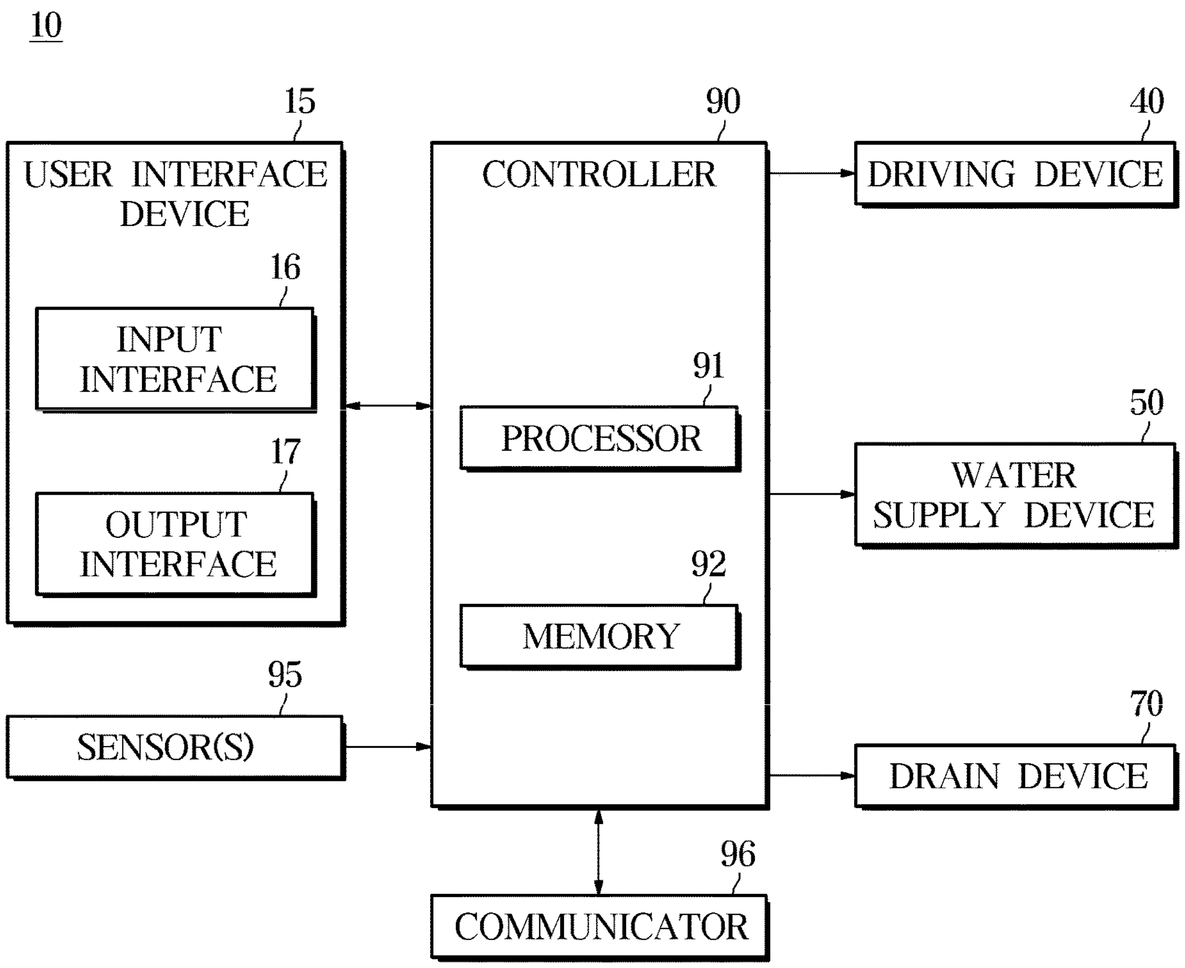
FIG. 3 is a control block diagram of a washing machine according to an embodiment.

FIG. 3 is a control block diagram illustrating the washing machine according to an embodiment.

In an embodiment, the washing machine 10 may include a user interface device 15, a driving device 40, a water supply device 50, a drain device 70, a sensor(s) 95, a communicator 96, and a controller 90.

The user interface device 15 may provide a user interface for interacting with the user and the washing machine 10.

The user interface device 15 may include at least one input interface 16 and at least one output interface 17.

The at least one input interface 16 may convert sensory information received from the user into electrical signals.

At least one input interface 16 may include a power button, an operation button, a course selection dial (or a course selection button), and a washing/rinsing/dehydrating setting button. At least one input interface 16 may include, for example, a tact switch, a push switch, a slide switch, a toggle switch, a micro switch, a touch switch, a touch pad, a touch screen, a jog dial, and/or microphone, etc.

At least one output interface 17 may transmit various data related to the operation of the washing machine 10 to the user by generating sensory information.

For example, at least one output interface 17 may transmit information related to a washing course, an operating time of the washing machine 10, and washing setting/rinsing setting/dehydrating setting to the user. Information on the operation of the washing machine 10 may be output through a screen, indicator, or voice. At least one output interface 17 may include, for example, a Liquid Crystal Display (LCD) panel, a Light Emitting Diode (LED) panel, a speaker, etc.

The driving device 40 may include the driving motor 41 that provides driving force to rotate the drum 30. The driving device 40 may operate based on a control signal from the controller 90.

The water supply device 50 may include the water supply valve 56 for opening and closing a water supply pipe 51 extending from an external water source to the detergent supply device 60 and/or the tub 20. The water supply valve 56 may be opened and closed based on a control signal from the controller 90.

The drain device 70 may include the drain pump 73 for discharging water from the tub 20 to the outside of the washing machine housing 11. The drain pump 73 may operate based on a control signal of the controller 90.

The sensor(s) 95 may include at least one sensor that obtains information related to the operating state of the washing machine 10.

For example, the sensor(s) 95 may include at least one of a water level sensor for detecting the water level of the tub, a sensor for detecting the operating state of the driving device 40, a flow sensor for detecting a flow rate flowing into the tub 20 through the water supply device 50, or a sensor for detecting an operating state of the drain device 70.

The sensor for detecting the operating state of the driving device 40 may include, for example, a current sensor for measuring the driving current applied to the driving motor 41, but is not limited thereto.

The sensor for detecting the operating state of the drain device 70 may include, for example, a current sensor for measuring the driving current applied to the drain pump 73, but is not limited thereto.

The washing machine 10 may include the communicator 96 for wired and/or wireless communication with an external device (e.g., a server, a user device, a home appliance, and/or a filter apparatus 100).

The communicator 96 may include at least one of a short-range communicator and a long-distance communicator.

The communicator 96 may transmit data to the external device or receive data from the external device. For example, the communicator 96 may establish communication with the filter apparatus 100, the server, the user device and/or other home appliances and transmit/receive various data.

For this, the communicator 96 may establish a direct (wired) communication channel or a wireless communication channel with an external electronic device (for example, a server, a user terminal, and/or a home appliance), and support communication through the established communication channel. According to an embodiment of the disclosure, the communicator 96 may include a wireless communicator (for example, a cellular communicator, a short-range wireless communicator, or a global navigation satellite system (GNSS) communicator), or a wired communicator (for example, a local area network (LAN) communicator or a power line communicator). A corresponding communicator among the communicators may communicate with an external electronic device through a first network (for example, a short-range communication network, such as Bluetooth, wireless fidelity (WiFi) direct, or infrared data association (IrDA)) or a second network (for example, a telecommunication network, such as a legacy cellular network, a 5G network, a next-generation communication network, internet, or a computer network (for example, a local area network (LAN) or a wide area network (WAN)). Such various kinds of communicators may be integrated into a component (for example, a single chip) or implemented as a plurality of independent components (for example, a plurality of chips).

A short-range wireless communicator may include a Bluetooth communicator, a Bluetooth Low Energy (BLE) communicator, a near field communicator (Near Field Communicator), a WLAN (Wi-Fi) communicator, a Zigbee communicator, an infrared data association (IrDA) communicator, a Wi-Fi Direct (WFD) communicator, an ultra-wideband (UWB) communicator, an Ant+ communicator, a microwave (uWave) communicator or the like, but is not limited thereto.

The remote communicator may include a communicator that performs various types of long-distance communication, and may include a mobile communication unit.

In an embodiment, the communicator may communicate with an external device such as a server, user device, or other home appliance through a nearby access point (AP). The wireless access point apparatus may connect a local area network (LAN), to which the washing machine 10, the filter apparatus 100 and/or the user device is connected, to a WAN to which a server is connected. The filter apparatus 100, the washing machine 10 and/or user device may be connected to the server through a WAN.

The controller 90 may control various components (e.g., the driving device 40, the water supply device 50, and the drain device 70) of the washing machine 10. The controller 90 may control various components of the washing machine 10 to perform at least one operation including water supply, washing, rinsing, and/or dehydrating according to a user input. For example, the controller 90 may control the driving motor 41 of the driving device 40 to adjust the rotational speed of the drum 30, the water supply valve 56 of the water supply device 50 to supply water to the tub 20, or the drain pump 73 of the drain device 70 to discharge water of the tub 20 to the outside.

The controller 90 may include hardware such as a CPU, Micom, or memory, and software such as a control program. For example, the controller 90 may include at least one memory 92 that stores data in the form of an algorithm or program for controlling the operation of components in the washing machine 10, and at least one processor 91 that performs the above-described operations and operations to be described below using the data stored in the at least one memory 92. The memory 92 and the processor 91 may be implemented as separate chips. The processor 91 may include one or more processor chips or may include one or more processing cores. The memory 92 may include one or more memory chips or may include one or more memory blocks. Also, the memory 92 and the processor 91 may be implemented as a single chip.

Figure 4:
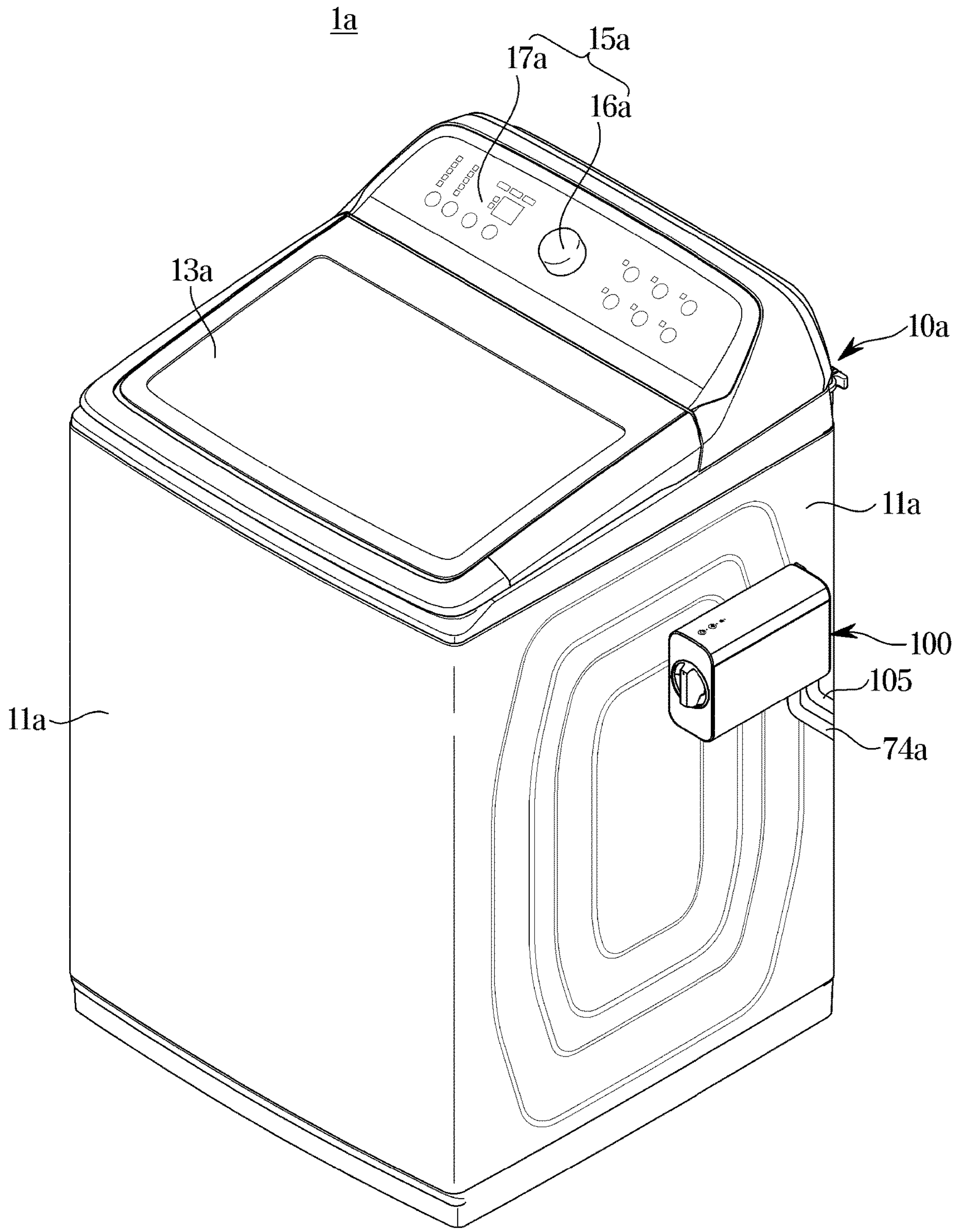
FIG. 4 illustrates a clothes treating apparatus according to an embodiment.
Figure 5:
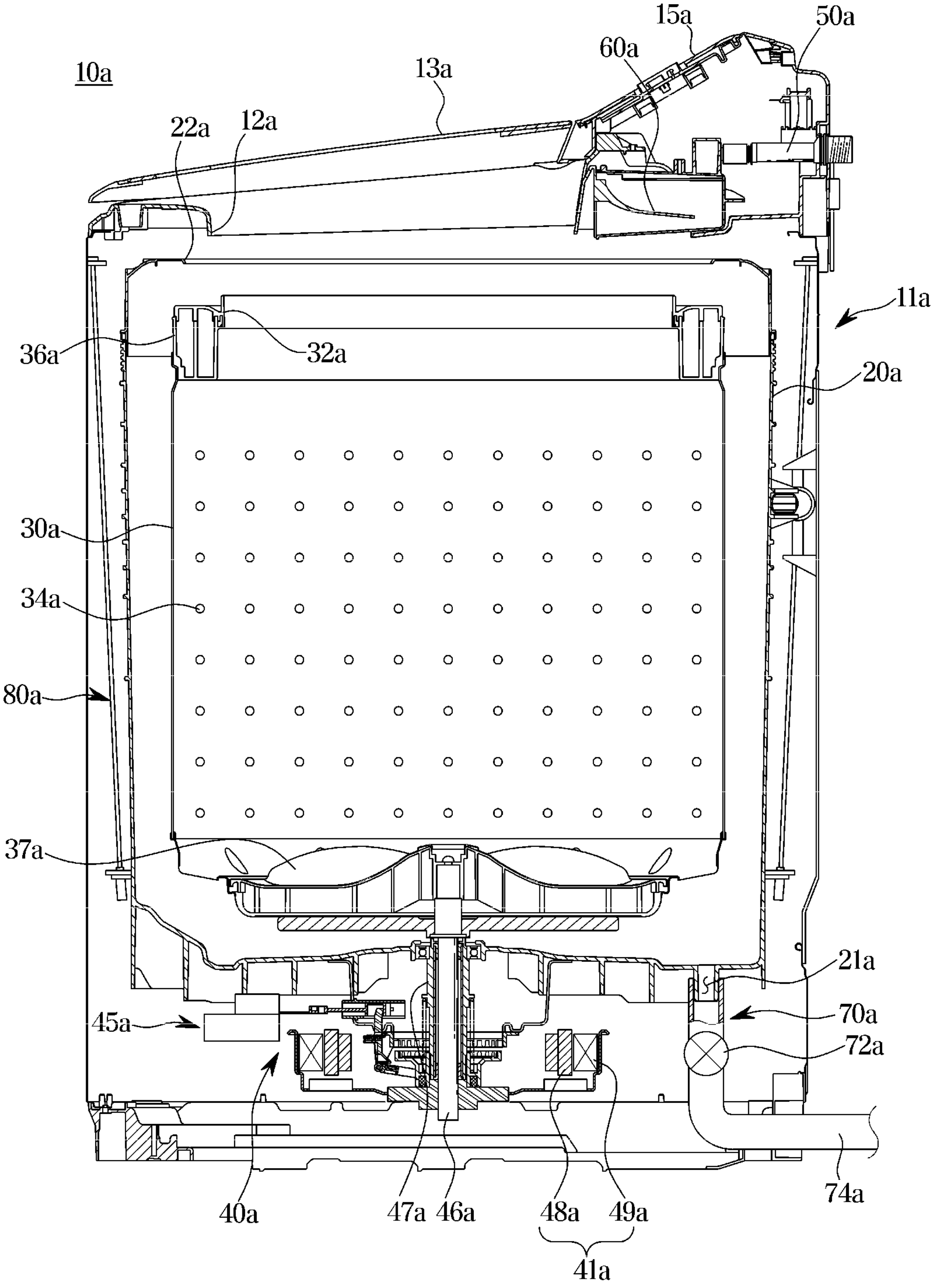
FIG. 5 illustrates a cross section of the washing machine shown in FIG. 4 according to an embodiment.

FIG. 4 shows a clothes treating apparatus, which in this embodiment is a washing machine, according to an embodiment of the disclosure. FIG. 5 shows a cross section of the washing machine shown in FIG. 5.

As shown in FIGS. 4 and 5, the clothes treating apparatus 1*a*, which in this embodiment is the washing machine 10*a*, may include a housing 11*a* accommodating various components therein. The housing 11*a* may form an exterior of the washing machine 10*a*. The housing 11*a* may have a box shape with one part open.

The housing 11*a* may include a housing opening 12*a* formed to be accessible to the inside of a drum 30*a*. The housing opening 12*a* may open substantially upward.

The washing machine 10*a* may include a door 13*a* for opening and closing the housing opening 12*a* provided in the housing 11*a*. The door 13*a* may be rotatably mounted to the housing 11*a* by a hinge. At least a portion of the door 13*a* may be transparent or translucent so that an inside of the housing 11*a* can be seen.

The washing machine 10*a* may include a tub 20*a* provided inside the housing 11*a* to store water. The tub 20*a* may be disposed inside the housing 11*a*. The tub 20*a* may include a tub opening 22*a* provided to correspond to the housing opening 12*a*.

The tub opening 22*a* may open substantially upward. The tub 20*a* may be supported inside the housing 11*a*. The tub 20*a* may have a substantially cylindrical shape with one side open.

The tub 20*a* may be elastically supported from the housing 11*a* by the damper 80*a*. The damper 80*a* may connect the housing 11*a* and the tub 20*a*. When the vibration generated by the rotation of the drum 30*a* is transmitted to the tub 20*a* and/or the housing 11*a*, the damper 80*a* may be provided to attenuate vibration by absorbing vibration energy between the tub 20*a* and the housing 11*a*.

The washing machine 10*a* may include the drum 30*a* provided to accommodate laundry. The drum 30*a* may be rotatably provided inside the tub 20*a*. The drum 30*a* may rotate within the tub 20*a* to perform washing, rinsing, and/or dehydration. The drum 30*a* may include a through hole 34*a* connecting the inner space of the drum 30*a* and the inner space of the tub 20*a*. The drum 30*a* may have a substantially cylindrical shape with one side open.

A balancing unit 36*a* may be installed on top of the drum 30*a* to solve load imbalance caused by laundry. The balancing unit 36*a* includes a housing having an annular channel and a ball or a fluid mass body movably provided inside the channel and can solve the load imbalance of the drum 30*a* while the ball or the fluid moves according to the rotation of the drum 30*a*.

A pulsator 37*a* is rotatably provided at the bottom of the drum 30*a* to generate a washing water flow. Laundry may be washed by the washing water flow generated by the pulsator 37*a*.

The drum 30*a* may include a drum opening 32*a* provided to correspond to the housing opening 12*a* and the tub opening 22*a*. Laundry may be put into the drum 30*a* or taken out of the drum 30*a* through the housing opening 12*a*, the tub opening 22*a*, and the drum opening 32*a*.

The washing machine 10*a* may include a washing machine driving device 40*a* configured to rotate the drum 30*a* and the pulsator 37*a*. The washing machine driving device 40*a* may include a driving motor 41*a* and a shaft system for transmitting the driving force generated by the driving motor 41*a* to the drum 30*a* and the pulsator 37*a*.

The driving motor 41*a* may include a fixed stator 48*a* and a rotor 49*a* that rotates by electromagnetically interacting with the stator 48*a*.

The shaft system may include a dehydration shaft 47*a* arranged to transmit the driving force of the driving motor 41*a* to the drum 30*a*, a washing shaft 46*a* provided to transmit the driving force of the driving motor 41*a* to the pulsator 37*a*, and a clutch device 45*a* that connects or disconnects the driving motor 41*a* and the dehydration shaft 47*a*.

The dehydration shaft 47*a* is formed to have a hollow, and the washing shaft 46*a* may be provided in the hollow of the dehydration shaft 47*a*. The washing shaft 46*a* remains connected to the rotor 49*a* of the driving motor 41*a* and the dehydration shaft 47*a* may be connected to or disconnected from the rotor 49*a* of the driving motor 41*a* by the clutch device 45*a*.

When the clutch device 45*a* disconnects the dehydration shaft 47*a* and the driving motor 41*a*, power is transmitted to the washing shaft 46*a* so that only the pulsator 37*a* rotates, and when the clutch device 45*a* connects the dehydration shaft 47*a* and the driving motor 41*a*, power is transmitted to both the dehydration shaft 47*a* and the washing shaft 46*a* so that the drum 30*a* and the pulsator 37*a* can rotate simultaneously.

When only the pulsator 37*a* rotates, washing water flow is generated by the rotation of the pulsator 37*a*, and laundry is rotated by the washing water flow and rubbed against the drum 30*a*, so that laundry can be washed. When the pulsator 37*a* and the drum 30*a* rotate at the same time, the laundry inside the drum 30*a* is rotated and the laundry is dehydrated by the centrifugal force, so that the laundry can be dehydrated.

The washing machine 10*a* may include a water supply device 50*a*. The water supply device 50*a* may supply water to the tub 20*a*. The water supply device 50*a* may be located above the tub 20*a*. The water supply device 50*a* may include a water supply pipe and a water supply valve provided in the water supply pipe. The water supply pipe may be connected to an external water supply source. The water supply pipe may extend from an external water supply source to a detergent supply device 60*a* and/or the tub 20*a*. Water may be supplied to the tub 20*a* via the detergent supply device 60*a*. Water may be supplied to the tub 20*a* without passing through the detergent supply device 60*a*.

The water supply valve may open or close the water supply pipe in response to an electrical signal from the controller. The water supply valve may allow or block the supply of water from an external water supply source to the tub 20*a*. The water supply valve may include, for example, a solenoid valve that opens and closes in response to an electrical signal.

The washing machine 10*a* may include the detergent supply device 60*a* configured to supply detergent to the tub 20*a*. The detergent supply device 60*a* may be configured to supply detergent into the tub 20*a* during the water supply process. Water supplied through the water supply pipe can be mixed with detergent via the detergent supply device 60*a*. Water mixed with detergent may be supplied into the tub 20*a*. The detergent may include not only laundry detergent but also dryer rinse, deodorant, disinfectant or fragrance.

The washing machine 10*a* may include a drain device 70*a*. The drain device 70*a* may be configured to discharge water contained in the tub 20*a* to the outside. A drain port 21*a* may be formed at a lower portion of the tub 20*a* to drain water stored in the tub 20*a* to the outside of the tub 20*a*. A drain hose 74*a* may be connected to the drain hole 21*a*, and a drain valve 72*a* for opening and closing the drain hose 74*a* may be provided in the drain hose 74*a*.

The washing machine 10*a* may provide a user interface device 15*a* for interaction between the user and the washing machine 10*a* The washing machine 10*a* may include at least one user interface device 15*a*. The user interface device 15*a* may include at least one input interface 16*a* and at least one output interface 17*b*.

At least one input interface 16*a* may convert sensory information received from the user into an electrical signal.

At least one input interface 16*a* may include a power button, an operation button, a course selection dial (or a course selection button), and a washing/rinsing/dehydrating setting button. At least one input interface 16*a* may include, for example, a tact switch, a push switch, a slide switch, a toggle switch, a micro switch, a touch switch, a touch pad, a touch screen, a jog dial, and/or microphone, etc.

At least one output interface 17*b* may transmit various information related to the operation of the washing machine 10*a* to the user by generating sensory information.

For example, at least one output interface 17*b* may transmit information related to a washing course, an operating time of the washing machine 10*a*, and washing setting/rinsing setting/dehydrating setting to the user. Information on the operation of the washing machine 10*a* may be output through a screen, indicator, or voice. At least one output interface 17*b* may include, for example, a Liquid Crystal Display (LCD) panel, a Light Emitting Diode (LED) panel, a speaker, etc.

The clothes treating apparatus 1*a* may include the same filter apparatus 100 as the filter apparatus 100 shown in FIGS. 1 and 2. For example, the filter apparatus 100 according to an embodiment may be connected to a front-loading washing machine or a top-loading washing machine. The filter apparatus 100 may be provided to be connectable to the drain device 70*a* of the washing machine 10*a*. The filter apparatus 100 may be disposed outside the washing machine 10*a*. The filter apparatus 100 may be provided to filter foreign substances from water discharged from the washing machine 10*a*. The filter apparatus 100 may be provided to filter foreign substances having a size smaller than that of foreign substances filterable by the washing machine 10*a*. For example, the filter apparatus 100 may be provided to filter foreign substances having a size smaller than that of foreign substances filterable by the drain device 70*a* of the washing machine 10*a*.

The washing machine 10*a* of the clothes treating apparatus 1*a* shown in FIGS. 4 and 5 may include the configuration of the washing machine 10 shown in FIG. 3.

Figure 6:
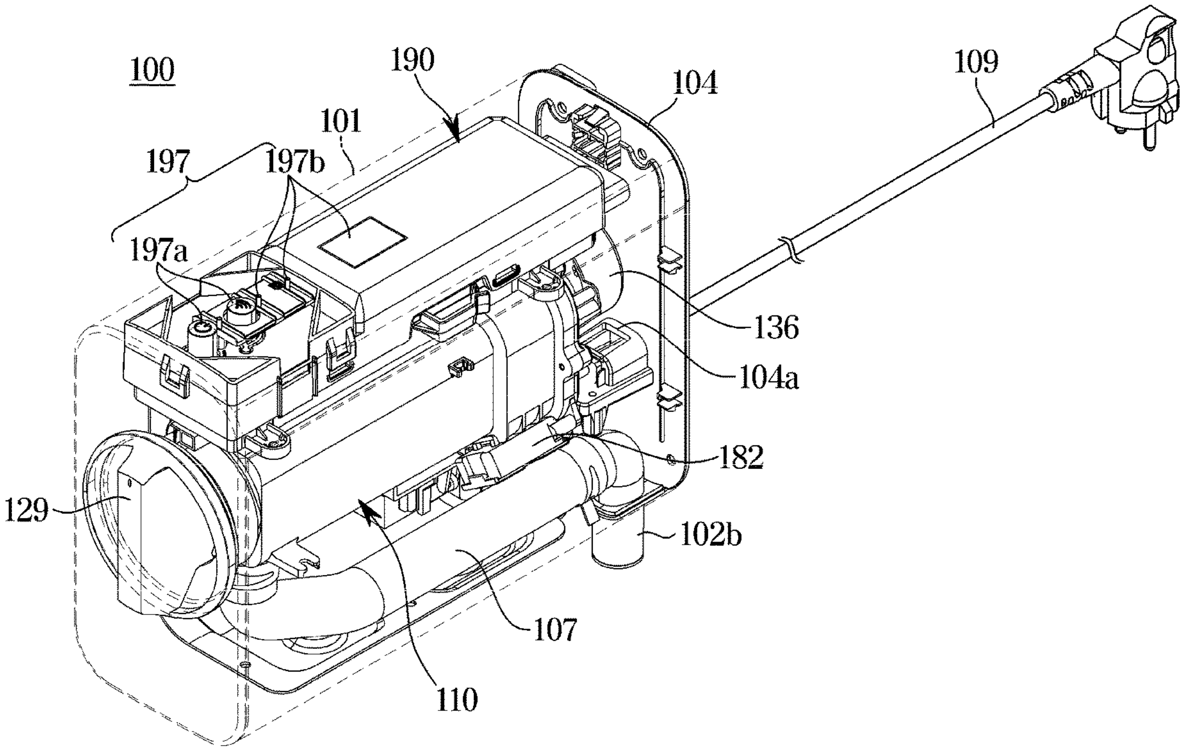
FIG. 6 illustrates the interior of the filter apparatus shown in FIGS. 1 and 3 according to an embodiment.
Figure 7:
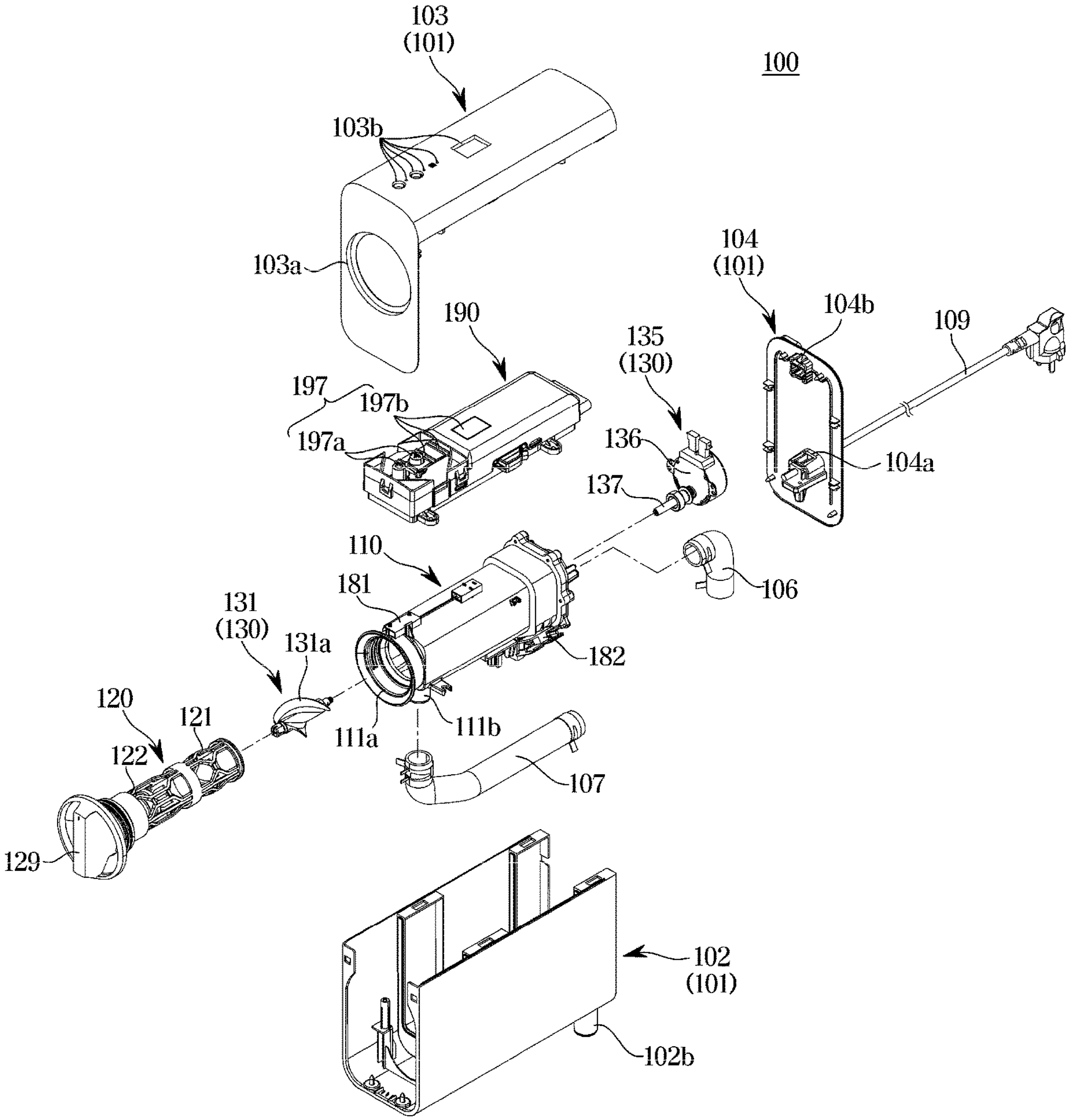
FIG. 7 illustrates the filter apparatus shown in FIG. 6 in an exploded view according to an embodiment.
Figure 8:
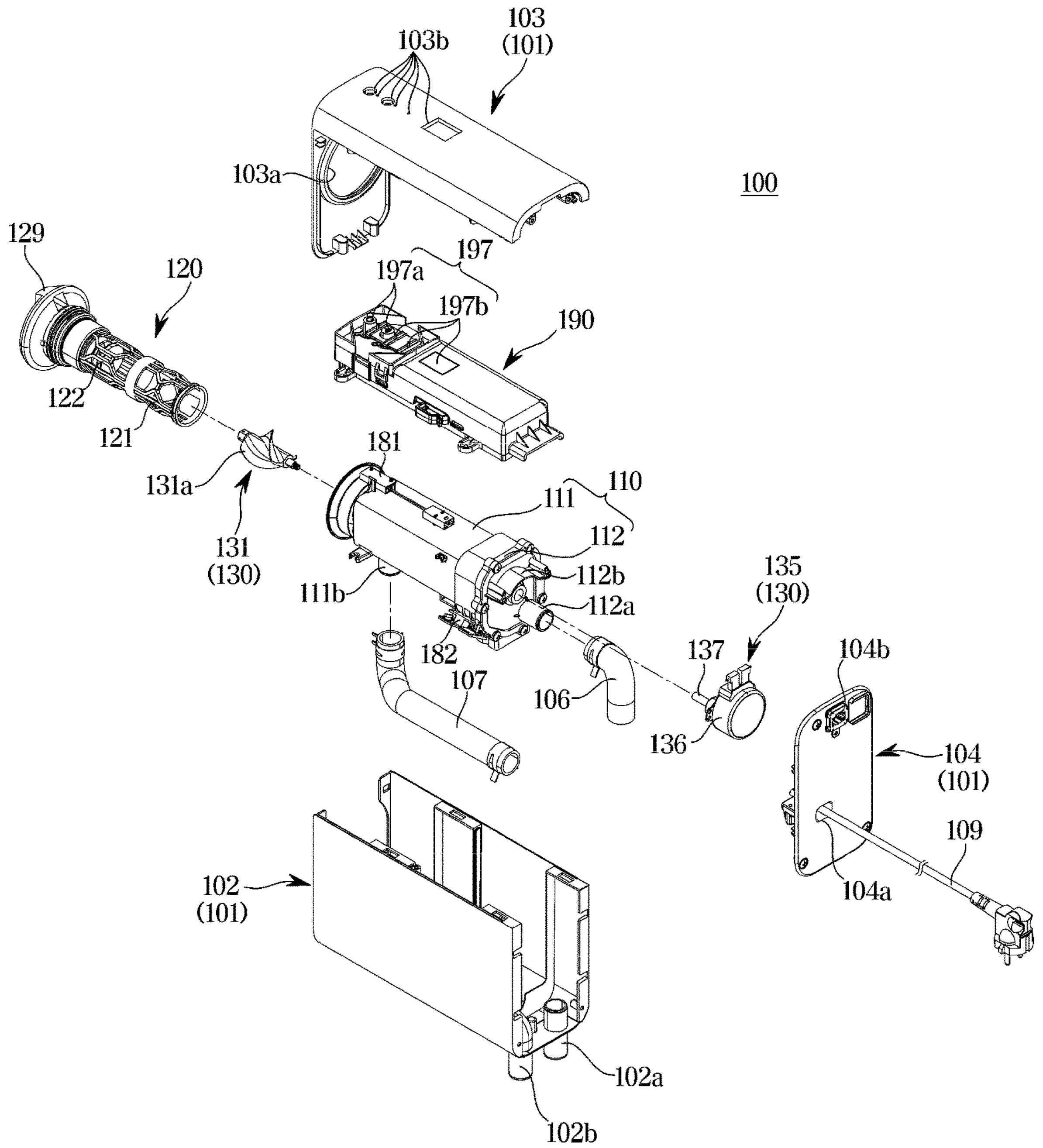
FIG. 8 illustrates the filter apparatus shown in FIG. 7 from a different orientation than in FIG. 7 according to an embodiment.
Figure 9:
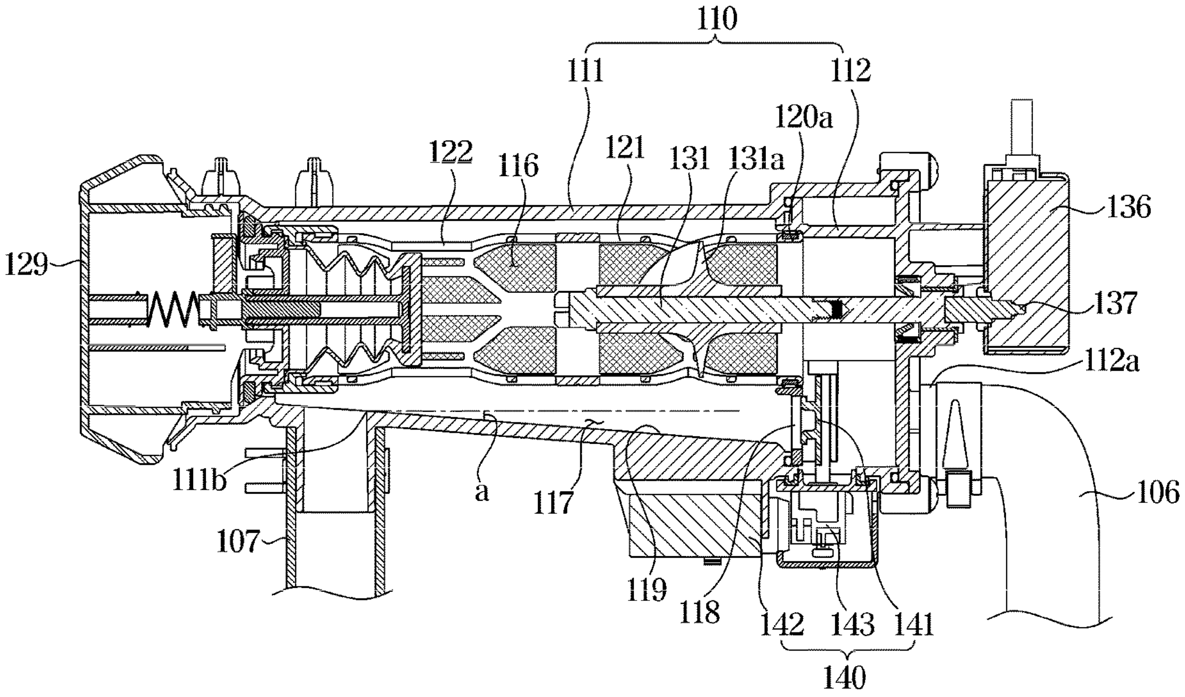
FIG. 9 illustrates a cross section of some components of the filter apparatus shown in FIG. 6 according to an embodiment.

FIG. 6 illustrates the interior of a filter apparatus shown in FIGS. 1 and 3. FIG. 7 illustrates the filter apparatus shown in FIG. 6 in an exploded view. FIG. 8 illustrates the filter apparatus shown in FIG. 7 from a different orientation than in FIG. 7. FIG. 9 illustrates a cross section of some components of the filter apparatus shown in FIG. 6.

Referring to FIGS. 6 to 8, the filter apparatus 100 according to an embodiment may include a filter housing 101 accommodating various components. The filter housing 101 may include a housing body 102, a housing cover 103, and a housing bracket 104. For example, the housing body 102, the housing cover 103, and the housing bracket 104 may be provided as separate components. For example, the housing body 102 may be integrally formed with the housing cover 103. For example, the housing body 102 may be integrally formed with the housing bracket 104. For example, the housing cover 103 may be integrally formed with the housing bracket 104. For example, the housing body 102 may be integrally formed with the housing cover 103 and the housing bracket 104.

The housing body 102 may form a space for accommodating various components. The housing body 102 may have a substantially U shape in cross section perpendicular to a direction in which the filter 120 accommodated therein extends. The housing body 102 may have a box shape with open front, rear and top surfaces. The housing body 102 may be detachably coupled to the housing cover 103 and/or the housing bracket 104.

The housing body 102 may include a housing inlet 102*a* for receiving water into the interior of the filter apparatus 100, and a housing outlet 102*b* for discharging water from the interior of the filter apparatus 100 to the exterior of the filter apparatus 100. The housing inlet 102*a* and/or the housing outlet 102*b* may be located at a lower portion of the housing body 102.

The housing inlet 102*a* may be connected with a drain hose 74 and 74*a* of the washing machine 10 and 10*a*. The housing outlet 102*b* may be connected with a drain line 105.

The housing cover 103 may be provided to cover the open front and upper surfaces of the housing body 102. The housing cover 103 may be detachably coupled to the housing body 102 and/or the housing bracket 104. The housing cover 103 may include a cover opening 103*a* formed to allow the filter 120 to pass therethrough. The housing cover 103 may include an installation portion 103*b* where a user interface device 197 is installed. At least a portion of the user interface device 197 may be exposed to the outside of the filter apparatus 100 through the installation portion 103*b*.

The housing bracket 104 may be provided to cover the open rear surface of the housing body 102. The housing bracket 104 may be detachably coupled to the housing body 102 and/or the housing cover 103. The housing bracket 104 may include a cable opening 104*a* formed to allow the power cable 109 to pass therethrough. The housing bracket 104 may include a connector mounting portion 104*b* formed to connect a connector 108 for communication with an external device including the washing machine 10 and the like.

The filter apparatus 100 may include a filter case 110 located inside the filter housing 101. The filter case 110 may form a flow path through which water flowing into the filter apparatus 100 passes. The filter case 110 may be provided to accommodate the filter 120. The filter case 110 may include a case body 111 and a case cover 112.

The case body 111 may extend along the direction in which the filter 120 accommodated therein extends. The case body 111 may include a case opening 111*a* formed to allow the filter 120 to pass therethrough. The case opening 111*a* may be provided to correspond to the cover opening 103*a*. The case opening 111*a* is located closer to the case outlet 111*b* than the case inlet 112*a*, and may be provided so that the filter 120 can pass therethrough.

The case body 111 may include a case outlet 111*b* for discharging water flowing into the filter case 110 from the filter case 110. The case outlet 111*b* may be located at a lower portion of the case body 111. The case outlet 111*b* may be located adjacent to the case opening 111*a*. The case outlet 111*b* may be located close to the other end opposite to one end where the filter opening 120*a* of the filter 120 is located. The case outlet 111*b* may be located closer to a second filter portion 122 than to a first filter portion 121 of the filter 120.

The case outlet 111*b* may be connected to the housing outlet 102*b*. The filter apparatus 100 may include a discharge guide 107 for connecting the case outlet 111*b* and the housing outlet 102*b*.

The case cover 112 may be detachably coupled to the other end opposite to one end of the case body 111 where the case opening 111*a* is located. For example, the case cover 112 may be integrally formed with the case body 111.

The case cover 112 may include a case inlet 112*a* through which water flows into the filter case 110. The case inlet 112*a* may be connected to the housing inlet 102*a*. The filter apparatus 100 may include an inflow guide 106 for connecting the case inlet 112*a* and the housing inlet 102*a*. The case inlet 112*a* may include an entrance.

The case cover 112 may include a motor mounting portion 112*b* for mounting a filter cleaning device 130 thereon. The motor mounting portion 112*b* may be positioned above the case inlet 112*a*. The cleaning motor 136 of the filter cleaning device 130 may be mounted on the motor mounting portion 112*b*.

The filter apparatus 100 may include the filter 120 detachably coupled to the filter case 110. The filter 120 may be provided to filter fine-sized foreign substances. The filter 120 may be provided to filter micro plastics having a size of about 5 mm or less. The filter 120 may include a mesh filter.

The filter 120 may extend approximately between the case inlet 112*a* and the case outlet 111*b*.

When the filter 120 is mounted on the filter case 110, the filter 120 may include a filter opening 120*a* opened toward the case inlet 112*a*. Water flowing into the filter case 110 through the case inlet 112*a* may move into the filter 120 through the filter opening 120*a*.

The filter 120 may include the first filter portion 121 and the second filter portion 122. The first filter portion 121 may be located closer to the case inlet 112*a* than the second filter portion 122. In the water flowing into the filter case 110, foreign substances may be filtered through the first filter portion 121 or may not be filtered in the first filter portion 121, and after passing through the first filter portion 121, foreign substances may be filtered in the second filter portion 122. The first filter portion 121 and the second filter portion 122 may be sequentially disposed along a direction in which the filter 120 extends. Foreign substances transferred from the first filter portion 121 may be collected in the second filter portion 122 by the filter cleaning device 130.

The filter apparatus 100 may include a handle 129 at least partially exposed to the outside of the filter housing 101 when the filter 120 is mounted on the filter case 110. The handle 129 may be detachably coupled to the filter 120. As the handle 129 is detachably coupled to the filter 120, the filter 120 can be easily maintained and/or repaired. The handle 129 may rotate and be coupled to the cover opening 103*a* and/or the case opening 111*a*.

The filter apparatus 100 may include the filter cleaning device 130 for cleaning the filter 120. The filter cleaning device 130 may be mounted on the filter case 110. The filter cleaning device 130 may include a cleaning member 131 for cleaning the surface of the filter 120 through which foreign substances are filtered, and a cleaning driver 135 for driving the cleaning member 131.

The cleaning member 131 may be located inside the filter 120. The cleaning member 131 may be provided to correspond to the first filter portion 121 of the filter 120. The cleaning member 131 may have a spirally extending blade 131*a*. The blade 131*a* may extend in a radial direction from the rotation axis of the cleaning member 131. The cleaning member 131 may be provided to contact the surface of the filter 120 through which foreign substances are filtered. The cleaning member 131 may be provided to contact the inner surface of the filter 120. For example, the cleaning member 131 may include a plurality of brushes.

While the cleaning member 131 is driven by the cleaning driving device 135, the cleaning member 131 may be arranged to transfer foreign substances being filtered from a portion of the filter 120 closer to the case inlet 112*a* to a portion of the filter 120 closer to the case outlet 111*b* of the filter 120. The cleaning member 131 may be provided to transfer foreign substances filtered through the first filter portion 121 to the second filter portion 122. For example, the cleaning member 131 may be rotatably provided inside the filter 120. The cleaning member 131 may include a flexible material. The cleaning member 131 rotates in contact with the filter 120 and can clean foreign substances filtered by the filter 120. While the cleaning member 131 is driven in contact with the filter 120, the cleaning member 131 can scrape and remove foreign substances attached to the surface of the filter 120 through which foreign substances are filtered. For example, the cleaning member 131 may be slidably provided inside the filter 120.

As the cleaning member 131 is provided to transfer foreign substances filtered by the first filter portion 121 to the second filter portion 122 and the water flowing into the filter case 110 flows from the first filter portion 121 to the second filter portion 122, foreign substances filtered through the first filter portion 121 may be efficiently collected in the second filter portion 122.

The cleaning driver 135 may include a cleaning motor 136 and a motor shaft 137. The cleaning motor 136 may be configured to generate power for driving the cleaning member 131. The motor shaft 137 may be connected to the cleaning member 131. The cleaning motor 136 may be mounted on the filter case 110. The cleaning motor 136 may be located closer to the case inlet 112*a* than to the case outlet 111*b*.

The filter apparatus 100 may include a circuitry module 190 located inside the filter housing 101. The circuitry module 190 may be located at the upper end of the inside of the filter housing 101. The circuitry module 190 may be located on one side of the filter case 110. For example, the circuitry module 190 may be located above the filter case 110. For example, the circuitry module 190 may be disposed above the filter 120.

As another example, the circuitry module 190 may be provided on the lower side, left side, right side, front side and/or rear side of the filter case 110.

The circuitry module 190 may include a controller 191 for controlling the filter apparatus 100 and a communicator 199 for communicating with the washing machine 10 and 10*a*.

The filter apparatus 100 may include the user interface device 197 positioned above the circuitry module 190. At least a portion of the user interface device 197 may be exposed to the outside of the filter apparatus 100 through the installation portion 103*b* of the filter housing 101. The user interface device 197 may be located on the upper surface of the filter apparatus 100. The user interface device 197 may include at least one input interface 197*a* and at least one output interface 197*b*. According to various embodiments of the disclosure, the user interface device 197 may be provided on an upper side, a lower side, a left side, a right side, a front side and/or a rear side of the filter housing 101.

The at least one input interface 197*a* may convert sensory information received from a user into an electrical signal.

The at least one input interface 197*a* may include a power button, an operation button and/or a communication button. The at least one input interface 16 may include, for example, a tact switch, a push switch, a slide switch, a toggle switch, a micro switch, a touch switch, a touch pad, a touch screen, a jog dial and/or a microphone, etc.

According to various embodiments of the disclosure, the power button may be a button for supplying power to the filter apparatus 100, the operation button may be a button for operating the filter cleaning device 130, and the communication button may be a button for switching a state of the filter apparatus 100 to enable communication with an external device (for example, a washing machine, a user device, a home appliance, etc.).

The at least one output interface 197*b* may generate sensory information, thereby transmitting various types of information related to an operation and/or state of the washing machine 10 to a user.

For example, the at least one output interface 197*b* may transmit, to a user, information related to an inflow state of water into the filter apparatus 100, a clogged state of the filter 120, a state of at least one sensor provided in the filter apparatus 100, and an operation state of the filter cleaning device 130.

Various types of information about an operation and/or state of the filter apparatus 100 may be output through a screen, an indicator, a speech, etc. The at least one output interface 197*b* may include, for example, a LCD panel, a LED panel, a LED module, a speaker, etc.

The output interface 197*b* may be positioned on the upper surface of the filter apparatus 100. However, the location of the output interface 197*b* is not limited to this, and the output interface 197*b* may be provided on a front surface, a side surface or a rear surface of the filter apparatus 100.

According to various embodiments of the disclosure, the at least one input interface 197*a* and the at least one output interface 197*b* may be provided on different surfaces of the filter housing 101. For example, the at least one input interface 197*a* may be provided on an upper surface of the filter housing 101, and the output interface 197*b* may be provided on a front surface of the filter housing 101.

According to an embodiment of the disclosure, a user may check various pieces of information about an operation and/or state of the filter apparatus 100 through the output interface 197*b* in front of the filter apparatus 100 without having to approach the filter apparatus 100. Also, according to the disclosure, the user may easily input various commands through the at least one input interface 197*a* provided on the upper side of the filter apparatus 100 without having to lower his/her body.

The filter apparatus 100 may include a filter sensor 181 that obtains information about a state of the filter 120. The filter sensor 181 may be mounted on the filter case 110. The filter sensor 181 may be located on the outer side of the filter case 110. The filter sensor 181 may be positioned to correspond to the second filter portion 122 of the filter 120 mounted on the filter case 110. For example, the filter sensor 150 may include a magnetic sensor, an optical sensor (e.g., an infrared sensor) and/or an ultrasonic sensor.

The filter sensor 181 may detect the amount of foreign substances collected in the filter 120.

The filter apparatus 100 may include a water supply sensor 182 that detects the inflow of water into the filter apparatus 100. The water supply sensor 182 may detect the inflow of water through the case inlet 112*a*.

The water supply sensor 182 may be mounted on a lower part of the filter case 110. The water supply sensor 182 may be located close to the case inlet 112*a* of the filter case 110. According to various embodiments of the disclosure, the water supply sensor 182 may be provided on the inner side of the case inlet 112*a*. For example, the water supply sensor 182 may include a capacitive sensor and/or a flow sensor.

Referring to FIG. 9, the filter case 110 may include a remaining water guide 119 that guides remaining water existing in the filter case 110. The remaining water guide 119 may be positioned below the filter 120 in a direction of gravity. For example, the remaining water guide 119 may obliquely face downward in a direction from the case outlet 111*b* to the case inlet 112*a*. The remaining water guide 119 may be obliquely formed at a preset angle g with respect to a direction perpendicular to the direction of gravity. The remaining water guide 119 may prevent water in the filter case 110 from being discharged to the outside of the filter apparatus 100 through the case outlet 111*b*.

The location of a lower end of an entrance of the case outlet 111*b* in the direction of gravity may be higher than the location of a lower end of the case inlet 112*a* in the direction of gravity. Remaining water in the filter case 110 may move from the surroundings of the case outlet 111*b* toward the case inlet 112*a* by gravity. For example, the bottom of the filter case 110 between the entrance of the case outlet 111*b* and the case inlet 112*a* may include a step portion.

The case inlet 112*a* may be positioned downward of the filter 120. The uppermost end of the case inlet 112*a* in the direction of gravity may be positioned downward of the uppermost end of the filter 120 in the direction of gravity. The lowest end of the case inlet 112*a* in the direction of gravity may be positioned downward of the lowest end of the filter 120 in the direction of gravity. The entrance of the case outlet 111*b* may be positioned downward of the filter 120.

The filter case 110 may include a connecting opening 118. The connecting opening 118 may be located at one end of the remaining water guide 119, which is close to the case inlet 112*a*. The connecting opening 118 may be formed in the filter case 110 to discharge water guided by the remaining water guide 119 toward the case inlet 112*a*.

The filter apparatus 100 may include a closing and opening device 140 for opening or closing the connecting opening 118. The closing and opening device 140 may include a connecting door 141 and a door motor 142 for operating the connecting door 141.

The connecting door 141 may open or close the connecting opening 118. The connecting door 141 may be provided in a size and/or shape capable of closing the connecting opening 118. The connecting door 141 may be rotatably coupled to the filter case 110. The connecting door 141 may be rotatable in a direction in which water flows from the remaining water guide 119 to the case inlet 112*a*. The connecting door 141 may be provided to be rotatable in a direction opposite to a direction in which water introduced through the case inlet 112*a* flows to the connecting opening 118. The connecting door 141 may be provided to prevent opening of the connecting opening 118 by hydraulic pressure of water introduced through the case inlet 112*a*.

The door motor 142 may be provided to generate power for operating the connecting door 141. The closing and opening device 140 may include a power transmission device 143 for transmitting power generated in the door motor 142 to the connecting door 141. Power generated in the door motor 142 may be transmitted to the connecting door 141 through the power transmission device 143.

Inside the filter case 110, a filtering flow path 116 passing through the filter 120 and a bypass flow path 117 bypassing the filter 120 may be formed. Water introduced through the case inlet 112*a* may move to the case outlet 111*b* through the filtering flow path 116 or may move to the case outlet 111*b* through the bypass flow path 117.

The connecting opening 118 may be located at one end of the bypass flow path 117 close to the case inlet 112*a*. While the connecting door 141 opens the connecting opening 118, water introduced through the case inlet 112*a* may directly move to the bypass flow path 117 without passing through the filtering flow path 116.

While the connecting door 141 opens the connecting opening 118, water in the bypass flow path 117 may directly move to the case inlet 112 without passing through the filtering flow path 116. The connecting opening 118 may be formed such that water in the bypass flow path 117 moves to the case inlet 112*a* or water flowing into the case inlet 112*a* moves to the bypass flow path 117.

Figure 10:
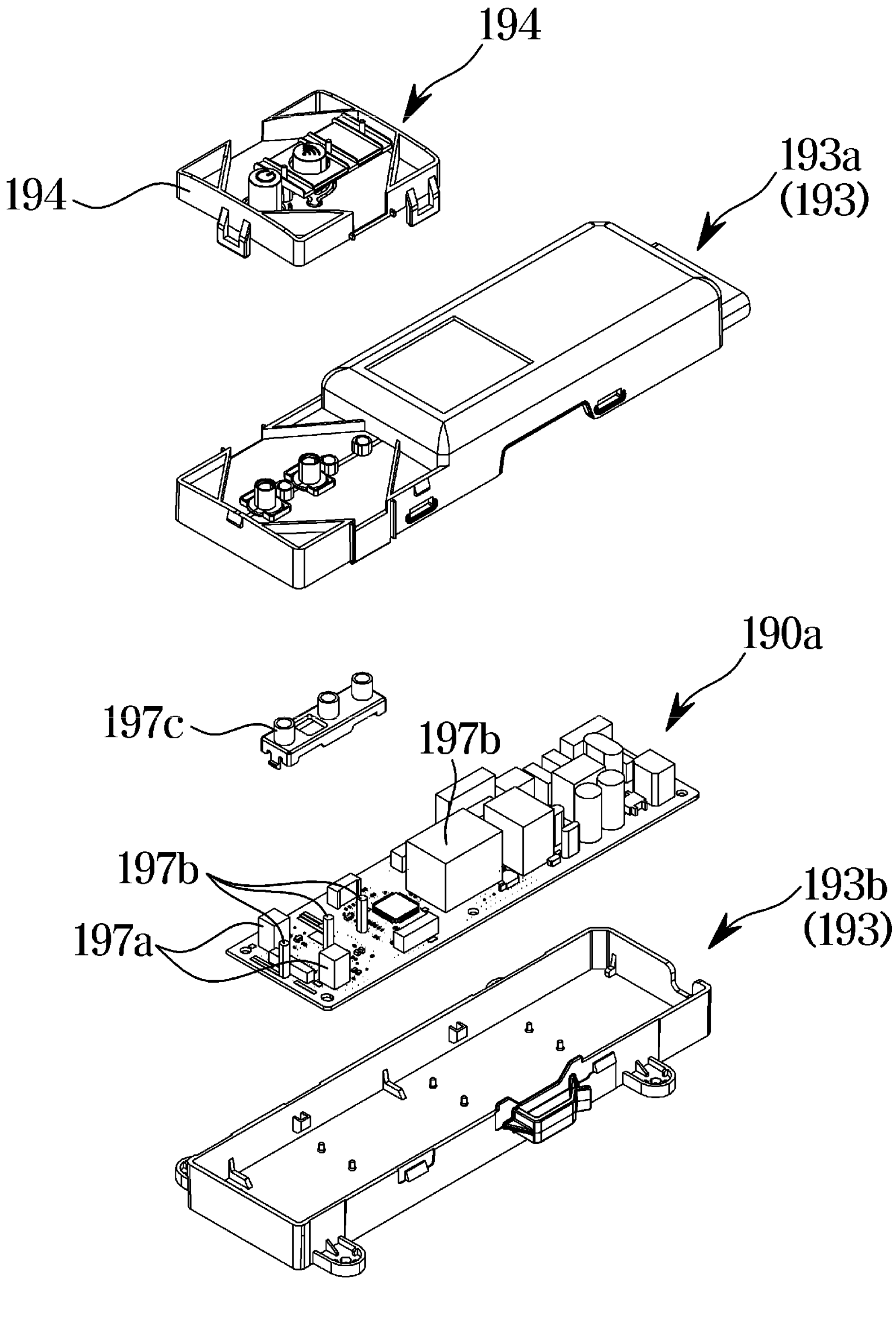
FIG. 10 illustrates a circuitry module of a filter apparatus in an exploded view according to an exemplary embodiment.

FIG. 10 is an exploded view of an circuitry module of a filter apparatus according to an exemplary embodiment Referring to FIG. 10, the circuitry module 190 may include a circuitry 190*a*, a circuitry case 193 accommodating the circuitry 190*a* therein, and an interface device cover 194 coupled to the circuitry case 193 such that at least one component coupled to the circuitry 190*a* is exposed to outside of the circuitry case 193.

The interface device cover 194 may include at least one opening formed such that the user interface device 197 electrically connected to the circuitry 190*a* may be exposed the outside of the circuitry case 193.

For example, the input interface 197*a* may be exposed to the outside of the circuitry case 193 by the interface device cover 194 and exposed to the outside of the filter apparatus 100 by the installation portion 103*b* of the filter housing 101.

For example, the output interface 197*b* may be exposed to the outside of the circuitry case 193 by the interface device cover 194 and exposed to the outside of the filter apparatus 100 by the installation portion 103*b* of the filter housing 101.

The circuitry case 193 may be provided on the upper side of the filter case 110. Accordingly, the circuitry 190*a* may be provided on the upper side of the filter case 110.

The circuitry case 193 may include an uppercase 193*a* and a lowercase 193*b*.

Because the circuitry 190*a* is provided on the upper side of the filter case 110, the circuitry 190*a* may be prevented from being damaged by water discharged from the filter case 110.

The circuitry case 193 (193*a* and 193*b*) may include an installation portion (e.g., an opening) for allowing an electrical component (e.g., the cleaning driving device 135, the at least one sensor 181 and 182, and the power cable 109) of the filter apparatus 100 to be connectable to the circuitry 190*a*.

For example, the lower case 193*b* may include at least one opening for allowing the at least one sensor 181 and 182 to be electrically connectable to the circuitry 190*a*.

As another example, the lower case 193*b* may include at least one opening for allowing the cleaning driver 135 to be electrically connectable to the circuitry 190*a*.

As another example, the lower case 193*b* may include at least one opening for allowing the power cable 109 to be electrically connectable to the circuitry 190*a*.

According to various embodiments of the disclosure, the upper case 193*a* may include at least one opening formed to allow the user interface device 197 to be exposed to the outside of the filter housing 101.

For example, the upper case 193*a* may include at least one opening formed to allow the output interface 197*b* to be exposed to the outside of the filter housing 101.

As another example, the upper case 193*a* may include at least one opening formed to allow the input interface 197*a* to be exposed to the outside of the filter housing 101.

According to an embodiment of the disclosure, the output interface 197*b* may be covered by a bracket 197*c*.

Figure 11:
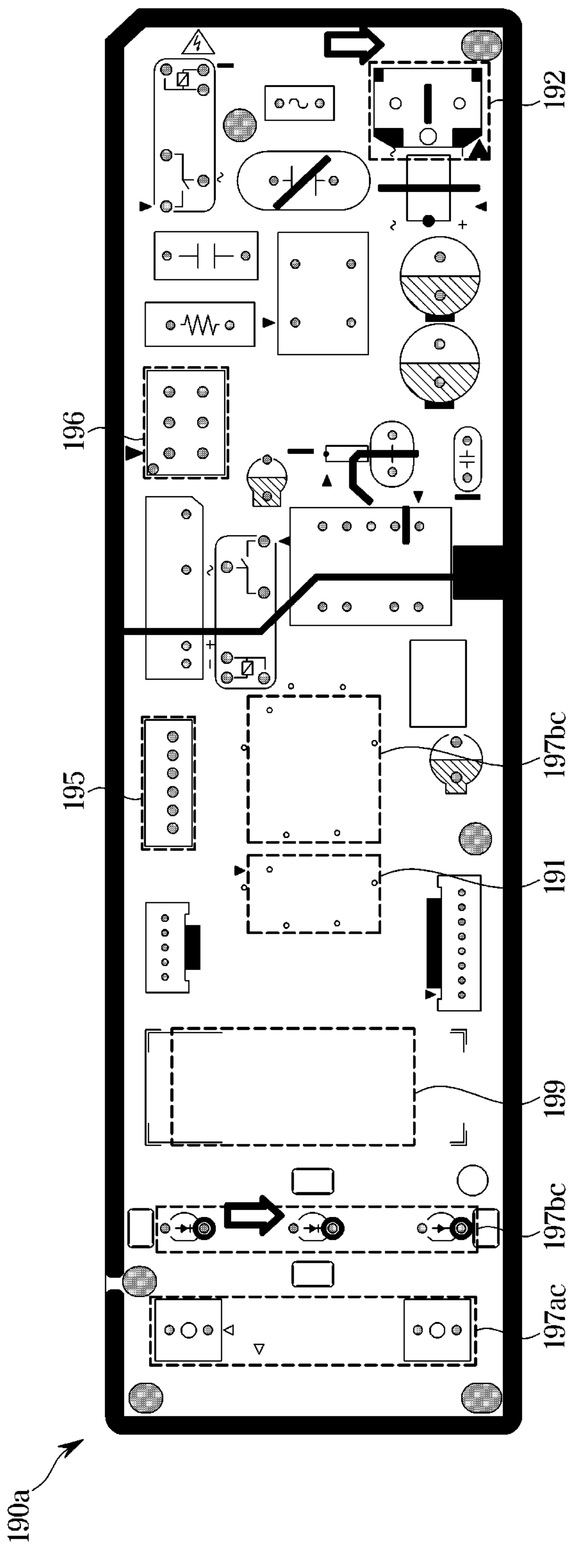
FIG. 11 illustrates circuitry of the filter apparatus according to an embodiment.

FIG. 11 illustrates a circuitry of the filter apparatus according to an embodiment.

Referring to FIG. 11, the circuitry 190*a* according to an embodiment of the disclosure may include a power supply 192 for receiving power, the controller 191 for controlling operations of the filter apparatus 100, a sensor connector 195 to which the at least one sensor 181 and 182 may be coupled, a motor connector 196 to which the cleaning motor 136 may be coupled, an input connector 197*ac* to which the input interface 197*a* may be coupled, an output connector 197*bc* to which the output interface 197*b* may be coupled, and the communicator 199.

The power supply 192 may be connected to an external power source to supply power to the circuitry 190*a*.

According to an embodiment of the disclosure, the power supply 192 may receive power from the external power source through the power cable 109 (see FIG. 8).

According to various embodiments of the disclosure, the filter apparatus 100 may further include a battery (not shown), and the power supply 192 may receive power from the battery.

In the case of the filter apparatus 100 including a battery, the battery may be provided on the rear side of the filter case 110. Also, in the case of the filter apparatus 100 including the battery, the power cable 109 may be omitted, and a port for charging the battery may be exposed to the outside of the filter housing 101. The port for charging the battery may be provided in the housing bracket 104.

However, an example in which the power supply 192 receives power is not limited to the above-described example. For example, in the case of the filter apparatus 100 including a power reception coil, the power supply 192 may receive power from a power transmission coil through the power reception coil.

According to various embodiments of the disclosure, the washing machine 10 according to an embodiment of the disclosure may include a power transmission coil, and when the filter apparatus 100 is installed at a location corresponding to a power transmission coil included in the washing machine 10, the filter apparatus 100 may receive power from the power transmission coil included in the washing machine 10.

The controller 191 may control various components (e.g., the user interface device 197, the cleaning motor 136, and the communicator 199) of the filter apparatus 100. For example, the controller 191 may control the communicator 199 to establish communication with an external device, control the output interface 197*b* to output certain information, or control the cleaning motor 136 to perform a cleaning operation.

The controller 191 may include hardware, such as a CPU, a Micom or a memory, and software, such as a control program. For example, the controller 191 may include at least one memory 191*b* (see FIG. 12) that stores data in the form of an algorithm or program for controlling operations of components in the filter apparatus 100, and at least one processor 191*a* (see FIG. 12) which performs the above-described operations and operations to be described below by using the data stored in the at least one memory 191*b*. The memory 191*b* and the processor 191*a* may be implemented as separate chips. The processor 191*a* may include one, or two or more processor chips, or may include one, or two or more processing cores. The memory 191*b* may include one, or two or more memory chips or may include one, or two or more memory blocks. Also, the memory 191*b* and the processor 191*a* may be implemented as a single chip.

The sensor connector 195 may be connected to the at least one sensor 181 and 182 of the filter apparatus 100 to receive a sensor signal detected by the at least one sensor 181 and 182.

The sensor signal received through the sensor connector 195 may be transmitted to the controller 191.

For example, the sensor connector 195 may receive a sensor signal detected by the filter sensor 181. The filter sensor 181 may output a filter clogging signal in response to an identification that the amount of foreign substances collected in the filter 120 is more than a preset amount.

The controller 191 may receive the filter clogging signal output from the filter sensor 181 through the sensor connector 195.

According to an embodiment of the disclosure, the filter sensor 181 may transmit data about the amount of foreign substances collected in the filter 120 to the controller 191 through the sensor connector 195.

The controller 191 may receive the data related to the amount of foreign substances collected in the filter 120 from the filter sensor 181 through the sensor connector 195, and identify the amount of foreign substances collected in the filter 120 based on the processing of the data. The controller 191 may detect clogging of the filter 120 in response to an identification that the amount of foreign substances collected in the filter 120 is more than the preset amount.

As another example, the sensor connector 195 may receive a sensor signal detected by the water supply sensor 182. The water supply sensor 182 may output a drainage sensing signal in response to a detection of the inflow of water through the case inlet 112*a*.

The controller 191 may receive the drainage sensing signal from the water supply sensor 182 through the sensor connector 195.

The motor connector 196 may be connected to the cleaning motor 136 of the filter cleaning device 130 to transmit an electrical signal to the cleaning motor 136.

The controller 191 may control the cleaning motor 136 connected to the motor connector 196.

According to various embodiments of the disclosure, the circuitry 190*a* may further include a current sensor 133 (see FIG. 12) for measuring a driving current applied to the cleaning motor 136 through the motor connector 196.

The controller 191 may identify a load of the cleaning motor 136 in response to processing of data related to the driving current that is applied to the cleaning motor 136.

The controller 191 may detect clogging of the filter 120 based on the load of the cleaning motor 136. For example, the controller 191 may detect clogging of the filter 120 in response to an identification that the load of the cleaning motor 136 is greater than or equal to a preset load value for a preset period of time while the cleaning motor 136 operates.

That is, the controller 191 may detect clogging of the filter 120 in response to an identification that a value of a driving current applied to the cleaning motor 136 is greater than or equal to a reference value for a preset period of time.

The input connector 197*ac* may be connected to the input interface 197*a* (e.g., a button) to receive an input signal generated by a manipulation of the input interface 197*a*.

For example, the input connector 197*ac* may be electrically connected to the power button, the operation button, and/or the communication button.

An input signal received through the input connector 197*ac* may be transmitted to the controller 191.

For example, a power signal generated in response to pressing of the power button may be transmitted to the controller 191. The controller 191 may supply power supplied from the power supply 192 to various components of the circuitry 190*a* in response to reception of the power signal.

For example, an operation signal generated in response to pressing of the operation button may be transmitted to the controller 191. The controller 191 may drive the cleaning motor 136 in response to reception of the operation signal.

For example, a communication signal generated in response to pressing of the communication button may be transmitted to the controller 191. The controller 191 may activate the communicator 199 in response to reception of the communication signal.

The output connector 197*bc* may be connected to the output interface 197*b* to transmit a control signal to the output interface 197*b*.

The controller 191 may transmit the control signal to the output interface 197*b* through the output connector 197*bc* to control the output interface 197*b* to output visualized information.

The communicator 199 may include at least one of a short-range wireless communication module or a long-range wireless communication module.

The communicator 199 may transmit data to an external device (e.g., the washing machine 10, the server 2, the user device 3 and/or another home appliance) or receive data from an external device. For example, the communicator 199 may establish communication with the washing machine 10, the server 2, the user device 2 and/or the other home appliances and transmit/receive various data to/from the washing machine 10, the server 2, the user device 2 and/or the other home appliances.

For this, the communicator 199 may establish a direct (wired) communication channel or a wireless communication channel with an external electronic device (for example, a server, a user terminal, and/or a home appliance), and support communication through the established communication channel. According to an embodiment of the disclosure, the communicator 199 may include a wireless communicator (for example, a cellular communicator, a short-range wireless communicator, or a global navigation satellite system (GNSS) communicator), or a wired communicator (for example, a local area network (LAN) communicator or a power line communicator). A corresponding communicator among the communicators may communicate with an external electronic device through a first network (for example, a short-range communication network, such as Bluetooth, wireless fidelity (WiFi) direct, or infrared data association (IrDA)) or a second network (for example, a telecommunication network, such as a legacy cellular network, a 5G network, a next-generation communication network, internet, or a computer network (for example, a local area network (LAN) or a WAN). Such various kinds of communicators may be integrated into a component (for example, a single chip) or implemented as a plurality of independent components (for example, a plurality of chips).

A short-range wireless communication module may include a Bluetooth communication module, a Bluetooth Low Energy (BLE) communication module, a near field communication module, a WLAN (Wi-Fi) communication module, a Zigbee communication module, an infrared data association (IrDA) communication module, a Wi-Fi Direct (WFD) communication module, an ultra-wideband (UWB) communication module, an Ant+ communication module, a microwave (uWave) communication module or the like, but is not limited thereto.

The long-range communication module may include a communication module that performs various types of remote communication, and may include a mobile communicator. The mobile communicator transmits and receives radio signals to and from at least one of a base station, an external terminal, and the server 2 on a mobile communication network.

In an embodiment, the communicator 199 may communicate with an external device such as the server, the user device 3, or other home appliance through a nearby wireless access point apparatus. The wireless access point apparatus may connect a LAN to which the washing machine 10 and/or the user device 3 are connected to a WAN to which the server 2 is connected. The filter apparatus 100, the washing machine 10 and/or the user device 3 may be connected to the server 2 through a WAN.

Figure 12:
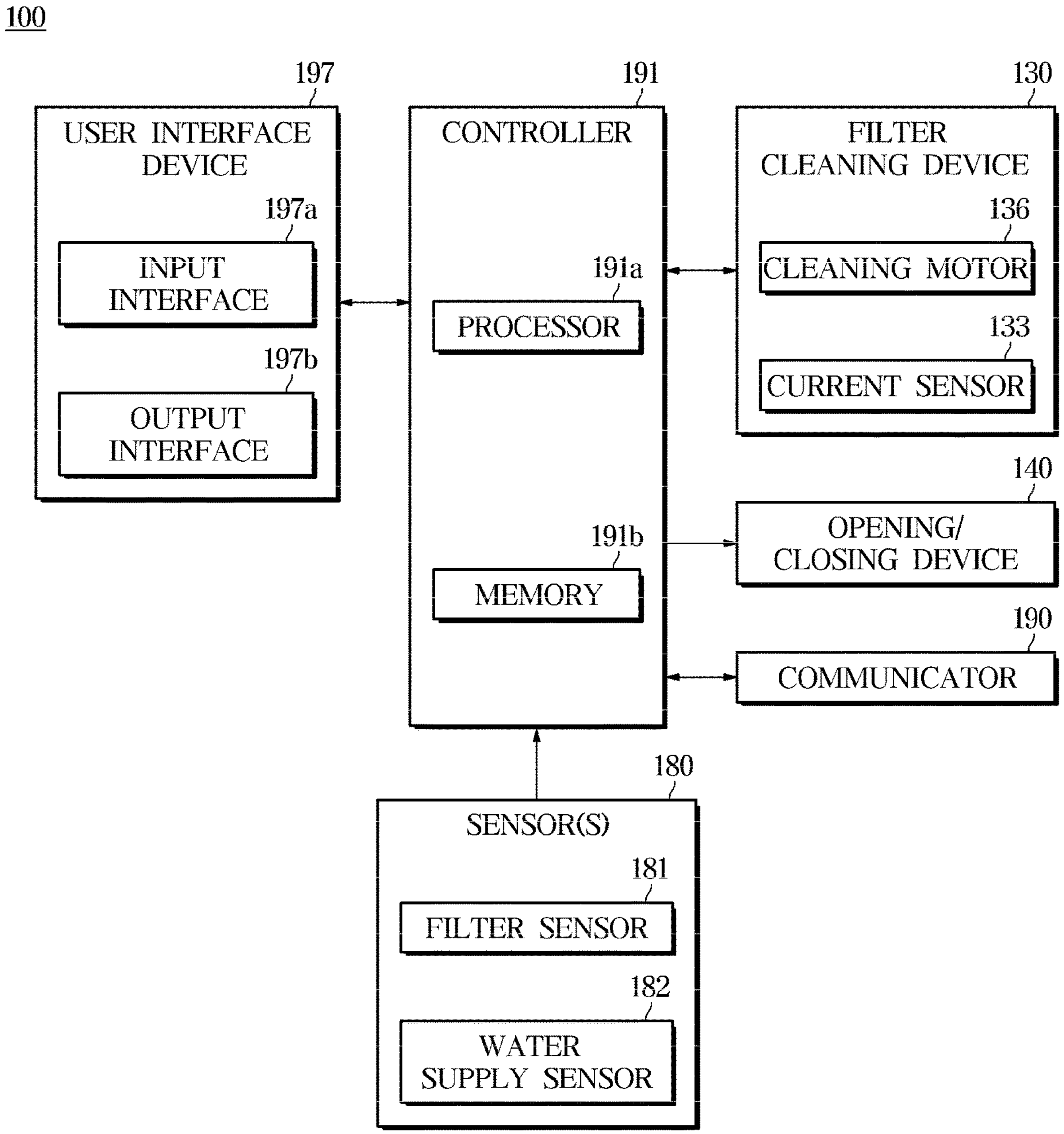
FIG. 12 is a control block diagram of a filter apparatus according to an embodiment.

FIG. 12 is a control block diagram illustrating a filter apparatus according to an embodiment.

Referring to FIG. 12, the filter apparatus 100 may include a user interface device 197, a filter cleaning device 130, an opening/closing device 140, sensor(s) 180, a communicator 199, and a controller 191.

Components of the filter apparats 100 that are identical to those of the above description will be omitted in the following description.

The sensor(s) 180 may include a filter sensor 181 and a water supply sensor 182, and data and/or information obtained by the sensor(s) 180 may be transmitted to the controller 191.

The communicator 199 may transmit information obtained by the filter apparatus 100 to an external device. For example, the communicator 199 may transmit information obtained by the filter apparatus 100 to at least one of the washing machine 10 or the user device 3.

The transmitting of the information obtained by the filter apparatus 100 to at least one of the washing machine 10 or the user device 3 may include directly transmitting the information obtained by the filter apparatus 100 to the washing machine 10 or the user device 3, as well as transmitting the information obtained by the filter apparatus 100 to at least one of the washing machine 10 or the user device 3 through the server 2.

The information obtained by the filter apparatus 100 may include information obtained by the sensor(s) 180 and/or information obtained through the communicator 199.

The information obtained by the filter apparatus 100 may include information obtained by the filter sensor 181, information obtained by the water supply sensor 182, information obtained by the current sensor 133, and/or information obtained from an external device through the communicator 199.

The controller 191 may, in response to the information obtained by the filter apparatus 100 satisfying a predetermined condition, control the communicator 199 to transmit the information obtained by the filter apparatus 100 to the external device.

In an embodiment, the controller 191 may, in response to receiving a control command from the external device through the communicator 199, perform an operation corresponding to the control command.

Figure 13:
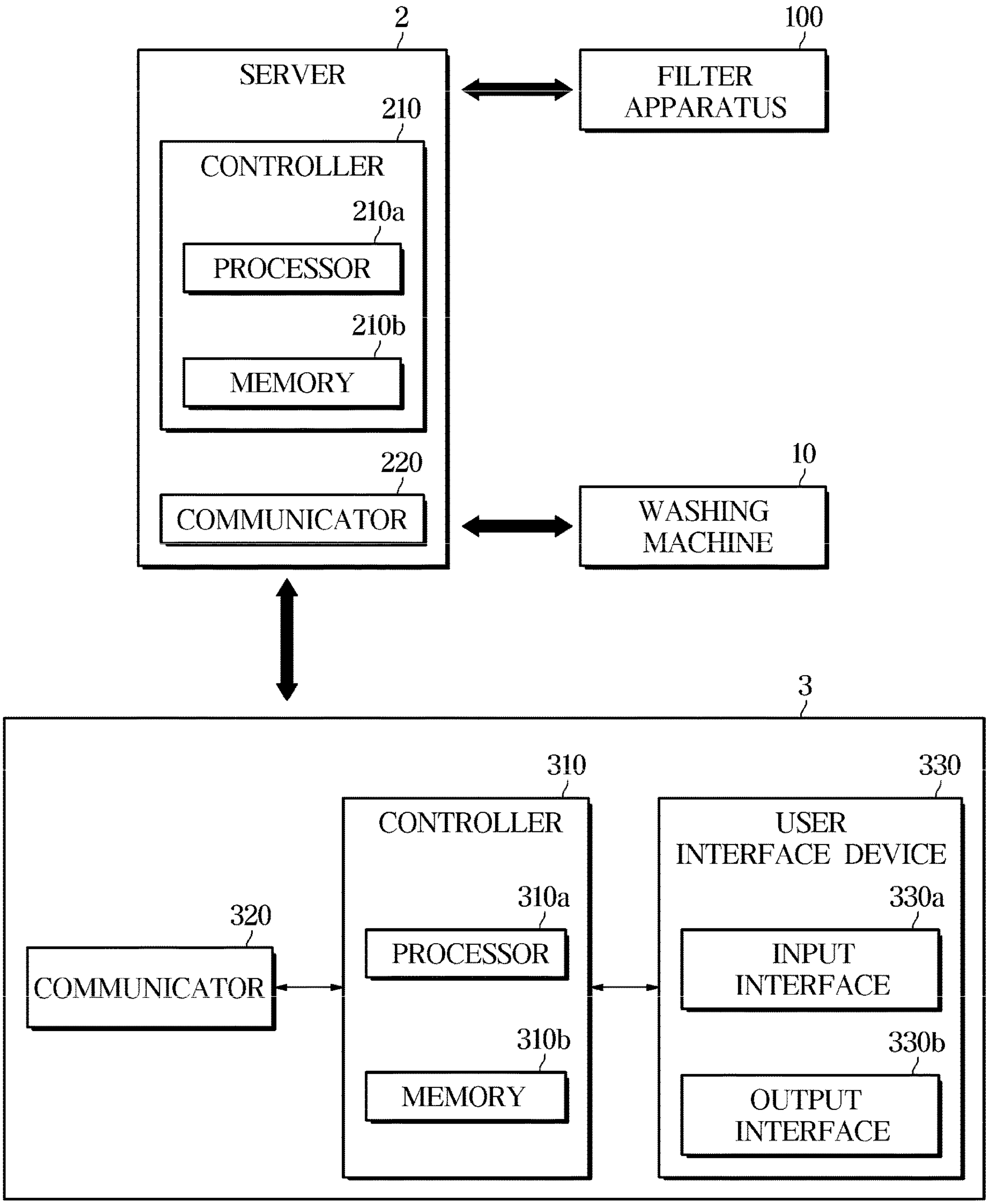
FIG. 13 is a control block diagram of a washing machine, a filter apparatus, a server, and a user device according to an embodiment.

FIG. 13 is a control block diagram illustrating a washing machine, a filter apparatus, a server, and a user device according to an embodiment.

Referring to FIG. 13, a communication system of a filter apparatus 100 according to an embodiment may include a filter apparatus 100 and a washing machine 10.

According to various embodiments, the communication system of the filter apparatus 100 may further include a server 2 and a user device 3.

The configuration of the filter apparatus 100 and the washing machine 10 is the same as that of the above description, and thus details of thereof will be omitted.

The server 2 according to an embodiment may include a controller 210 that control the operation of the server 2 and a communicator 220. The controller 210 may include at least one memory 210*b* that stores data in the form of an algorithm or program for controlling the operation of components in the server 2*a*, and at least one processor 210*a* that performs the above-described operations and operations to be described below using the data stored in at least one memory 210*b* The communicator 220 may include at least one of a short-range communication module and a long-range communication module.

The user device 3 according to an embodiment may include a controller 310 that control the operation of the user device 3, a communicator 320, and a user interface device 330. The controller 310 may include at least one memory 310*b* that stores data in the form of an algorithm or program for controlling the operation of components in the user device 3 and information of the user device 3, at least one processor 310*a* that performs the above-described operations and operations to be described below using the data stored in at least one memory 310*b*.

According to various embodiments, the user device 3 may include all types of electronic devices including at least some of the above-described configuration and configuration to be described below.

For example, the user device 3 may include various electronic devices, for example a smart phone, a laptop computer, a smart watch, an Internet of thing (IoT) hub device, other home appliances, such as televisions, a detachable tablet PC and a speaker.

The communicator 320 may include at least one of a short-range communication module and a long-range communication module.

The user interface device 330 may include an input interface 330*a* and an output interface 330*b*.

The input interface 330*a* may convert sensory information received from the user into an electrical signal.

The output interface 330*b* may transmit various types of information to the user by generating sensory information.

The filter apparatus 100, the washing machine 10, the server 2, and/or the user device 3 may transmit or receive information to or from each other through the respective communicators 96, 199, 220, and 320.

A detailed method of transmitting or receiving information between the filter apparatus 100, the washing machine 10, the server 2, and/or the user device 3 through the respective communicators 96, 199, 220, and 320 will be described below.

According to various embodiments, a user may register user account information in the server 2 through the user device 3. The user account information may include user identification information and/or information about home appliances of the user.

According to various embodiments, the at least one memory 210*b* of the server 2 may store the user account information received from the user device 3.

The at least one memory 210*b* may store information about various devices (e.g., the washing machine 10 and the filter apparatus 100) linked to the user account, and the user may control the various devices linked to the user's account through the user device 3 or may receive information collected from the various devices linked to the user's account.

For example, the user may execute an application for managing a home appliance through the user device 3, and make a connection with the user's account to transmit various control commands to the home appliance linked to the account, or receive various types of information from the home appliance linked to the account.

Figure 14:
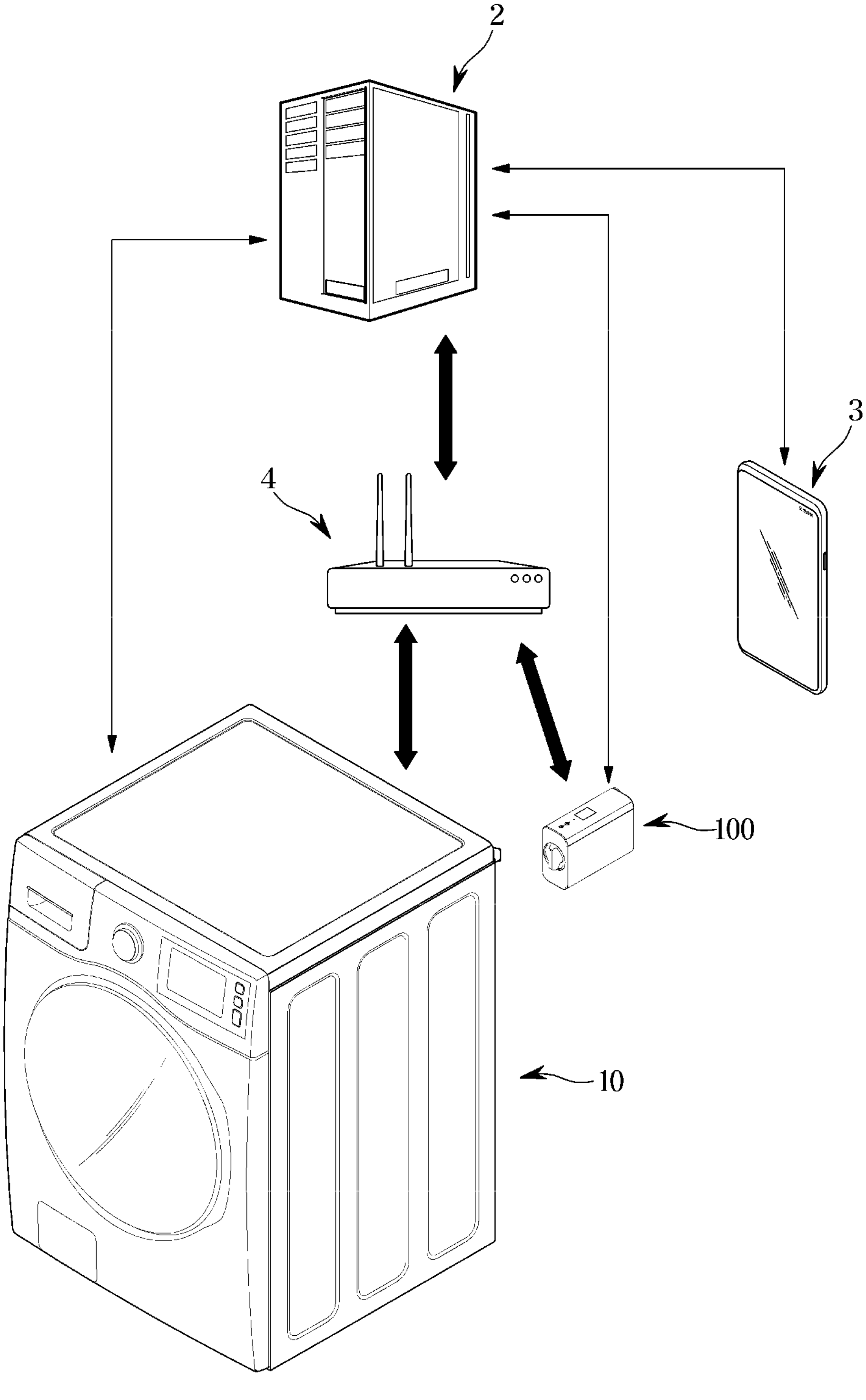
FIG. 14 illustrates an example of a state in which communication is established between a washing machine, a filter apparatus, a server, and a user device according to an embodiment.

FIG. 14 illustrates an example of a state in which communication is established between a washing machine, a filter apparatus, a server, and a user device according to an embodiment.

In an embodiment, the washing machine 10, the filter apparatus 100, and the user device 3 may exchange information with each other via the server 2 through a WAN.

Referring to FIG. 14, a wireless access point apparatus 4 may have a slot that may be connected to a wired communication cable, and may transmit and receive data to and from the server 2 through the wired communication cable.

The washing machine 10 may establish communication with the wireless access point apparatus 4 through the communicator 96 (e.g., a WLAN (Wi-Fi) communication module).

The washing machine 10 may, in response to communication with the wireless access point apparatus 4 being established, communicate with the server 2 through the WAN.

In an embodiment, the washing machine 10 may transmit identification information for identifying the washing machine 10 to the server 2. The identification information for identifying the washing machine 10 may be stored in the memory 92, and include at least one of a serial number of the washing machine 10, an Internet Protocol (IP) address of the washing machine 10, or a media access control (MAC) address of the washing machine 10.

The filter apparatus 100 may establish communication with the wireless access point apparatus 4 through the communicator 199 (e.g., a WLAN (Wi-Fi) communication module).

The filter apparatus 100 may, in response to communication with the access point 4 being established, communicate with the server 2 through the WAN.

In an embodiment, the filter apparatus 100 may transmit identification information for identifying the filter apparatus 100 to the server 2. The identification information for identifying the filter apparatus 100 may be stored in the memory 191*b*, and may include at least one of a serial number of the filter apparatus 100, an IP) address of the filter apparatus 100, or a MAC addresses of the filter apparatus 100.

The communicator 320 (e.g., a WLAN (Wi-Fi) communication module) of the user device 3 may establish communication with the wireless access point apparatus 4, and thus communicate with the server 2 through a WAN.

According to various embodiments, the communicator 320 (e.g., a cellular communication module) of the user device 3 may communicate with the server 2 through a WAN without being connected to the wireless access point apparatus 4.

In response to the user, after executing a predetermined application through the user device 3, making a connection with the user account, communication between the user device 3 and the server 2 may be established in response to In this case, the predetermined application may be an application for managing home appliances.

According to various embodiments, the server 2 may, in response to communication between the user device 3 and the server 2 being established, transmit a communication request message to the washing machine 10 and/or the filter apparatus 100 via the wireless access point apparatus 4.

The washing machine 10 may transmit information to the filter apparatus 100 and/or the user device 3 through the server 2.

For example, the washing machine 10 may transmit predetermined information to the server 2, and the server 2 may transmit the predetermined information to the filter apparatus 100 and/or the user device 3.

The filter apparatus 100 may transmit information to the washing machine 10 and/or the user device 3 through the server 2.

For example, the filter apparatus 100 may transmit predetermined information to the server 2, and the server 2 may transmit the predetermined information to the washing machine 10 and/or the user device 3.

The user device 3 may transmit information to the washing machine 10 and/or the filter apparatus 100 through the server 2.

For example, the user device 3 may transmit predetermined information to the server 2, and the server 2 may transmit the predetermined information to the washing machine 10 and/or the filter apparatus 100. In this case, the predetermined information may include a control command.

According to the disclosure, the filter apparatus 100, the washing machine 10, and/or the user device 3 may transmit or receive various types of information to or from each other with through the server 2.

Figure 15A:
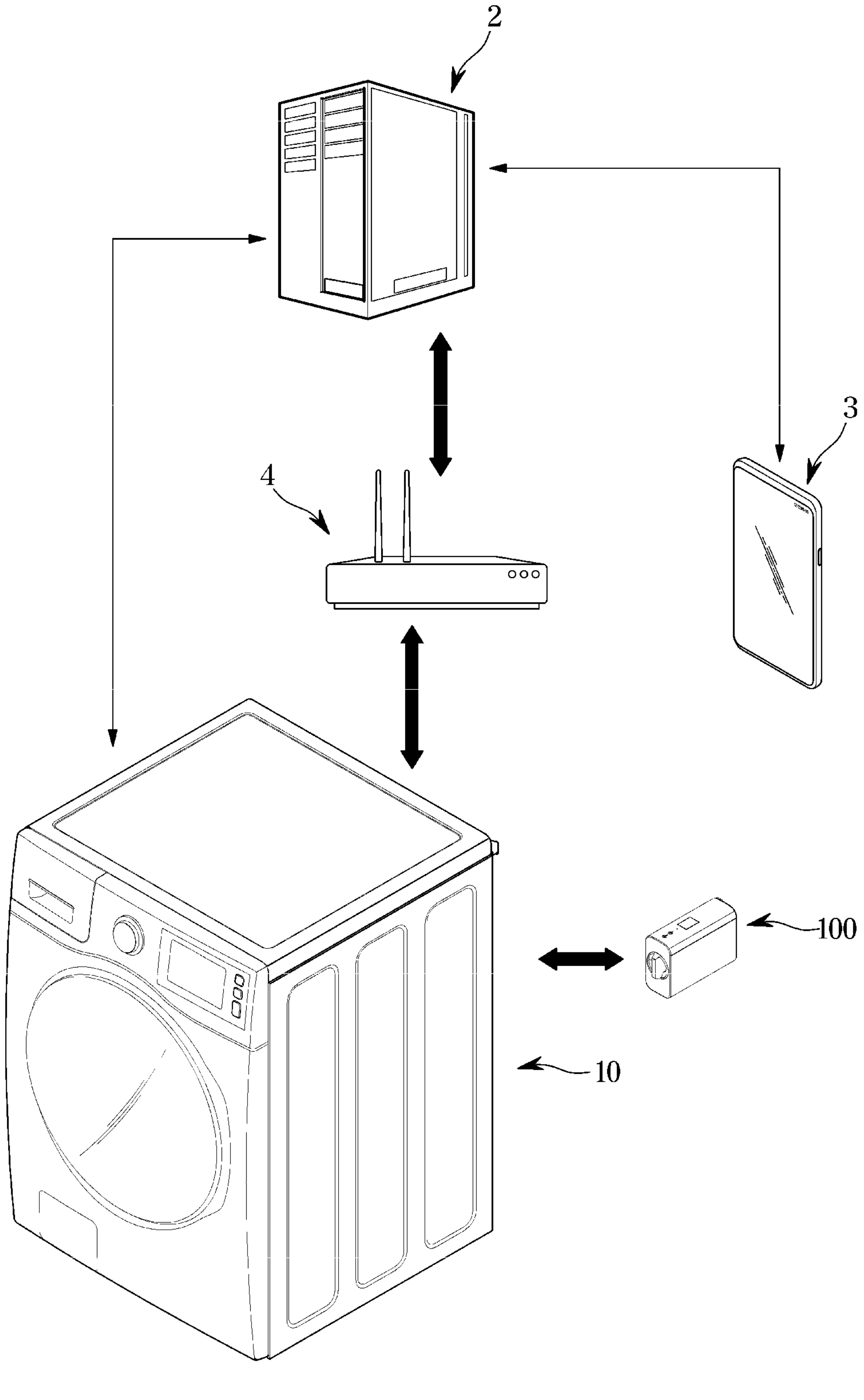
FIG. 15A illustrates an example of a state in which communication is established between a washing machine, a filter apparatus, a server, and a user device according to an embodiment.
Figure 15B:
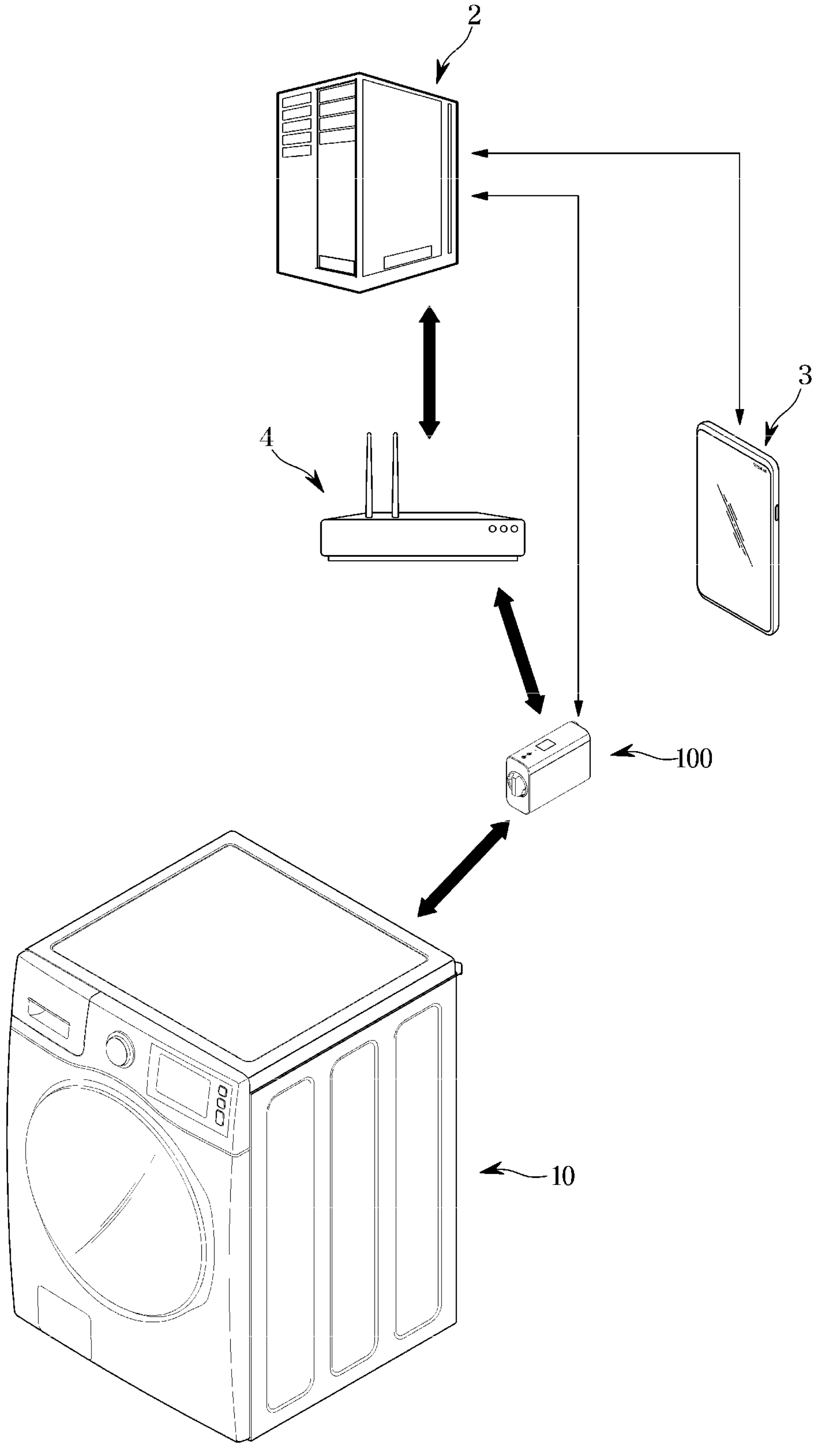
FIG. 15B illustrates an example of a state in which communication is established between a washing machine, a filter apparatus, a server, and a user device according to an embodiment.

FIG. 15A illustrates an example of a state in which communication is established between a washing machine, a filter apparatus, a server, and a user device according to an embodiment. FIG. 15B illustrates an example of a state in which communication is established between a washing machine, a filter apparatus, a server, and a user device according to an embodiment.

In an embodiment, the washing machine 10 and/or the filter apparatus 100 may establish communication with each other through the communicators 96 and 199 (e.g., a Bluetooth communication module or a BLE communication module), and the washing machine 10 and/or the filter apparatus 100 may establish communication with the server 2 through the wireless access point apparatus 4 through the communicator 96 or 199 (e.g., a WLAN (Wi-Fi) communication module).

Referring to FIG. 15A, the washing machine 10 and/or the filter apparatus 100 may establish communication with each other through the communicators 96 and 199 (e.g., a Bluetooth communication module or a BLE communication module).

That is, the filter apparatus 100 may be paired with the communicator 96 (e.g., a Bluetooth communication module or a BLE communication module) of the washing machine 10 through the communicator 199 (e.g., a Bluetooth communication module or a BLE communication module).

In an embodiment, the communicator 96 of the washing machine 10 may include a first communication module (e.g., a Bluetooth communication module or a BLE communication module) for communicating with the communicator 199 of the filter apparatus 100 and a second communication module (e.g., a WLAN (Wi-Fi) communication module) for communicating with the server 2 through the wireless access point apparatus 4.

On the other hand, the communicator 199 of the filter apparatus 100 may include only a first communication module for communicating with the communicator 96 of the washing machine 10.

The washing machine 10 may transmit information to the user device 3 through the server 2.

For example, the washing machine 10 may transmit predetermined information to the server 2 through the second network (e.g., a WAN), and the server 2 may transmit the predetermined information to the user device 3 through the second network. In this case, the predetermined information may be information obtained by the filter apparatus 100.

The filter apparatus 100 may transmit information to the user device 3 through the washing machine 10 and the server 2. That is, the filter apparatus 100 may transmit predetermined information to the user device 3 via the washing machine 10.

For example, the filter apparatus 100 may transmit predetermined information to the washing machine 10 through the first network (e.g., a Bluetooth communication network and/or a BLE communication network), and the washing machine 10 may transmit the predetermined information to the sever 2 through the second network. The server 2 may transmit the predetermined information to the user device 3 through the second network.

The user device 3 may transmit information to the filter apparatus 100 through the server 2 and the washing machine 10. That is, the filter apparatus 100 may receive predetermined information from the user device 3 via the washing machine 10.

For example, the user device 3 may transmit predetermined information to the server 2 through the second network, and the server 2 may transmit the predetermined information to the washing machine 10 through the second network, and the washing machine 10 may transmit the predetermined information to the filter apparatus 100 through the first network.

According to the disclosure, even when the filter apparatus 100 does not have a communication module for using the second network, the filter apparatus 100 may exchange information with the user device 3.

Referring to FIG. 15B, the washing machine 10 and/or the filter apparatus 100 may establish communication with each other through the communicators 96 and 199 (e.g., a Bluetooth communication module or a BLE communication module).

That is, the filter apparatus 100 may be paired with the communicator 96 (e.g., a Bluetooth communication module or a BLE communication module) of the washing machine 10 through the communicator 199 (e.g., a Bluetooth communication module or a BLE communication module).

In an embodiment, the communicator 199 of the filter apparatus 100 may include a first communication module (e.g., a Bluetooth communication module or a BLE communication module) for communicating with the communicator 96 of the washing machine 10 and a second communication module (e.g., a WLAN (Wi-Fi) communication module) for communicating with the server 2 through the wireless access point apparatus 4.

On the other hand, the communicator 96 of the washing machine 10 may include only a first communication module for communicating with the communicator 199 of the filter apparatus 100.

The filter apparatus 100 may transmit information to the user device 3 through the server 2.

For example, the filter apparatus 100 may transmit predetermined information to the server 2 through the second network (e.g., a WAN), and the server 2 may transmit the predetermined information to the user device 3 through the second network. In this case, the predetermined information may be information obtained by the filter apparatus 100.

The washing machine 10 may transmit information to the user device 3 through the filter apparatus 100 and the server 2. That is, the washing machine 10 may transmit predetermined information to the user device 3 via the filter apparatus 100.

For example, the washing machine 10 may transmit predetermined information to the filter apparatus 100 through the first network (e.g., a Bluetooth communication network and/or a BLE communication network), and the filter apparatus 100 may transmit the predetermined information to the sever 2 through the second network, and the server 2 may transmit the predetermined information to the user device 3 through the second network.

The user device 3 may transmit information to the washing machine 10 through the server 2 and the filter apparatus 100. That is, the washing machine 10 may receive predetermined information from the user device 3 via the filter apparatus 100.

For example, the user device 3 may transmit predetermined information to the server 2 through the second network, and the server 2 may transmit the predetermined information to the filter apparatus 100 through the second network, and the filter apparatus 100 may transmit the predetermined information to the washing machine through the first network.

According to the disclosure, even when the washing machine 10 does not have a communication module for using the second network, the washing machine 10 may exchange information with the user device 3.

Figure 16A:
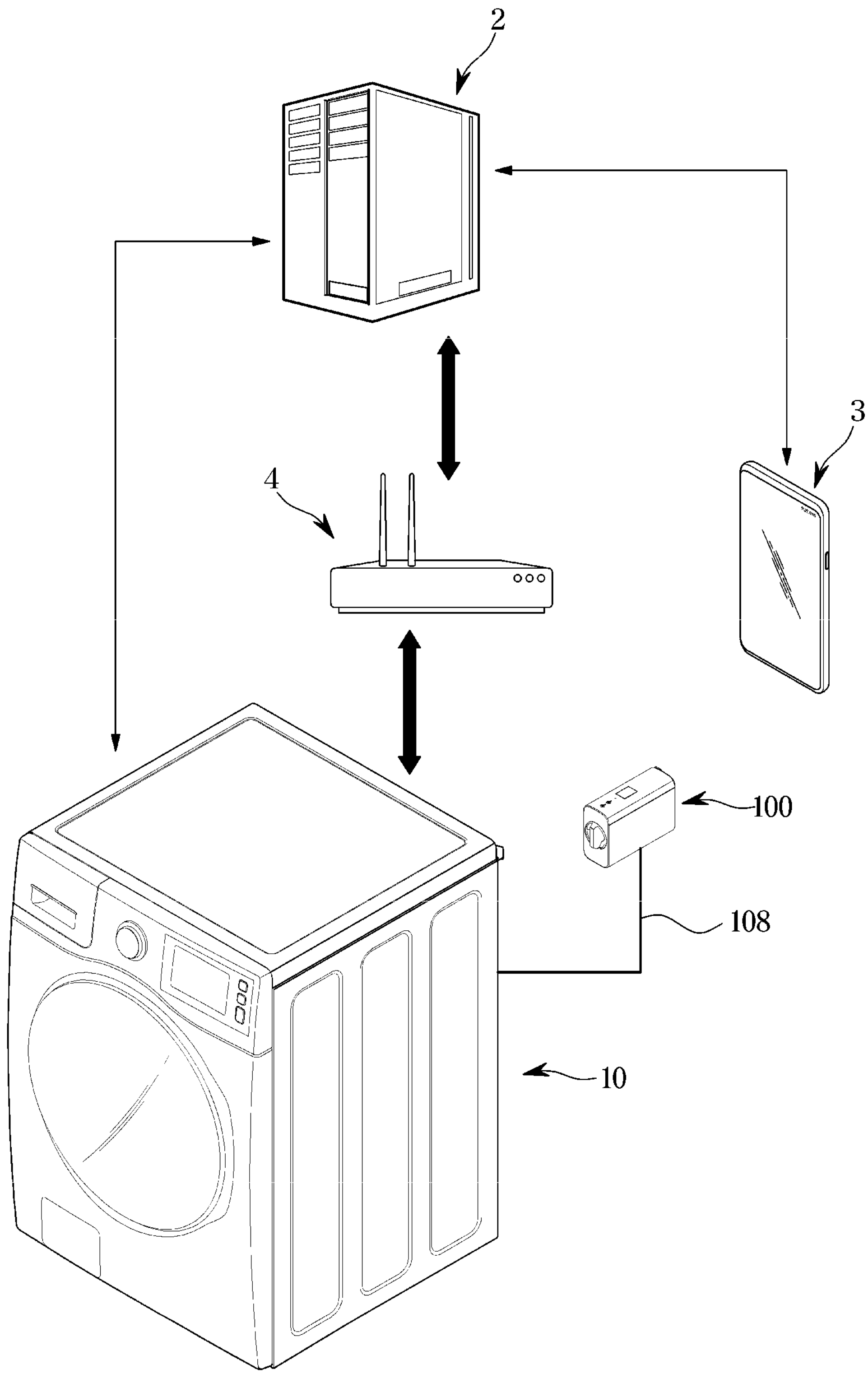
FIG. 16A illustrates an example of a state in which communication is established between a washing machine, a filter apparatus, a server, and a user device according to an embodiment.
Figure 16B:
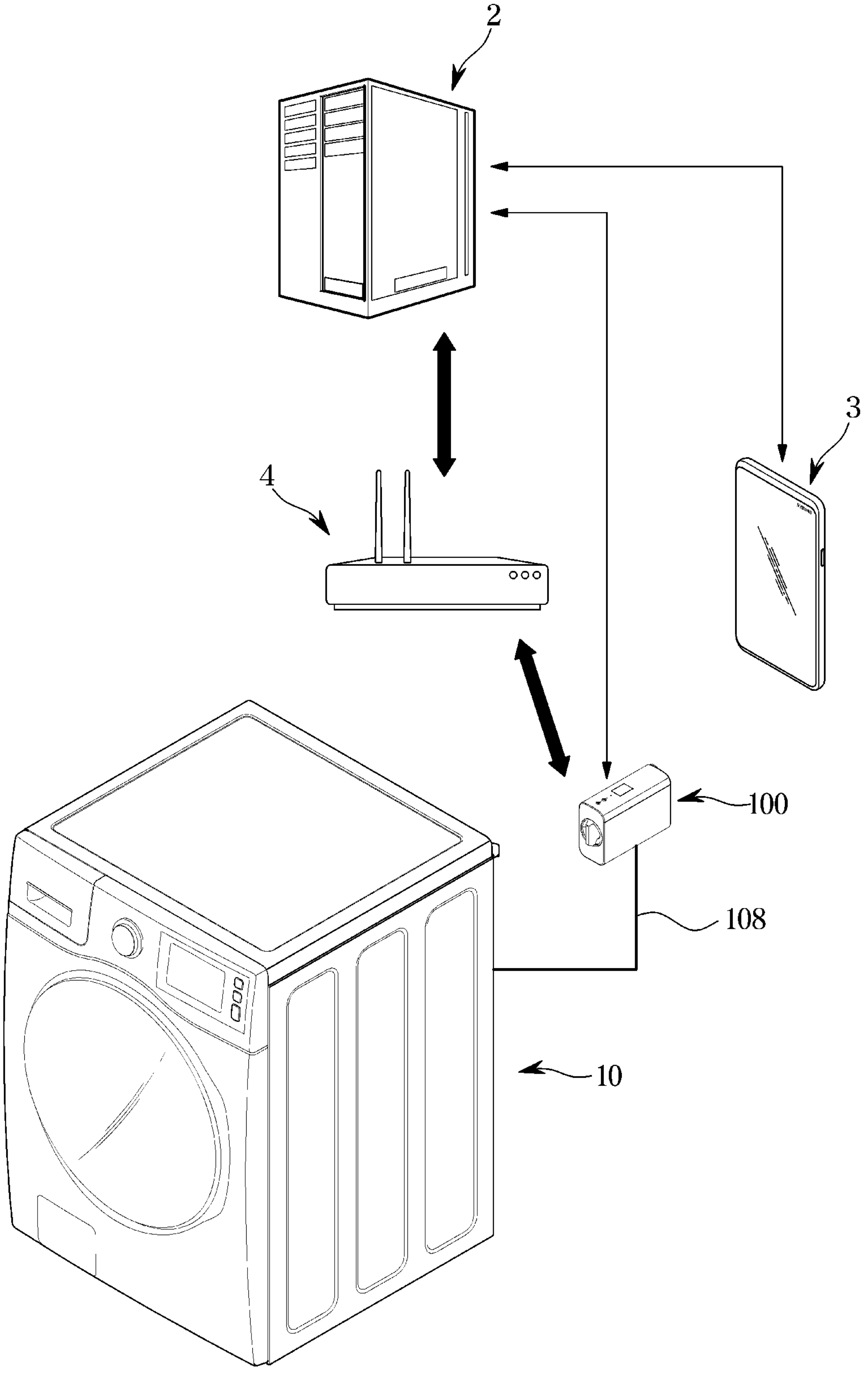
FIG. 16B illustrates an example of a state in which communication is established between a washing machine, a filter apparatus, a server, and a user device according to an embodiment.

FIG. 16A illustrates an example of a state in which communication is established between a washing machine, a filter apparatus, a server, and a user device according to an embodiment. FIG. 16B illustrates an example of a state in which communication is established between a washing machine, a filter apparatus, a server, and a user device according to an embodiment.

In an embodiment, the washing machine 10 and/or the filter apparatus 100 may establish wired communication through the communicators 96 and 199 (e.g., a wired communication module), and the washing machine 10 and/or the filter apparatus 100 may establish communication with the server 2 through the wireless access point apparatus 4 by the communicator 96 or 199 (e.g., a WLAN (Wi-Fi) communication module).

Referring to FIG. 16A, the washing machine 10 and/or the filter apparatus 100 may establish communication with each other through communicators 96 and 199 (e.g., a wired communication module).

That is, the filter apparatus 100 and the washing machine 10 may be connected to each other by wire.

In an embodiment, the communicator 96 of the washing machine 10 may include a third communication module (e.g., a wired communication module) for communicating with the communicator 199 of the filter apparatus 100 by wire and a second communication module (e.g., a WLAN (Wi-Fi) module) for communicating with the server 2 through the wireless access point apparatus 4.

On the other hand, the communicator 199 of the filter apparatus 100 may include only a third communication module for communicating with the communicator 96 of the washing machine 10 by wire.

The washing machine 10 may transmit information to the user device 3 through the server 2.

For example, the washing machine 10 may transmit predetermined information to the server 2 through the second network (e.g., a WAN), and the server 2 may transmit the predetermined information through the second network to the user device 3. In this case, the predetermined information may be information obtained by the filter apparatus 100.

The filter apparatus 100 may transmit information to the user device 3 through the washing machine 10 and the server 2. That is, the filter apparatus 100 may transmit predetermined information to the user device 3 via the washing machine 10.

For example, the filter apparatus 100 may transmit predetermined information to the washing machine 10 through a wired communication network, and the washing machine 10 may transmit the predetermined information to the server 2 through the second network, and the server 2 may transmit the predetermined information to the user device 3 through the second network.

The user device 3 may transmit information to the filter apparatus 100 through the server 2 and the washing machine 10. That is, the filter apparatus 100 may receive predetermined information from the user device 3 via the washing machine 10.

For example, the user device 3 may transmit predetermined information to the server 2 through the second network, and the server 2 may transmit the predetermined information to the washing machine 10 through the second network. The washing machine 10 may transmit the predetermined information to the filter apparatus 100 through the wired communication network.

According to the disclosure, even when the filter apparatus 100 does not have a communication module for using the second network, the filter apparatus 100 may transmit or receive information to or from the user device 3 through the wired communication network.

Referring to FIG. 16B, the washing machine 10 and/or the filter apparatus 100 may establish communication with each other through communicators 96 and 199 (e.g., a wired communication module).

That is, the filter apparatus 100 and the washing machine 10 may be connected to each other by wire.

In an embodiment, the communicator 199 of the filter apparatus 100 may include a third communication module (e.g., a wired communication module) for communicating with the communicator 96 of the washing machine 10 by wire and a second communication module (e.g., a WLAN (Wi-Fi) module) for communicating with the server 2 through the wireless access point apparatus 4.

On the other hand, the communicator 96 of the washing machine 10 may include only a third communication module for communicating with the communicator 199 of the filter apparatus 100.

The filter apparatus 100 may transmit information to the user device 3 through the server 2.

For example, the filter apparatus 100 may transmit predetermined information to the server 2 through a second network (e.g., a WAN), and the server 2 may transmit the predetermined information to the user device 3 through the second network. In this case, the predetermined information may be information obtained by the filter apparatus 100.

The washing machine 10 may transmit information to the user device 3 through the filer apparatus 100 and the server 2. That is, the washing machine 10 may transmit predetermined information to the user device 3 via the filter apparatus 100.

For example, the washing machine 10 may transmit predetermined information to the filter apparatus 100 through a wired communication network, and the filter apparatus 100 may transmit the predetermined information to the server 2 through the second network, and the server 2 may transmit the predetermined information to the user device 3 through the second network.

The user device 3 may transmit information to the washing machine 10 through the server 2 and the filter apparatus 100. That is, the washing machine 10 may receive predetermined information from the user device 3 via the filter apparatus 100.

For example, the user device 3 may transmit predetermined information to the server 2 through the second network, and the server 2 may transmit the predetermined information to the filter apparatus 100 through the second network. The filter apparatus 100 may transmit the predetermined information to the washing machine 10 through the wired communication network.

According to the disclosure, even when the washing machine 10 does not have a communication module for using the second network, the washing machine 100 may transmit or receive information to or from the user device 3 through the wired communication.

Figure 17:
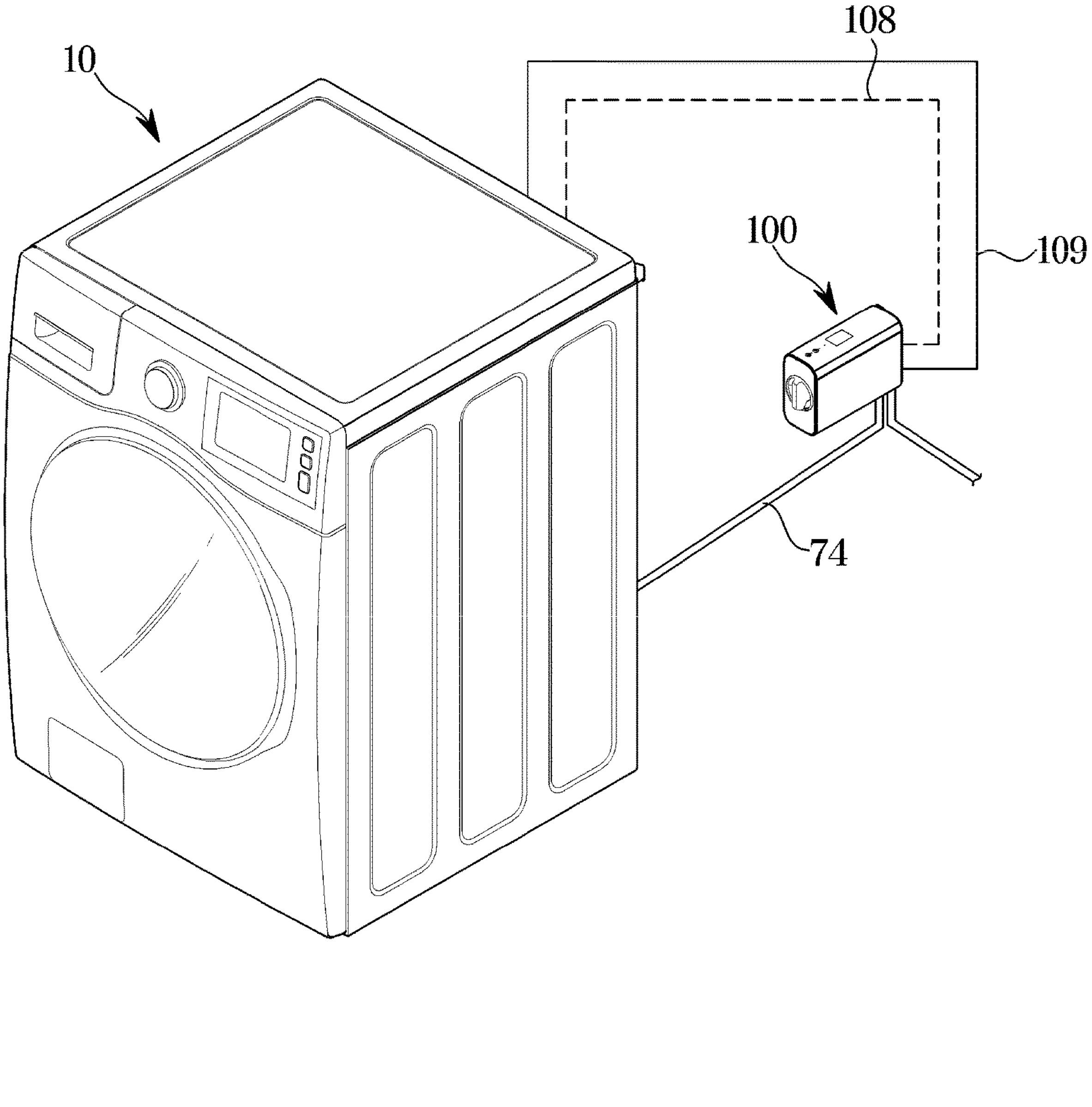
FIG. 17 illustrates a state in which a washing machine and a filter apparatus are connected by wire according to an embodiment.

FIG. 17 illustrates a state in which a washing machine and a filter apparatus are connected by wire according to an embodiment.

Referring to FIG. 17, the filter apparatus 100 may include a connector 108 for communicating with the user device 3 and a power cable 109 for receiving power from an external power source.

According to various embodiments, the connector 108 may be connected to the washing machine 10.

As the connector 108 is connected to the washing machine 10, wired communication between the filter apparatus 100 and the washing machine 10 may be established.

In an embodiment, the communicators 96 and 199 may include a wired communication module for forming a wired communication network.

According to various embodiments, the power cable 109 may be connected to an outlet or connected to the washing machine 10.

When the power cable 109 is connected to the washing machine 10, the filter apparatus 100 may receive power from the power supply device of the washing machine 10.

When the power cable 109 is connected to the outlet, the filter apparatus 100 may receive external power.

Figure 18:
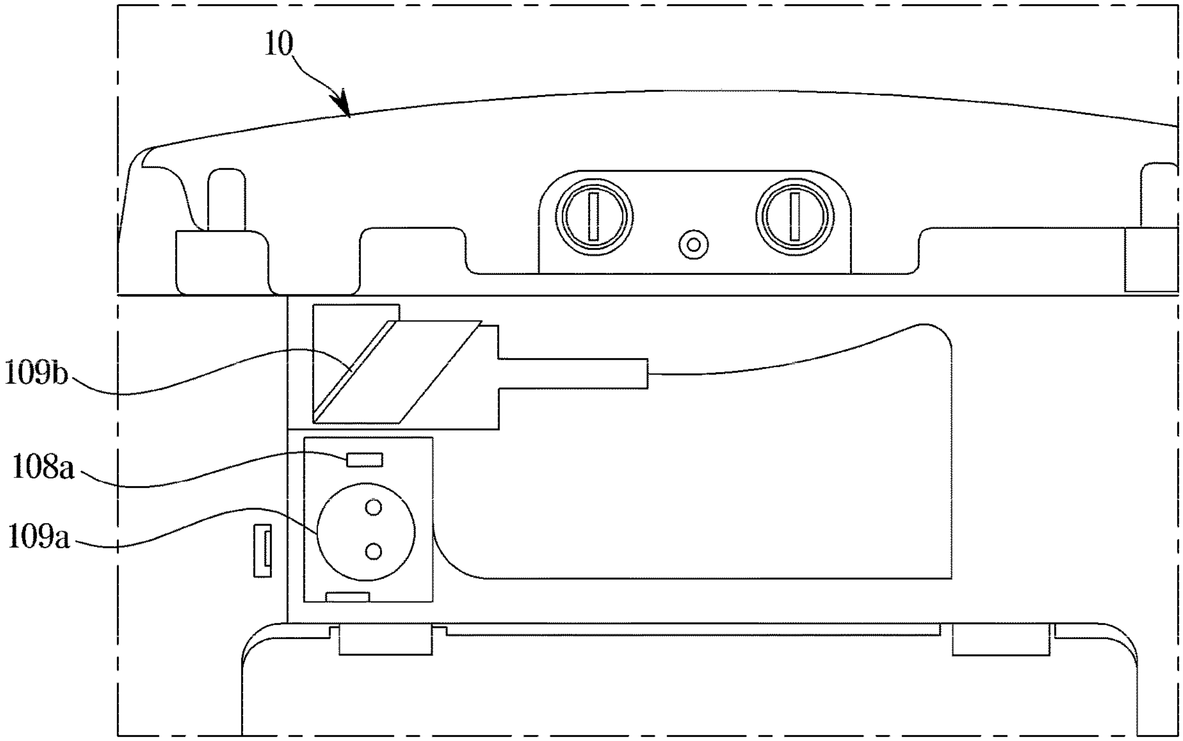
FIG. 18 illustrates a connection portion formed in a washing machine according to an embodiment.

FIG. 18 illustrates a connection portion formed in a washing machine according to an embodiment.

Referring to FIG. 18, the washing machine 10 according to an embodiment may include a communication socket 108*a* and/or a power socket 109*a*.

The communication socket 108*a* and/or the power socket 109*a* may be installed in a hole provided on the rear side of the washing machine 10, and the hole may be opened and closed by a cover 109*b*.

According to various embodiments, the communication socket 108*a* and/or the power socket 109*a* may be provided on the washing machine housing 11.

For example, the communication socket 108*a* and/or the power socket 109*a* may be provided on the rear side of the washing machine housing 11.

In response to the connector 108 being inserted into the communication socket 108*a*, a wired communication network may be formed between the filter apparatus 100 and the washing machine 10.

That is, in response to the connector 108 being inserted into the communication socket 108*a*, the communicator 96 of the washing machine 10 and the communicator 199 of the filter apparatus 100 may exchange various types of information by wire with each other.

In response to the power cable 109 being inserted into the power socket 109*a*, the filter apparatus 100 may receive power from the washing machine 10.

That is, in response to the power cable 109 being inserted into the power socket 109*a*, the power supply device of the washing machine 10 may supply power to the filter apparatus 100.

According to the disclosure, since a separate outlet for supplying power to the filter apparatus 100 is not required, user convenience may be promoted.

Also, according to the disclosure, the filter apparatus 100 and the washing machine 10 may exchange information with each other through wired communication.

According to various embodiments, each of the washing machine 10 and the filter apparatus 100 may include a various types of communication modules.

For example, the washing machine 10 may include the first communication module and the second communication module, and the filter apparatus 100 may include only the first communication module.

Conversely, the filter apparatus 100 may include the first communication module and the second communication module, and the washing machine 10 may include only the first communication module.

As another example, the washing machine 10 may include the second communication module and the third communication module, and the filter apparatus 100 may include only the third communication module.

Conversely, the filter apparatus 100 may include the second communication module and the third communication module, and the washing machine 10 may include only the third communication module.

As another example, the washing machine 10 may include the second communication module and the third communication module, and the filter apparatus 100 may include only the third communication module.

According to various embodiments, each of the washing machine 10 and the filter apparatus 100 may include the first communication module and/or the third communication module.

Figure 19:
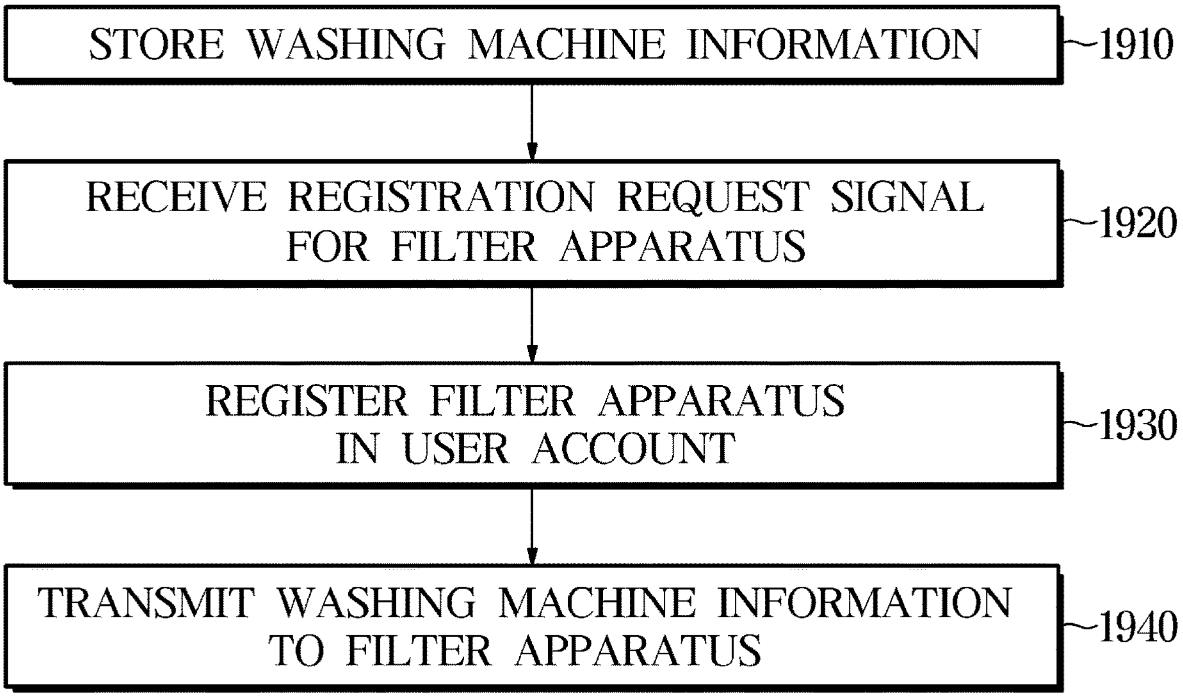
FIG. 19 is a flowchart showing an example of a method of managing a filter apparatus according to an embodiment.

FIG. 19 is a flowchart showing an example of a method of managing a filter apparatus according to an embodiment.

Referring to FIG. 19, the server 2 may store information about the washing machine 10 (1910).

The information about the washing machine 10 may include various types of information for identifying the washing machine 10. For example, the information about the washing machine 10 may include a model name and/or an identification number (e.g., a serial number) of the washing machine 10.

In an embodiment, the server 2 may directly receive the information about the washing machine 10 from the washing machine 10 through communication with the washing machine 10, and may store the information about the washing machine 10 received from the washing machine 10.

In an embodiment, the server 2 may receive information about the washing machine 10 from the user device 3 through communication with the user device 3, and store the information about the washing machine 10 received from the user device 3.

In an embodiment, the server 2 may establish communication with the washing machine 10, and the washing machine 10 may, based on the communication being established with the server 2, transmit a registration request signal for the washing machine 10 including information about the washing machine 10 to the server 2.

The server 2 may register the washing machine 10 in the user account, and store the information about the washing machine 10. The registering the washing machine 10 in the user account may include registering the washing machine 10 in association with the user account. The registering the washing machine 10 in association with the user account may include registering the information about the washing machine 10 in the server 2 so that user account information registered in the server 2 and the information about the washing machine 10 to be linked with each other.

According to various embodiments, operation 1910 of storing information about the washing machine 10 by the server 2 may be performed after operation 1920. The server 2 may receive a registration request signal for the filter apparatus 100 (1920).

In an embodiment, the filter apparatus 100 may, in response to communication being established with the server 2, transmit a registration request signal for the filter apparatus 100 to the server 2. The registration request signal for the filter apparatus 100 may include information about the filter apparatus 100.

As will be described below, the filter apparatus 100 may, after establishing communication with the user device 3, receive identification information (e.g., a password of the wireless access point apparatus 4 and an internet protocol address of the wireless access point apparatus 4) of the wireless access point apparatus 4 from the user device 3, and establish communication with the server 2 through the wireless access point apparatus 4 based on the identification information of the wireless access point apparatus 4.

As described above, the information about the filter apparatus 100 may include various pieces of information for identifying the filter apparatus 100. For example, the information about the filter apparatus 100 may include a model name and/or an identification number (e.g., a serial number) of the filter apparatus 100. The information about the filter apparatus may include an IP address of the filter apparatus 100 and/or a MAC address of the filter apparatus 100.

According to various embodiments, the washing machine 10 may transmit a registration request signal for the filter apparatus 100 to the server 2 based on communication being established with the server 2.

For example, the washing machine 10 may receive information about the filter apparatus 100 from the filter apparatus 100 using the first communication module and/or the third communication module, and may transmit a registration request signal for the filter apparatus 100 including the information ABOUT the filter apparatus 100 to the server 2 using the second communication module.

The server 2 may, in response to the registration request signal for the filter apparatus 100 being received, register the filter apparatus 100 in the user account (1930).

The registering the filter apparatus 100 in the user account may include registering the filter apparatus 100 in association with the user account. The registering the filter apparatus 100 in association with the user account may include registering the information about the filter apparatus 100 in the server 2 so that user account information registered in the server 2 and the information about the filter apparatus 100 to be linked with each other.

According to the disclosure, since the filter apparatus 100 is registered in the server 2 to be linked with the user account, the filter apparatus 100 may be easily managed.

The server 2 may, based on the filter apparatus 100 being registered in the user account, transmit information about the washing machine 10 to the filter apparatus 100 (1940).

In an embodiment, the transmitting of the information about the washing machine 10 to the filter apparatus 100 may include transmitting, by the server 2, the information about the washing machine 10 to the filter apparatus 100 through the second communication network.

As will be described below, the filter apparatus 100 may modify the operation algorithm of the filter apparatus 100 using the information about the washing machine 10 received from the server 2.

According to the disclosure, the filter apparatus 100 may perform an optimized filtering operation based on the information about the washing machine 10.

Figure 20:
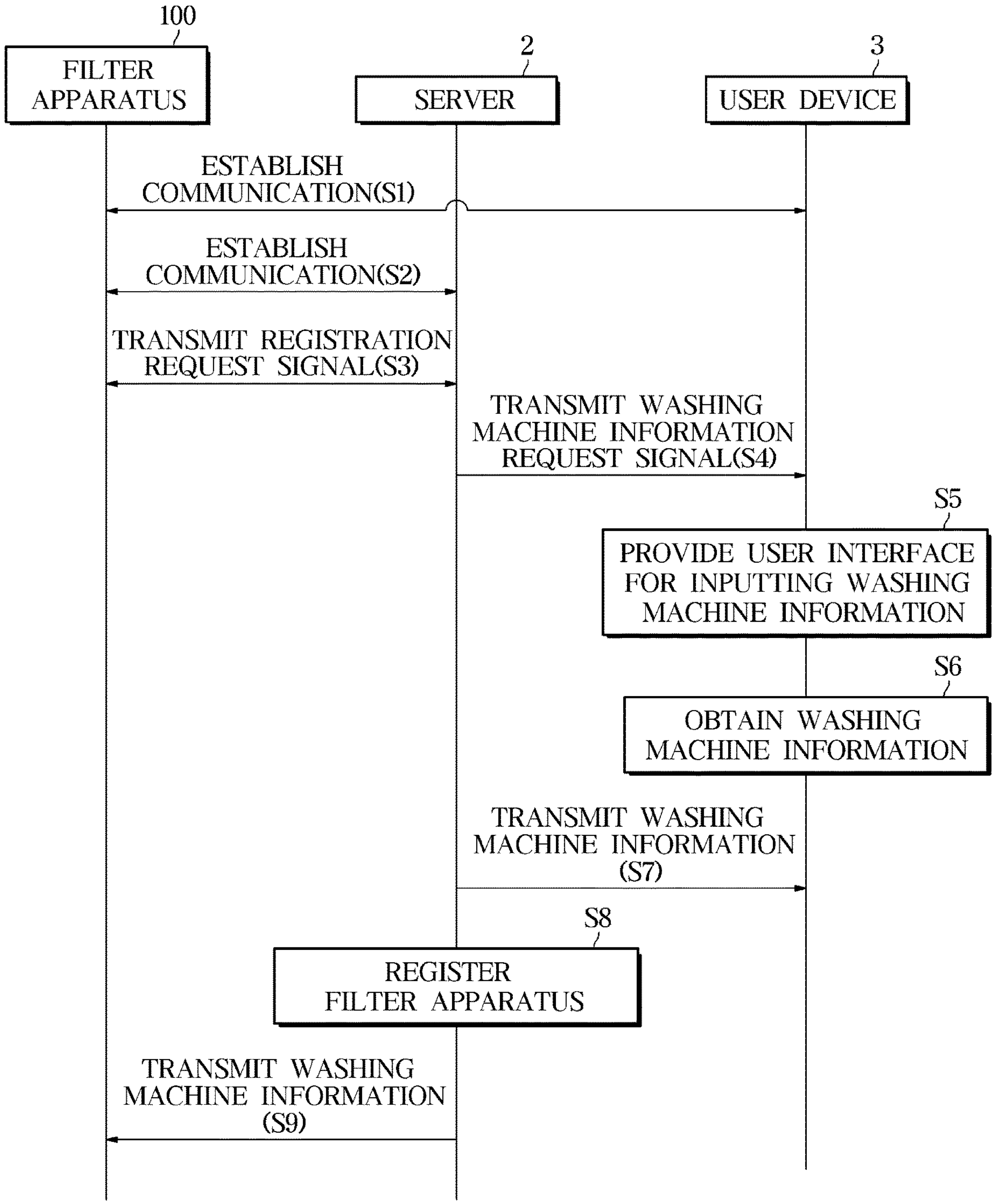
FIG. 20 is a flowchart showing an example of a method of registering a filter apparatus in a server according to an embodiment.

FIG. 20 is a flowchart showing an example of a method of registering a filter apparatus in a server according to an embodiment.

Referring to FIG. 20, communication between the filter apparatus 100 and the user device 3 may be established (S1).

According to various embodiments, the filter apparatus 100 and the user device 3 may communicate with each other through the first communication module, the second communication module, and/or the third communication module.

For example, the filter apparatus 100 may operate in a soft access point (Soft AP) mode using the second communication module (e.g., a Wi-Fi direct communication module).

The soft access point mode may be a mode capable of establishing Device to Device (D2D) communication with an external device through a second communication module.

As the filter apparatus 100 operates in the soft access point mode, the filter apparatus 100 may establish communication with the user equipment 3.

As another example, the filter apparatus 100 may establish communication with the user device 3 using the first communication module (e.g., a Bluetooth communication module or a BLE communication module).

When a user desires to register the filter apparatus 100 in the server 2, the user may execute a predetermined application (e.g., an application for managing home appliances) through the user device 3.

Based on the execution of the predetermined application, the user device 3 may provide a user interface for registering home appliances.

The user interface for registering home appliances may include an element for activating a communication module to establish communication with the filter apparatus 100.

The user may operate the filter apparatus 100 in a soft access point mode using at least one input interface 197*a* (e.g., a communication button) of the filter apparatus 100. Upon selecting, by the user, the element for activating the communication module through the user device 3 while the filter apparatus 100 operates in a soft access point mode, communication between the filter apparatus 100 and the user device 3 may be established.

According to various embodiments, a user may activate the first communication module (e.g., a Bluetooth communication module or a BLE communication) of the filter apparatus 100 using at least one input interface 197*a* (e.g., a communication button) of the filter apparatus 100. Upon selecting, by the user, the element for activating the communication module through the user device 3 while the first communication module of the filter apparatus 100 is activated, communication between the filter apparatus 100 and the user device 3 may be established.

The user device 3 may, in response to communication being established with the filter apparatus 100, transmit access point information for connecting to the wireless access point apparatus 4 to the filter apparatus 100.

The access point information may include at least one of an identification number of the wireless access point apparatus 4, a password of the wireless access point apparatus 4, an IP address of the wireless access point apparatus 4, and a mac address of the wireless access point apparatus 4.

In addition, the access point information may further include at least one of an IP address) of the server 2 and a mac address of the server 2.

The filter apparatus 100 may establish communication with the wireless access point apparatus 4 based on the access point information received from the user device 3, and may establish communication with the server 2 through the wireless access point apparatus 4 (S2).

The filter apparatus 100 may establish communication with the server 2 via a WAN.

The filter apparatus 100 may transmit a registration request signal for the filter apparatus 100 to the server 2 through a WAN (S3).

The filter apparatus 100 may, based on communication being established with the wireless access point apparatus 4, transmit the registration request signal for the filter apparatus 100 to the server 2.

That is, the filter apparatus 100 may, in response to communication with the server 2 being established through the wireless access point apparatus 4, transmit the registration request signal for the filter apparatus 100 to the server 2.

The registration request signal for the filter apparatus 100 may include information about the filter apparatus 100.

The server 2 may, based on the registration request signal for the filter apparatus 100 being received from the filter apparatus 100, transmit a washing machine information request signal to the user device 3 (S4).

According to various embodiments, the server 2 may register the filter apparatus 100 in the user account based on the registration request signal for the filter apparatus 100 being received from the filter apparatus 100 (S8).

In an embodiment, the user device 3 may, in response to the washing machine information request signal being received while a predetermined application is running, provide a user interface for inputting information about the washing machine 10 (S5).

The user interface for inputting the information about the washing machine 10 may include at least one of an interface for guiding photographing of an identification code (e.g., a QR code, a barcode, etc.) of the washing machine 10, an interface for guiding photographing of identification information (e.g., an identification information written sticker, etc.) of the washing machine 10, an interface for guiding direct input of identification information of the washing machine 10 through the input interface 330*a*, an interface for inducing change in communication settings to establish communication with the washing machine 10, and an interface for inducing selection one of at least one washing machine 10 pre-registered in the server 2.

The user device 3 may obtain information about the washing machine 10 through electrical components (e.g., the input interface 330*a*, a camera, etc.) of the user device 3 (S6).

For example, the user device 3 may obtain information about the washing machine 10 by photographing a visual indicator (e.g., a QR code, a barcode, description of identification information) representing the information about the washing machine 10 using a camera.

As another example, the user device 3 may obtain information about the washing machine 10 based on text input through the input interface 330*a*.

The user device 3 may transmit the obtained information about the washing machine 10 to the server 2 (S7).

In an embodiment, the server 2 may register the filter apparatus 100 based on the information about the washing machine 10 received from the user device 3 (S8).

The server 2 may register the filter apparatus 100 in the user account such that the information about the filter apparatus 100 matches the information about the washing machine 10.

That is, the server 2 may identify that the washing machine 10 corresponding to the information about the washing machine 10 received from the user device 3 is connected to the filter apparatus 100.

The server 2 may, based on the filter apparatus 100 being registered in the user account, transmit information about the washing machine 10 to the filter apparatus 100 (S9).

According to various embodiments, the server 2 may in response to the filter apparatus 100 being registered in the user account, transmit information about the washing machine 10 to the filter apparatus 100.

According to various embodiments, the server 2 may, in response to a wash cycle start signal being received from the washing machine 1 while the filter apparatus 100 is registered in the user account, transmit information about the washing machine 10 to the filter apparatus 100.

According to the disclosure, since the server 2 registers the washing machine 10 and the filter apparatus 100 to match each other and transmits information of the matched washing machine 10 to the filter apparatus 100, the filter apparatus 100 may be allowed to identify the washing machine 10 connected thereto.

In addition, according to the disclosure, the filter apparatus 100 may set an optimal operation algorithm based on the information about the washing machine 10 connected thereto.

Further, according to the disclosure, the server 2 may, in response to predetermined information being received from the washing machine 10, transmit the predetermined information to the filter apparatus 100 stored to match the washing machine 10.

That is, according to the disclosure, manageability of the filter apparatus 100 may be improved.

Figure 21:
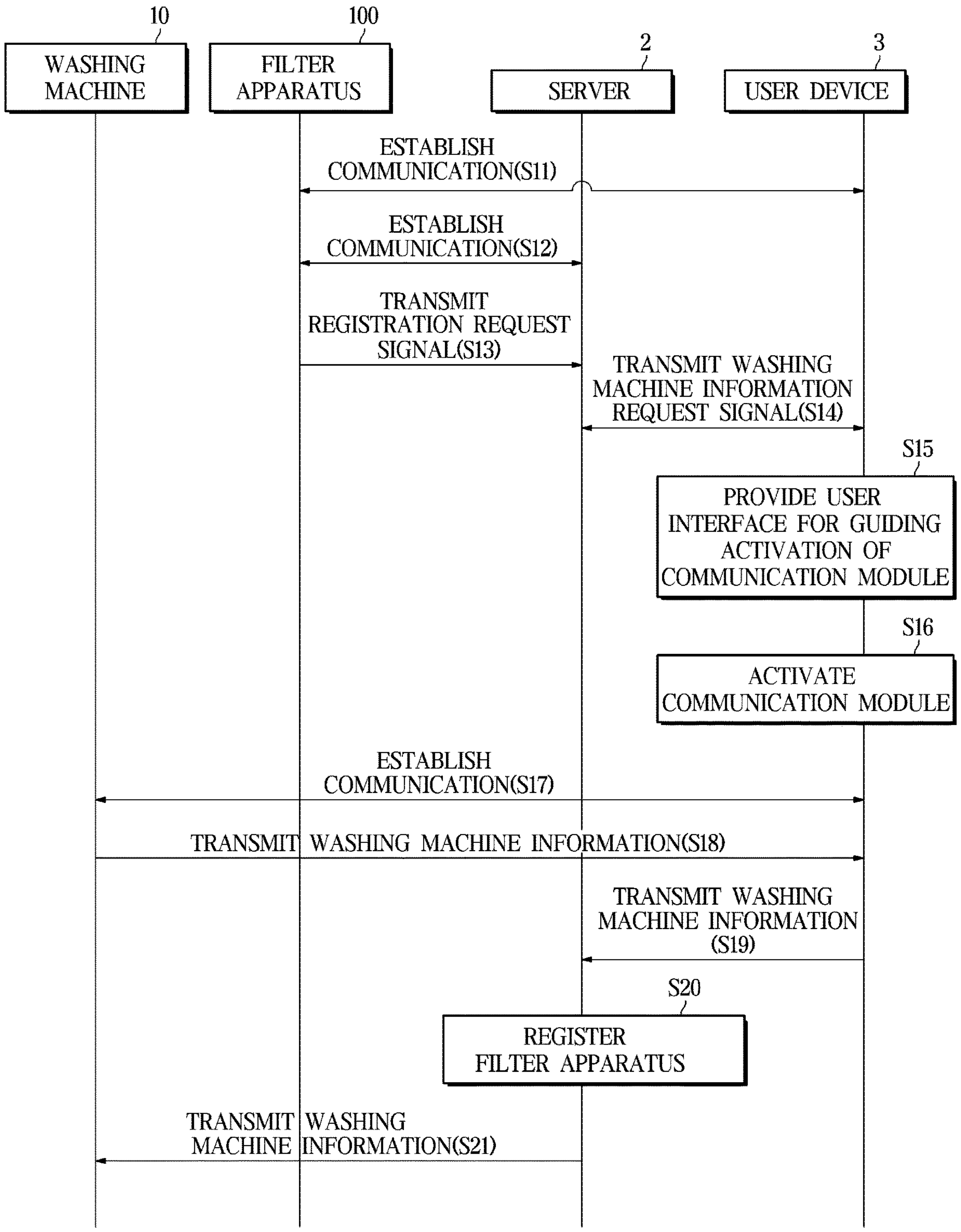
FIG. 21 is a flowchart showing an example of a method of registering a filter apparatus in a server according to an embodiment.

FIG. 21 is a flowchart showing an example of a method of registering a filter apparatus in a server according to an embodiment.

Some operations S11, S12, S13, and S14 shown in FIG. 21 are the same as some operations S1, S2, S3, and S4 described in FIG. 20, so descriptions thereof will be omitted.

Referring to FIG. 21, the user device 3 may, in response to a washing machine information request signal being received while a predetermined application is running, provide a user interface for guiding activation of a communication module (S15).

The user interface for guiding activation of a communication module corresponds to an example of the user interface for inputting information about the washing machine 10 described in operation S5.

That is, the user interface for guiding activation of a communication module may include an interface for inducing a change in communication settings to establish communication with the washing machine 10.

The user may activate a communication module (e.g., a Bluetooth communication module, a BLE communication module, or an NFC communication module) of the user device 3 that may communicate with the washing machine 10 through the user interface for guiding activation of a communication module.

Based on the user input, the communication module of the user device 3 may be activated (S16).

In this case, the communication module activated based on the user input may be a communication module different from a remote communication module for establishing communication with the server 2. For example, the communication module activated based on the user input may be a short-range communication module (e.g., a Bluetooth communication module, a BLE communication module, an NFC communication module, or an RFID communication module).

According to various embodiments, operation S15 may be omitted, and the communication module of the user device 3 may be automatically activated (S16).

The user device 3 in which the communication module is activated may establish communication with the washing machine 10 (S17).

The washing machine 10 may, in response to communication being established with the user device 3, transmit information about the washing machine 10 to the user device 3 (S18).

When the type of the activated communication module corresponds to a proximity communication module (e.g., an NFC communication module or an RFID communication module), the user device 3 may guide tagging of the user device 3 on a predetermined portion of the washing machine 10 through the output interface 330*b*. In this case, the predetermined portion of the washing machine 10 may be a portion in which a proximity communication module that stores information of the washing machine 10 is embedded.

The user may tag the user device 3, in which the proximity communication module is activated, to the predetermined portion of the washing machine 10, and thus the washing machine 10 may transmit information about the washing machine 10 through the proximity communication module.

According to various embodiments, the user device 3 may, in response to communication with the washing machine 10 being established, transmit a washing machine information request signal to the washing machine 10.

The user device 3 may, in response to information about the washing machine 10 being received from the washing machine 10, transmit the information about the washing machine 10 to the server 2 (S19).

Operations S20 and S21 are the same as operations S8 and S9 described with reference to FIG. 20, and thus descriptions thereof are omitted.

Figure 22:
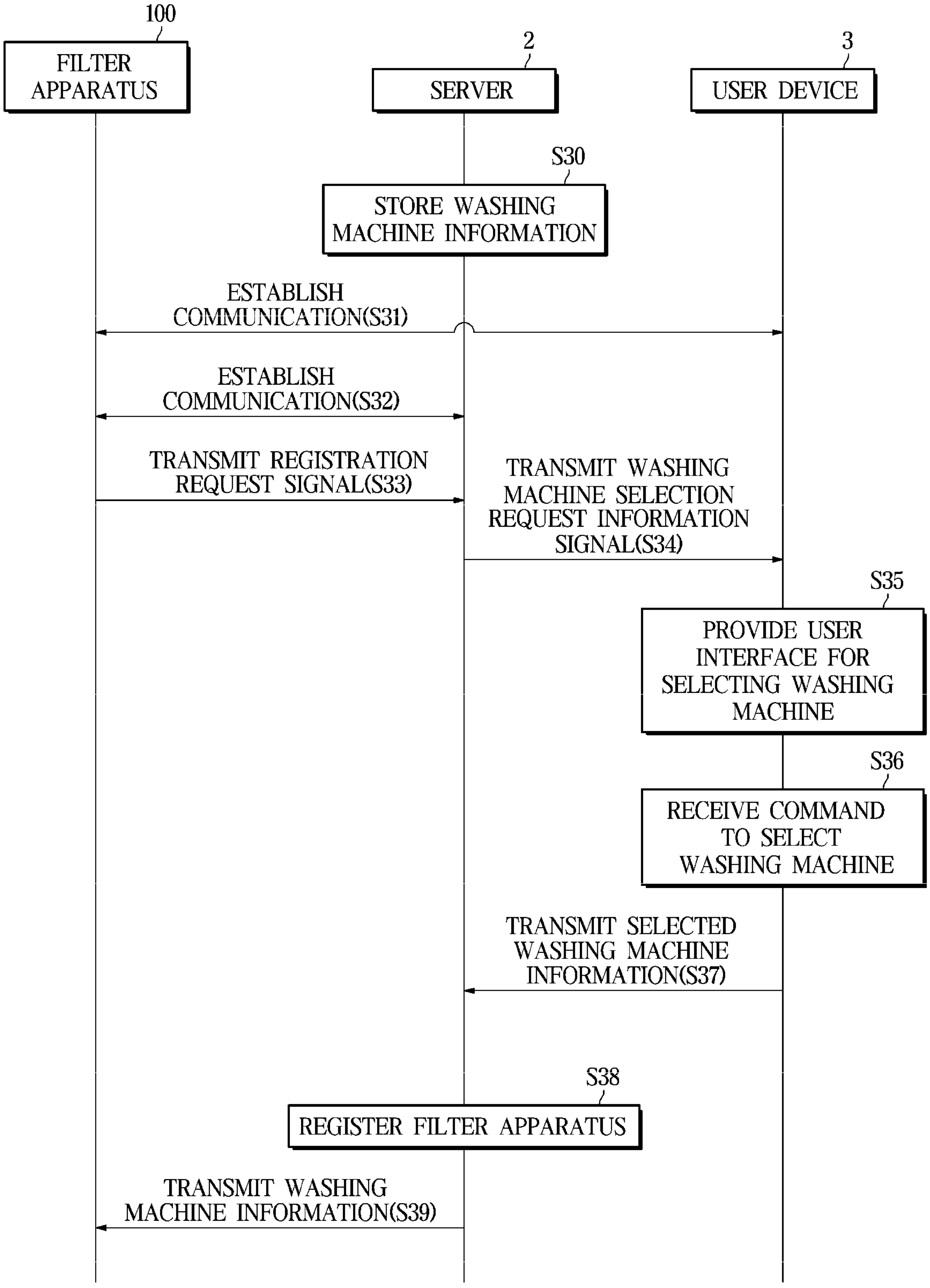
FIG. 22 is a flowchart showing an example of a method of registering a filter apparatus in a server according to an embodiment.

According to the disclosure, a user may easily transmit information about the washing machine 10 to the filter apparatus 100 through the user device 3. FIG. 22 is a flowchart showing an example of a method of registering a filter apparatus in a server according to an embodiment.

Referring to FIG. 22, it can be seen that information about the washing machine 10 is already stored in the server 2.

A user may execute a predetermined application through the user device 3 and register the washing machine 10 in the user account.

As the washing machine 10 is registered in the user account, information about the washing machine 10 may be already stored in the server 2.

In an embodiment, the server 2 may have information about the washing machine 10 stored therein, before communication between the filter apparatus 100 and the user device 3 is established (S30). The server 2 may have information about the washing machine 10 stored therein before communication with the filter apparatus 100 is established (S30).

Thereafter, communication between the filter apparatus 100 and the user device 3 may be established (S31), and as a result, communication between the filter apparatus 100 and the server 2 may be established (S32).

Operations S31 and S32 are the same as operations S1 and S2 described with reference to FIG. 20, and thus descriptions thereof are omitted.

According to various embodiments, one or more washing machines 10 may be registered in a user account. That is, the server 2 may store information about one or more washing machines 10.

The server 2 may, based on a registration request signal being received from the filter apparatus 100, transmit a washing machine selection request signal to the user device 3 (S34).

The user device 3 may provide a user interface for inducing selection of a washing machine among the one or more washing machines 10 registered in the user account (S35).

The user device 3 may receive a washing machine selection command through the user interface device 330 (S36).

The user device 3 may transmit information about a washing machine 10 selected by a user input from among the one or more washing machines 10 registered in the user account to the server 2 (S37). Since information about the washing machines 10 is already stored in the server 2, the transmitting of the information about the washing machine 10 selected by the user input to the server 2 may include transmitting data of identifying the washing machine 10 selected by the user input.

According to various embodiments, when only a single washing machine 10 is registered in a user account, operations S34, S35, S36, and S37 may be omitted.

There may be cases in which the user has not registered a washing machine 10 to be connected with the filter apparatus 100 in the user account. Therefore, according to various embodiments, even when only a single washing machine 10 is registered in the user account, operations S34, S35, S36, and S37 may be performed.

In the case of performing operations S34, S35, S36, and S37 even when only a single washing machine 10 is registered in the user account, it may be checked whether the user desires to connect the washing machine 10 registered in the user account to the filter apparatus 100

Operations S38 and S39 are the same as operations S8 and S9 described with reference to FIG. 20, and thus descriptions thereof are omitted.

According to the disclosure, in the case in which a washing machine 10 is already registered in a user account, information about the washing machine 10 pre-stored in the server 2 may be transmitted to the filter apparatus 100.

In addition, according to the disclosure, a user may easily link the filter apparatus 100 with the washing machine 10 already registered in the user account.

Figure 23A:
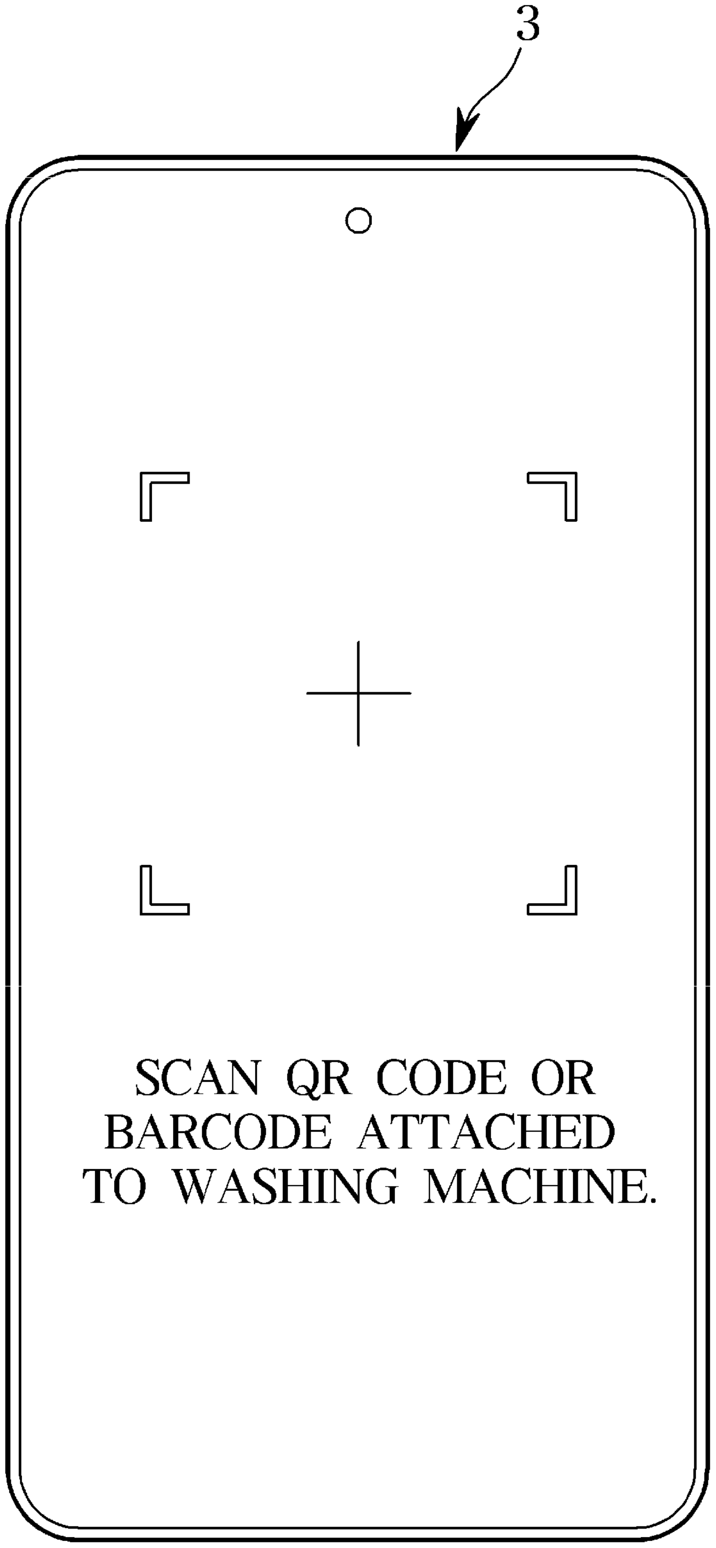
FIG. 23A illustrates an example of a user interface for obtaining information about a washing machine according to an embodiment.
Figure 23B:
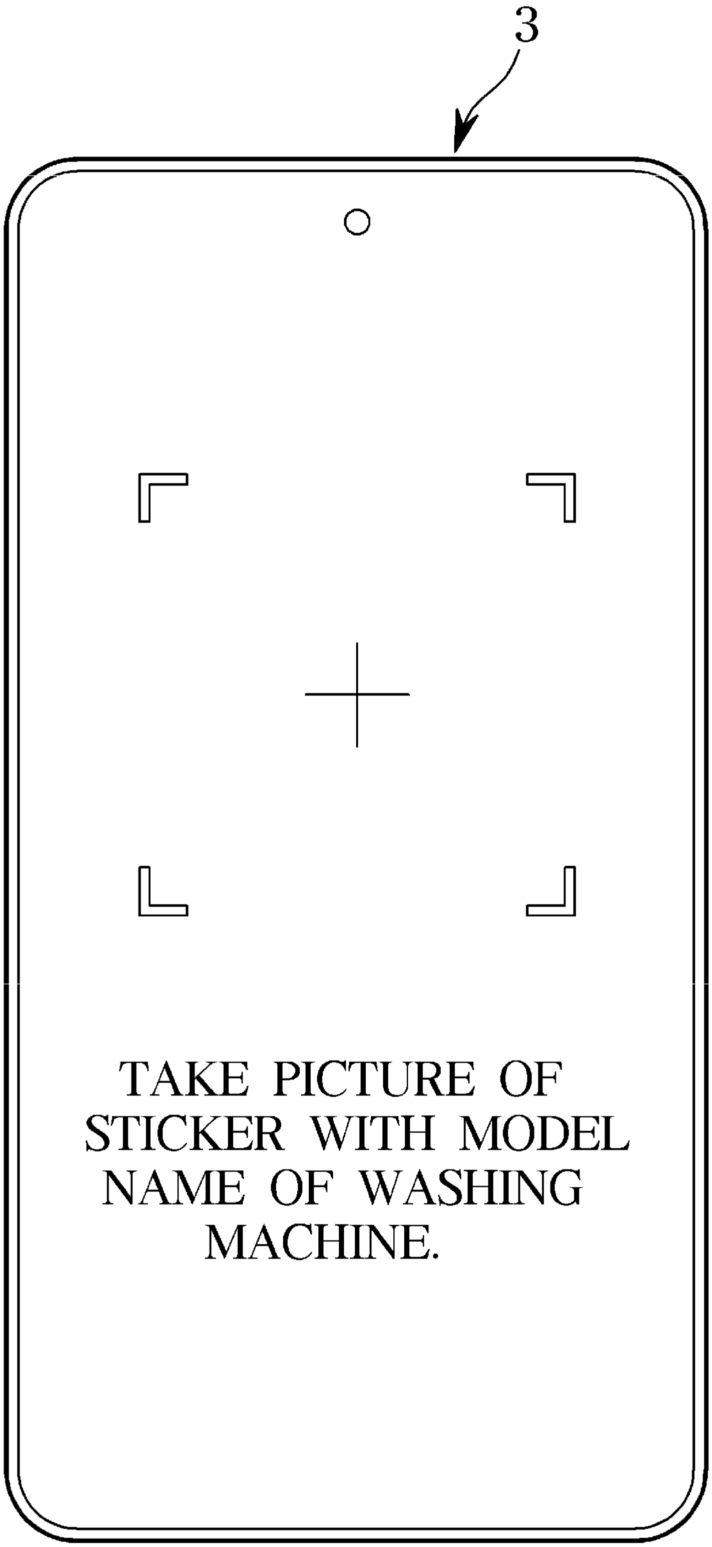
FIG. 23B illustrates an example of a user interface for obtaining information about a washing machine according to an embodiment.
Figure 23C:
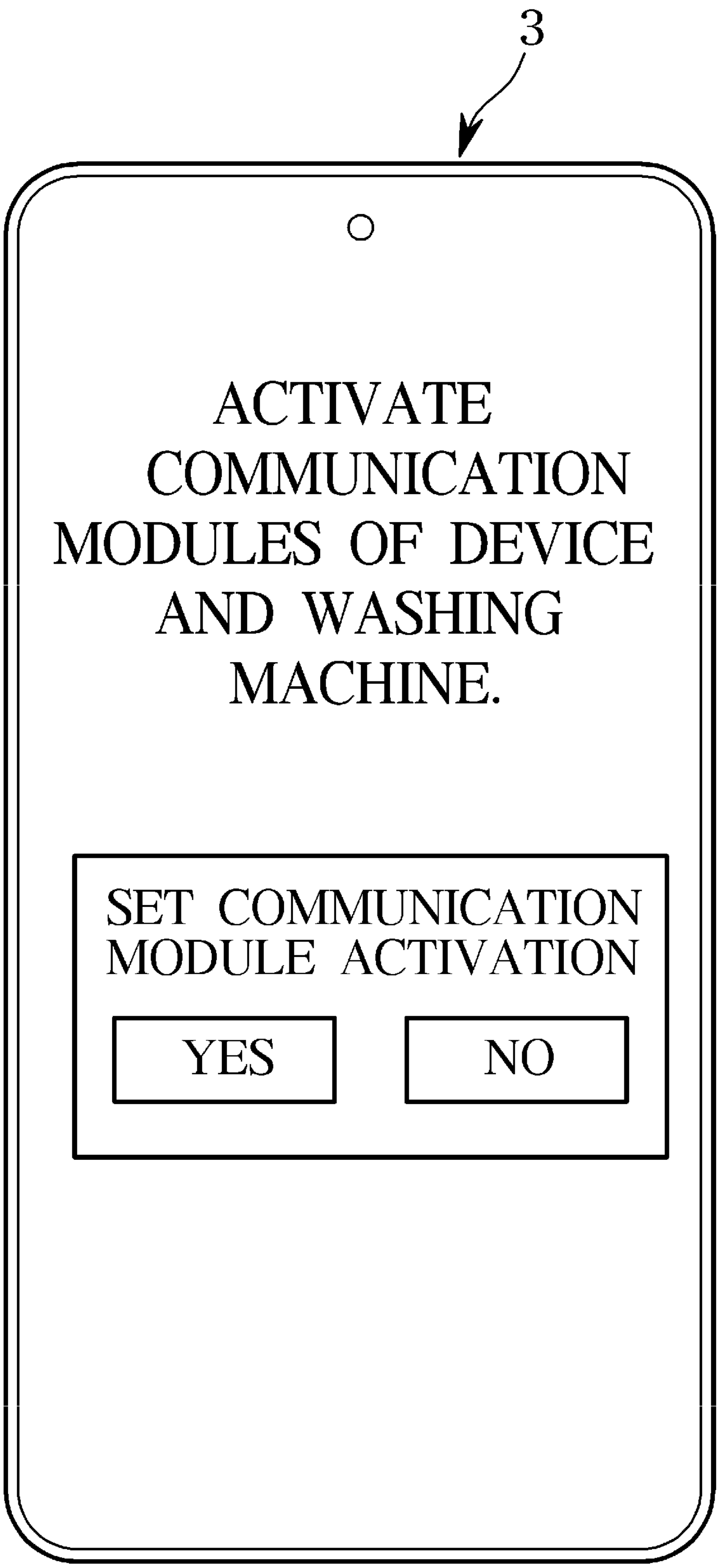
FIG. 23C illustrates an example of a user interface for obtaining information about a washing machine according to an embodiment.

FIG. 23A illustrates an example of a user interface for obtaining information about a washing machine. FIG. 23B illustrates an example of a user interface for obtaining information about a washing machine. FIG. 23C illustrates an example of a user interface for obtaining information about a washing machine.

In FIGS. 23A, 23B and 23C, examples of a user interface provided through the user device 3 in operation S5 of FIG. 20 is illustrated.

In FIG. 23C, an example of a user interface provided through the user device 3 in operation S15 of FIG. 21 is illustrated.

Referring to FIG. 23A, the user interface for inputting information about the washing machine 10 may include a visual indicator for setting a reference position for capturing identification information of the washing machine 10, such as a QR code and/or a barcode, and a visual indicator for inducing capturing of identification information of the washing machine 10, such as a QR code and/or a barcode.

The visual indicator may be implemented in the form of a symbol, figure, character, text, animation, or the like, but examples of the visual indicator are not limited thereto as long as they are visual devices capable of conveying information.

Referring to FIG. 23B, the user interface for inputting information about the washing machine 10 may include a visual indicator for setting a reference position for capturing a portion (e.g., a sticker attached to the washing machine 10) in which identification information of the washing machine 10 is described and a visual indicator for inducing capturing of the portion in which identification information of the washing machine 10 is described.

Referring to FIG. 23C, the user interface (a user interface for guiding activation of a communication module) for inputting information about the washing machine 10 may include a visual indicator for guiding activation of a communication module of the user device 3 and/or a visual indicator for guiding activation of a communication module of the washing machine 10.

According to the disclosure, by guiding activation of the communication modules of the user device 3 and the washing machine 10, the user device 3 and the washing machine 10 may be switched to a state in which communication is possible.

Figure 23D:
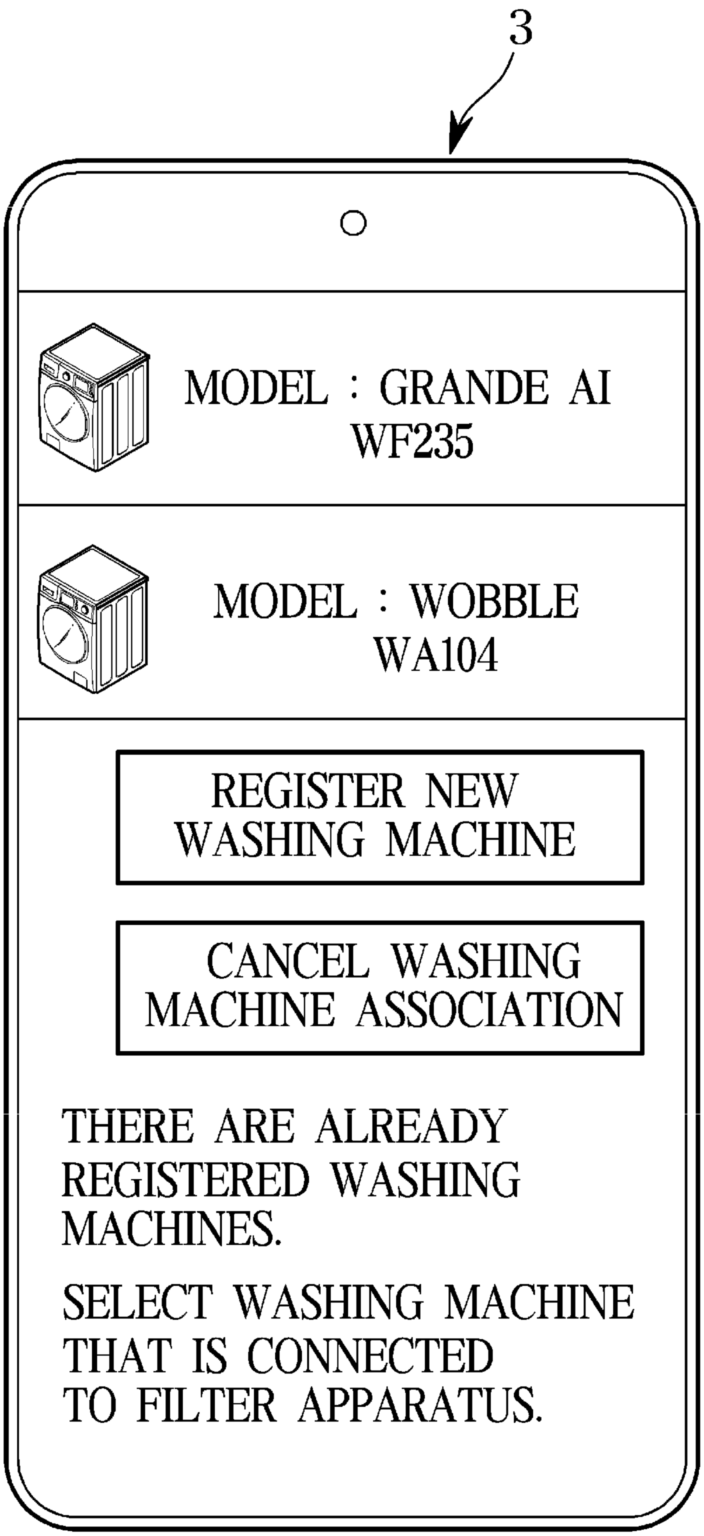
FIG. 23D illustrates an example of a user interface for selecting a washing machine when there are washing machines already registered in a server according to an embodiment.

FIG. 23D illustrates an example of a user interface for selecting a washing machine 10 when there are washing machines 10 already registered in a server 2.

In FIG. 23D, an example of an user interface provided through the user device 3 in operation S35 of FIG. 22 is illustrated.

Referring to FIG. 23D, the user interface for inducing selection of a washing machine among one or more washing machine 10*s* registered in the user account may include a visual indicator for indicating a list of one or more washing machines 10 registered in the user account and/or a visual indicator for notifying that a washing machine 10 is already registered in the user account and/or an element for receiving a user input to register a new washing machine 10 and/or an element for receiving a user input to defer a selection of the washing machine 10.

The visual indicator for indicating the list of one or more washing machines 10 registered in the user account may be a visualization of information about the one or more washing machines 10 registered in the user account.

The user device 3 may, in response to a selection of one washing machine from the list of one or more washing machines 10 registered in the user account, transmit information about the selected washing machine 10 to the server 2.

The user device 3 may, in response to a selection of the element for receiving a user input to register a new washing machine 10, provide a user interface for registering the new washing machine 10.

The user device 3 may, in response to a selection of the element for receiving a user input to defer a selection of the washing machine 10, provide a user interface for selecting another method of obtaining information about the washing machine 10 or a user interface for checking cancellation of link with the washing machine 10.

According to the disclosure, only with a user's simple selection, information about a washing machine 10 among washing machines 10 registered in the user account, which is linked with the filter apparatus 100 may be transmitted to the filter apparatus 100.

In addition, according to the disclosure, the user may, even during the registration of the filter apparatus 100 in the user account, easily register a new washing machine 10 in the user account.

Figure 24:
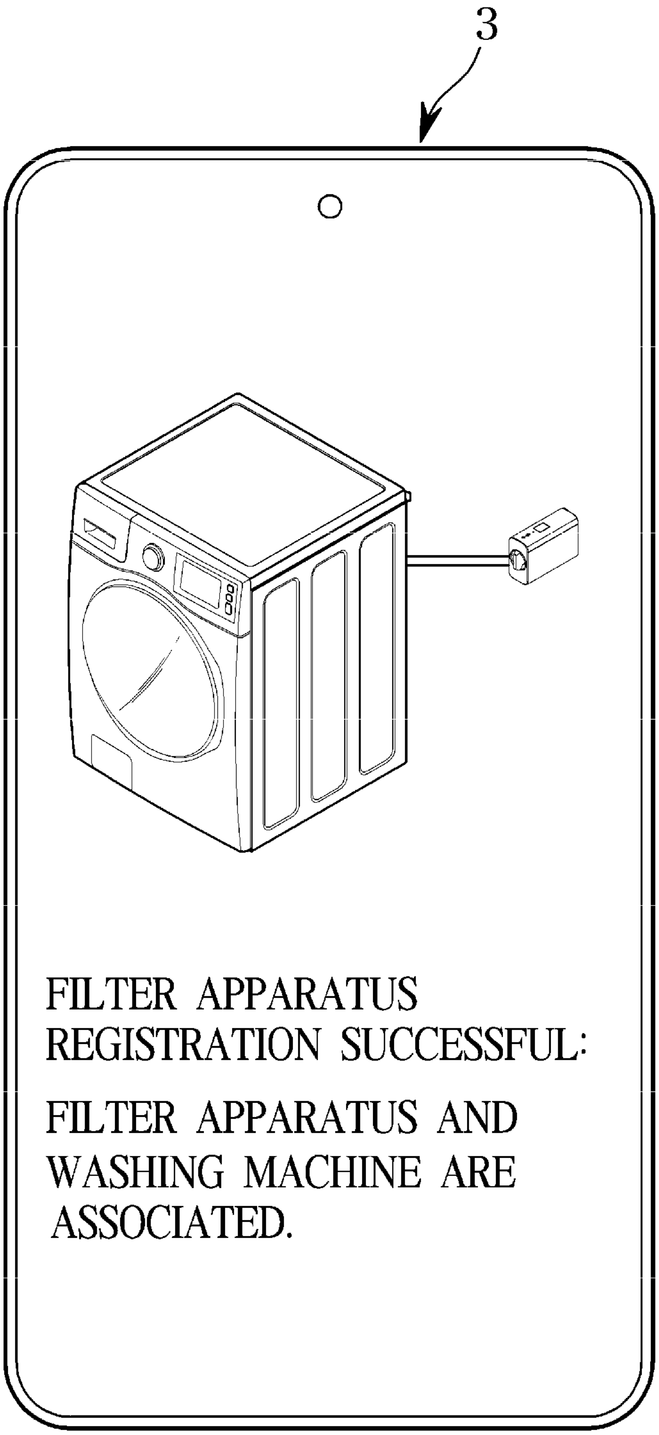
FIG. 24 illustrates an example of a user interface for notifying registration when a filter apparatus is registered in a server according to an embodiment.

FIG. 24 illustrates an example of a user interface for notifying registration when a filter apparatus is registered in a server according to an embodiment.

The server 2 may, in response to the completion of the registration of the filter apparatus 100, transmit a signal for notifying the completion of the registration of the filter apparatus 100 to the user device 3.

According to various embodiments, the user device 3 may, in response to receiving the signal for notifying the completion of the registration of the filter apparatus 100 from the server 2, provide a user interface for notifying the registration of the filter apparatus 100.

According to various embodiments, the user device 3 may provide the user interface for notifying the registration of the filter apparatus 100 in response to information about the washing machine 10 being transmitted to the server 2.

Referring to FIG. 24, the user interface for notifying the registration of the filter apparatus 100 may include a visual indicator for notifying the registration of the filter apparatus.

According to the disclosure, the user may identify that the filter apparatus 100 and the washing machine 10 are registered in the user account in linkage with each other.

Figure 25:
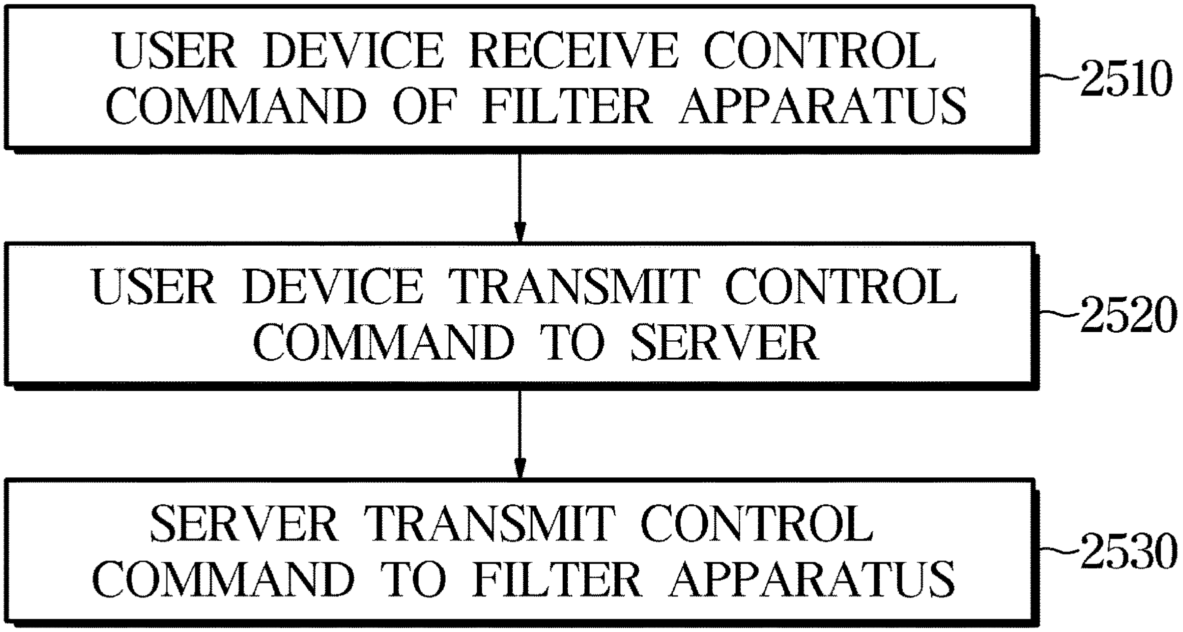
FIG. 25 is a flowchart showing a flow of control commands input through a user device according to an embodiment.

FIG. 25 is a flowchart showing a flow of control commands input through a user device according to an embodiment.

More specifically, FIG. 25 is a flowchart showing a method of a user controlling the filter apparatus 100 through the user device 3 in a state in which the filter apparatus 100 is registered in the server 2.

Referring to FIG. 25, the user may execute a predetermined application through the user device 3 and then input a control command for controlling the filter apparatus 100.

The user device 3 may receive the control command of the filter apparatus 100 through the user interface device 330 (2510).

The control command for controlling the filter apparatus 100 may include a command for operating the filter cleaning device 130.

The user device 3 may, in response to receiving the control command of the filter apparatus 100 from the user, transmit a control command of the filter apparatus 100 to the server 2 (2520).

The transmitting of the control command of the filter apparatus 100 to the server 2 may include transmitting data regarding a control target and data regarding an action to be performed.

The server 2 may, in response to receiving the control command of the filter apparatus 100 from the user device 3, transmit a control command to the filter apparatus 100 (2530).

The transmitting of the control command to the filter apparatus 100 may include transmitting data regarding an action to be performed.

The filter apparatus 100 may, in response to receiving the control command from the server 2, perform an operation corresponding to the control command.

For example, the filter apparatus 100 may, in response to a command requesting an operation of the filter cleaning device 130 being received from the server 2, operate the filter cleaning device 130.

Figure 26:
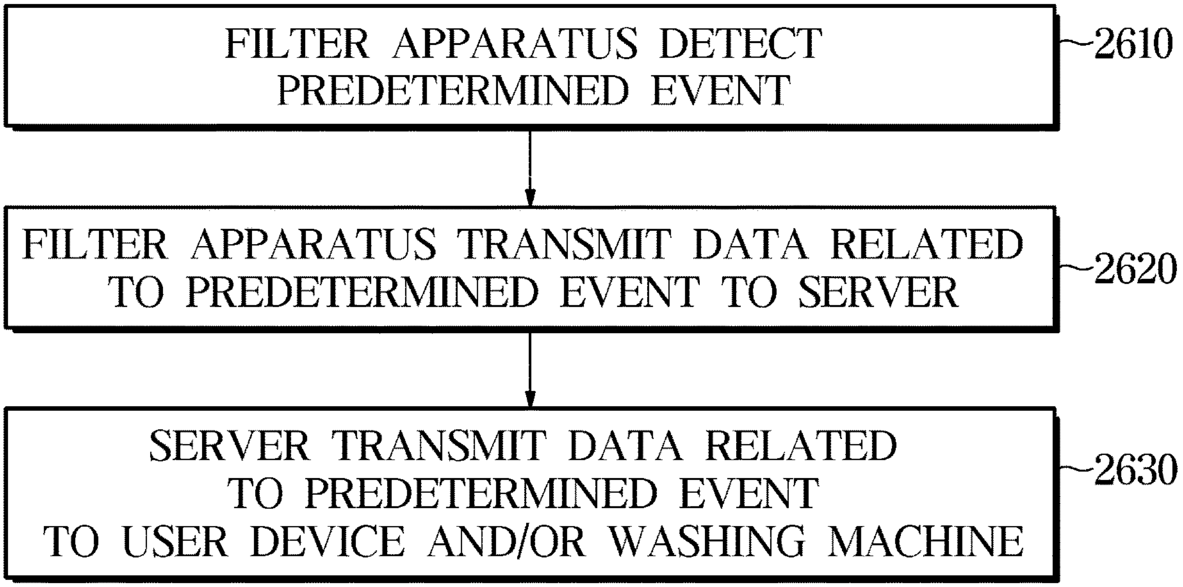
FIG. 26 is a flowchart showing a flow of information obtained from a filter apparatus according to an embodiment.

FIG. 26 is a flowchart showing a flow of information obtained from a filter apparatus according to an embodiment.

Referring to FIG. 26, the filter apparatus 100 may detect a predetermined event (2610).

For example, the predetermined event may include at least one of a clogging of the filter 120, a start of draining of the washing machine 10, a stop of draining of the washing machine 10, or a malfunction of a component of the filter apparatus 100 (e.g., at least one sensor 181 and 182).

Meanwhile, the predetermined event is not limited to the above example, and may include all types of events detectable by the filter apparatus 100.

In an embodiment, the filter sensor may detect a clogging of the filter 120.

In an embodiment, the water supply sensor 182 may detect an inflow of water through the case inlet 112*a*. That is, the water supply sensor 182 may detect a start of draining of the washing machine 10.

In an embodiment, the water supply sensor 182 may detect a stop of inflow of water through the case inlet 112*a*. That is, the water supply sensor 182 may detect a stop of draining of the washing machine 10.

In an embodiment, the filter apparatus 100 may compare information obtained from at least one sensor 181 and 182 with information obtained from an external device (e.g., the washing machine 10 and/or the user device 3), and as a result of the comparison, determine whether at least one sensor 181 and 182 malfunctions.

The filter apparatus 100 may, in response to detecting the predetermined event, transmit data related to the predetermined event to the server 2 (2620).

The data related to the predetermined event may include at least one of data indicating a clogging of the filter 120, data indicating a start of draining of the washing machine 10, data indicating a stop of draining of the washing machine 10, or data indicating a malfunction of one component of the filter apparatus 100.

In an embodiment, the controller 191 may, in response to detecting the predetermined event, control the communicator 199 to transmit data related to the predetermined event to the server 2.

The server 2 may, in response to receiving the data related to the predetermined event from the filter apparatus 100, transmit the data related to the predetermined event to the user device 3 and/or the washing machine 10 (2630).

In an embodiment, the server 2 may, in response to receiving data related to a predetermined event from the filter apparatus 100 registered in the first user account, transmit the data related to the predetermined event to the user device 3 registered in the first user account and/or the washing machine 10 registered in the first user account.

In an embodiment, the server 2 may, in response to receiving data related to a predetermined event from the filter apparatus 100 registered in the second user account, transmit the data related to the predetermined event to the user device 3 registered in the second user account and/or the washing machine 10 registered in the second user account.

For example, the server 2 may, in response to receiving a drain detection signal from the filter apparatus 100 registered in the user account, transmit the drain detection signal to the washing machine 10 registered in the user account.

As another example, the server 2 may, in response to receiving a filter clogging signal from the filter apparatus 100 registered in the user account, transmit the filter clogging signal to the washing machine 10 registered in the user account.

According to the disclosure, information exchange between devices registered in a user account may be smoothly performed.

Figure 27:
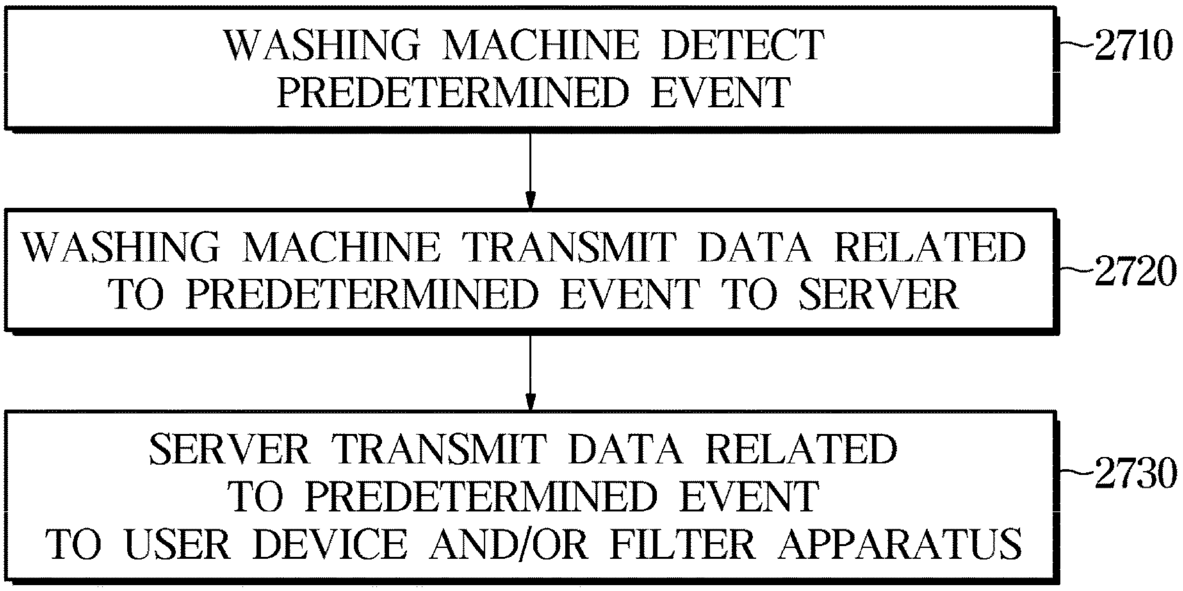
FIG. 27 is a flowchart showing a flow of information obtained from a washing machine according to an embodiment.

FIG. 27 is a flowchart showing a flow of information obtained from a washing machine according to an embodiment.

Referring to FIG. 27, the washing machine 10 may detect a predetermined event (2710).

For example, the predetermined event may include at least one of a clogging of the filter 120, a start of draining of the washing machine 10, a stop of draining of the washing machine 10, or a malfunction of one component of the filter apparatus 100.

Meanwhile, the predetermined event is not limited to the above example, and may include all types of events detectable by the washing machine 10.

In an embodiment, the washing machine 10 may detect a clogging of the filter 120. The washing machine 10 according to an embodiment may detect a clogging of the filter 120 (2310).

For example, the controller 90 may, in response to a change in the water level of the tub 20 per hour being less than or equal to a predetermined value during operation of the drain pump 73, detect a clogging of the filter 120. To this end, the washing machine 10 may further include a water level sensor for detecting the water level of the tub 20.

As another example, the controller 90 may, in response to a load value of the drain pump 73 being greater than or equal to a predetermined value during operation of the drain pump 73, detect a clogging of the filter 120.

For example, the controller 90 may, in response to a driving current value (or a driving voltage value) applied to the drain pump 73 being greater than or equal to a predetermined value for a predetermined period of time during operation of the drain pump 73, detect a clogging of the filter.

In an embodiment, the washing machine 10 may, in response to an operation condition of the drain pump 73 being satisfied, detect a start of draining of the washing machine 10, and in response to an operation stop condition of the drain pump 73 being satisfied, detect a stop of draining of the washing machine 10.

In an embodiment, the washing machine 10 may detect a malfunction of at least one sensor 181 and 182 of the filter apparatus 100.

According to various embodiments, the washing machine 10 may compare information obtained from the components of the washing machine 10 (e.g., the drain pump 73 and the sensor(s) 95) with information obtained from external devices (e.g., the filter apparatus 100 and/or the user device 3) and according to a result of the comparison, determine whether at least one sensor 181 and 182 malfunctions For example, the controller 90 may, in response to a drain stop signal not being received from the filter apparatus 100 even when a predetermined time has elapsed since a stop of the operation of the drain pump 73, determine that the water supply sensor 182 malfunctions.

As another example, the controller 90 may, in response to a filter clogging signal not being received from the filter apparatus 100 even after transmitting a filter clogging signal to the filter apparatus 100 and/or the user device 3, determine that the filter sensor 181 malfunctions.

The washing machine 10 may, in response to the detecting of the predetermined event, transmit data related to the predetermined event to the server 2 (2720).

The data related to the predetermined event may include at least one of data indicating a clogging of the filter 120, data indicating a start of draining of the washing machine 10, data indicating a stop of draining of the washing machine 10, or data indicating a malfunction of one component of the filter apparatus 100.

In an embodiment, the controller 90 may, in response to the detecting of the predetermined event, control the communicator 96 to transmit data related to the predetermined event to the server 2.

The server 2 may, in response to the data related to the predetermined event being received from the washing machine 10, transmit the data related to the predetermined event to the user device 3 and/or the filter apparatus 100 (2730).

In an embodiment, the server 2 may, in response to data related to a predetermined event being received from the washing machine 10 registered in the first user account, transmit the data related to the predetermined event to the user device 3 registered in the first user account and/or the filter apparatus 100 registered in the first user account.

In an embodiment, the server 2 may, in response to data related to a predetermined event being received from the washing machine 10 registered in the second user account, transmit the data related to the predetermined event to the user device 3 registered in the second user account and/or the filter apparatus 100 registered in the second user account.

For example, the server 2 may, in response to a drain start signal being received from a washing machine 10 registered in a user account, transmit the drain start signal to a filter apparatus 100 registered in the user account.

As another example, the server 2 may, in response to a filter clogging signal being received from a washing machine 10 registered in a user account, transmit the filter clogging signal to the filter apparatus 100 registered in the user account.

According to the disclosure, information exchange between devices registered in a user account may be smoothly performed.

Figure 28:
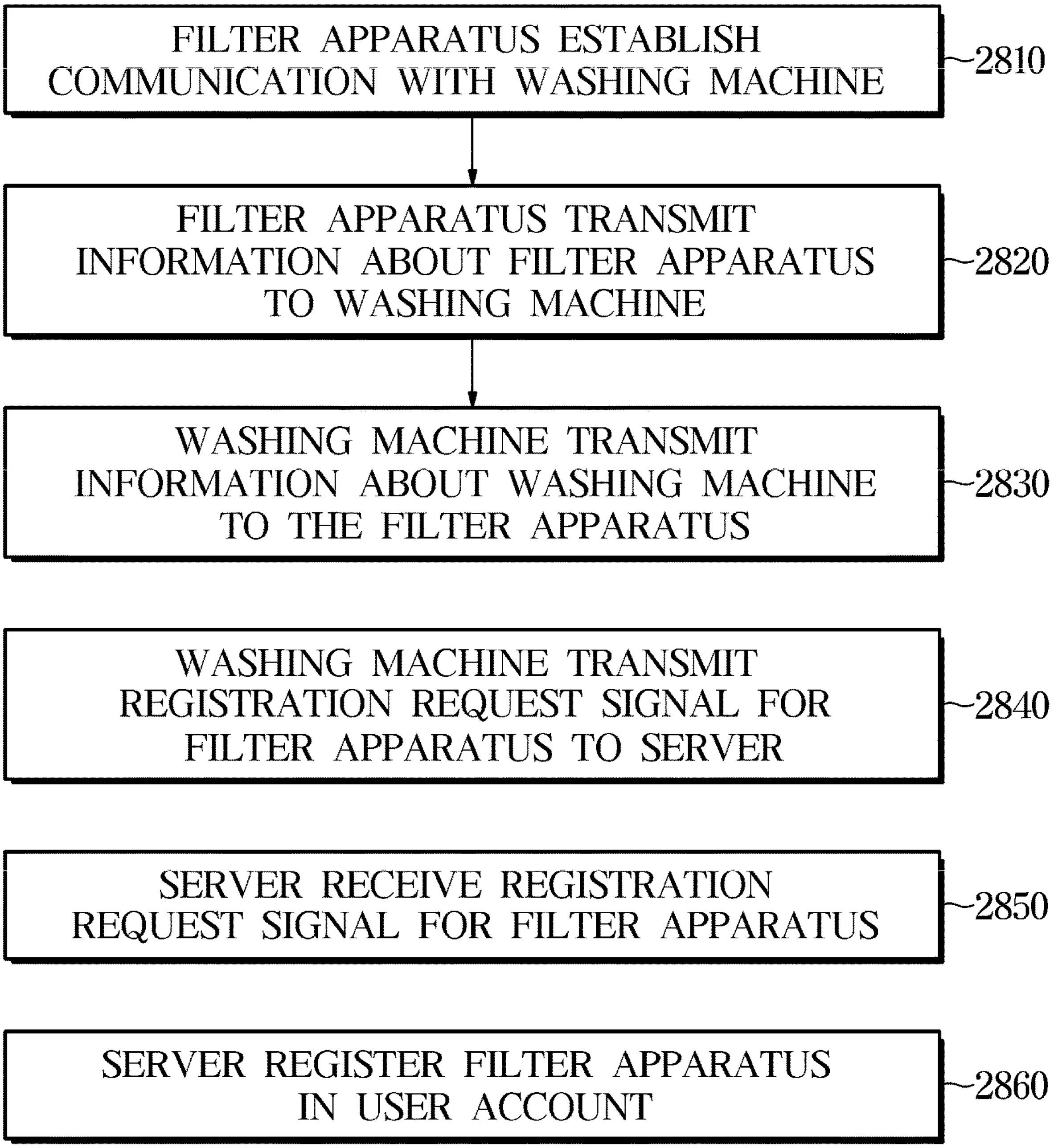
FIG. 28 is a flowchart showing an example of a method of managing a filter apparatus according to an embodiment.

FIG. 28 is a flowchart showing an example of a method of managing a filter apparatus according to an embodiment.

According to various embodiments, the filter apparatus 100 may include only the first communication module and/or the third communication module without including the second communication module.

When the filter apparatus 100 does not include the second communication module, it is impossible for the filter apparatus 100 to directly communicate with the server 2 through the WAN.

In an embodiment, the filter apparatus 100 may establish communication with the washing machine 10 using the first communication module and/or the third communication module (2810).

In this case, communication between the filter apparatus 100 and the washing machine 10 using the first communication module and/or the third communication module may be defined as D2D communication.

The filter apparatus 100 may transmit information about the filter apparatus 100 to the washing machine 10 using D2D communication (2820).

The information about the filter apparatus 100 may include identification information (e.g., a model name and/or a serial number) of the filter apparatus.

The washing machine 10 may transmit information about the washing machine 10 to the filter apparatus 100 using D2D communication (2830).

The information about the washing machine 10 may include identification information (e.g., a model name and/or a serial number) of the washing machine 10.

According to the disclosure, the filter apparatus 100 may set an optimal operation algorithm based on the information about the washing machine 10 obtained through D2D communication.

The washing machine 10 may, in response to the information about the filter apparatus 100 being received from the filter apparatus 100, transmit a registration request signal for the filter apparatus 100 to the server 2 using the second communication module (2840). In this case, the registration request signal for the filter apparatus 100 may include the identification information of the filter apparatus 100. That is, the washing machine 10 may communicate with the server 2 using the second communication module that is not included in the filter apparatus 100.

The server 2 may receive the registration request signal for the filter apparatus 100 from the washing machine 10 (2850).

The server 2 may, in response to receiving the registration request signal for the filter apparatus 100, register the filter apparatus 100 in the user account (2860).

The registering of the filter apparatus 100 in the user account may include storing information about the washing machine 10 and information about the filter apparatus 100 to be linked with each other.

According to the disclosure, even when the filter apparatus 100 does not include the second communication module, the filter apparatus 100 may be registered in the user account, and thus manageability of the filter apparatus 100 may be improved.

Figure 29:
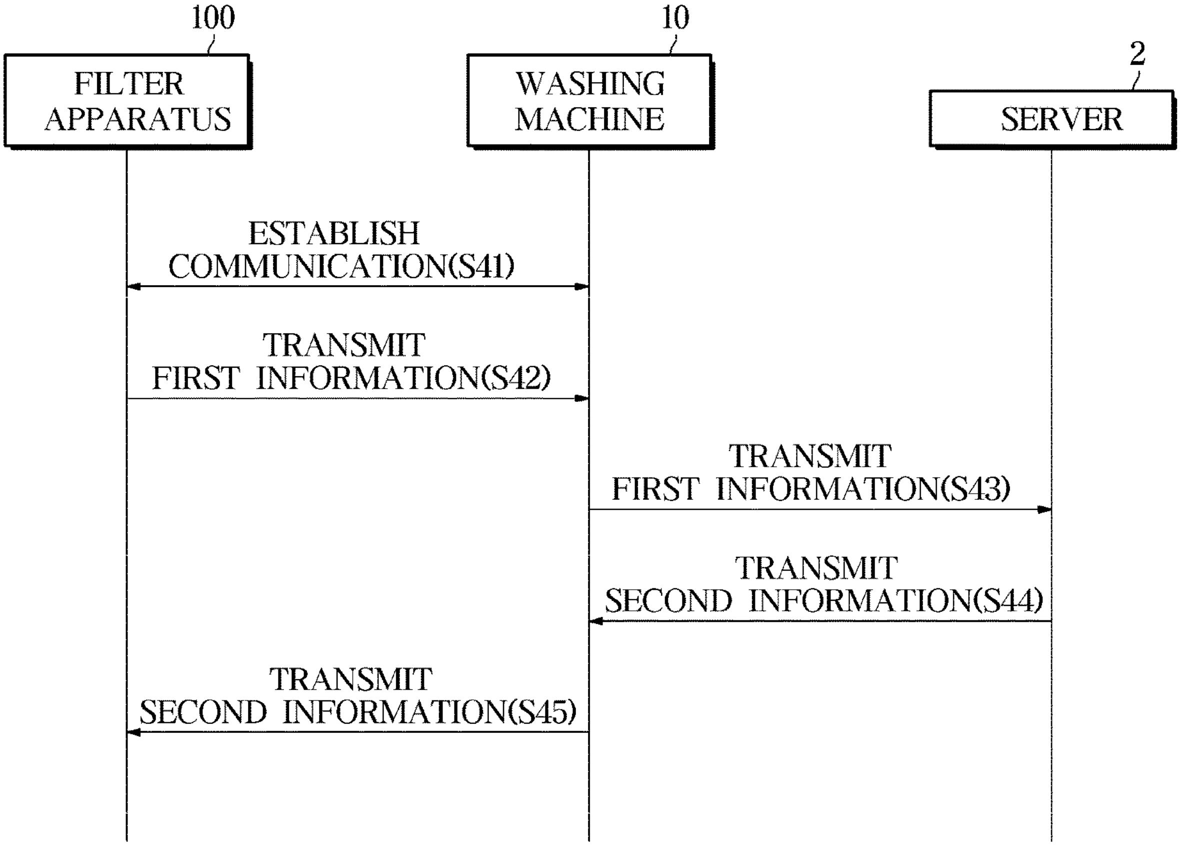
FIG. 29 is a view visualizing the flow of information between a filter apparatus, a washing machine, and a server according to an embodiment.

FIG. 29 is a view visualizing the flow of information between a filter apparatus, a washing machine, and a server according to an embodiment.

Referring to FIG. 29, the filter apparatus 100 and the washing machine 10 may establish D2D communication through the first communication module and/or the third communication module (S41).

The filter apparatus 100 may transmit first information to the washing machine 10 (S42). The first information may include information obtained from the filter apparatus 100. For example, the first information may include clogging information of the filter apparatus 100, drain detection information, or sensor failure information of the filter apparatus 100.

The washing machine 10 may transmit the first information obtained from the filter apparatus 100 to the server 2 (S43).

Although not shown in the drawing, the server 2 may store the first information. In addition, the server 2 may transmit the first information to an external device (e.g., the user device 3).

The server 2 may transmit second information obtained from an external device (e.g., the user device 3) to the washing machine 10 (S44). In this case, the second information may include a control command of the filter apparatus 100.

Since information obtained from the washing machine 10 may be directly transmitted from the washing machine 10 to the filter apparatus 100 through D2D communication, the second information may represent information obtained from an external device rather than information obtained from the washing machine 10.

The washing machine 10 may transmit the second information received from the server 2 to the filter apparatus 100 (S45).

When the second information includes a control command, the filter apparatus 100 may in response to reception of the second information, perform an operation corresponding to the second information.

For example, when the second information includes a control command requesting an operation of the filter cleaning device 130, the filter apparatus 100 may, in response to reception of the second information, operate the filter cleaning device 130.

According to the disclosure, even when the filter apparatus 100 does not include a communication module for communicating with the server 2, the filter apparatus 100 may smoothly communicate with the server 2 through the washing machine 10.

Figure 30:
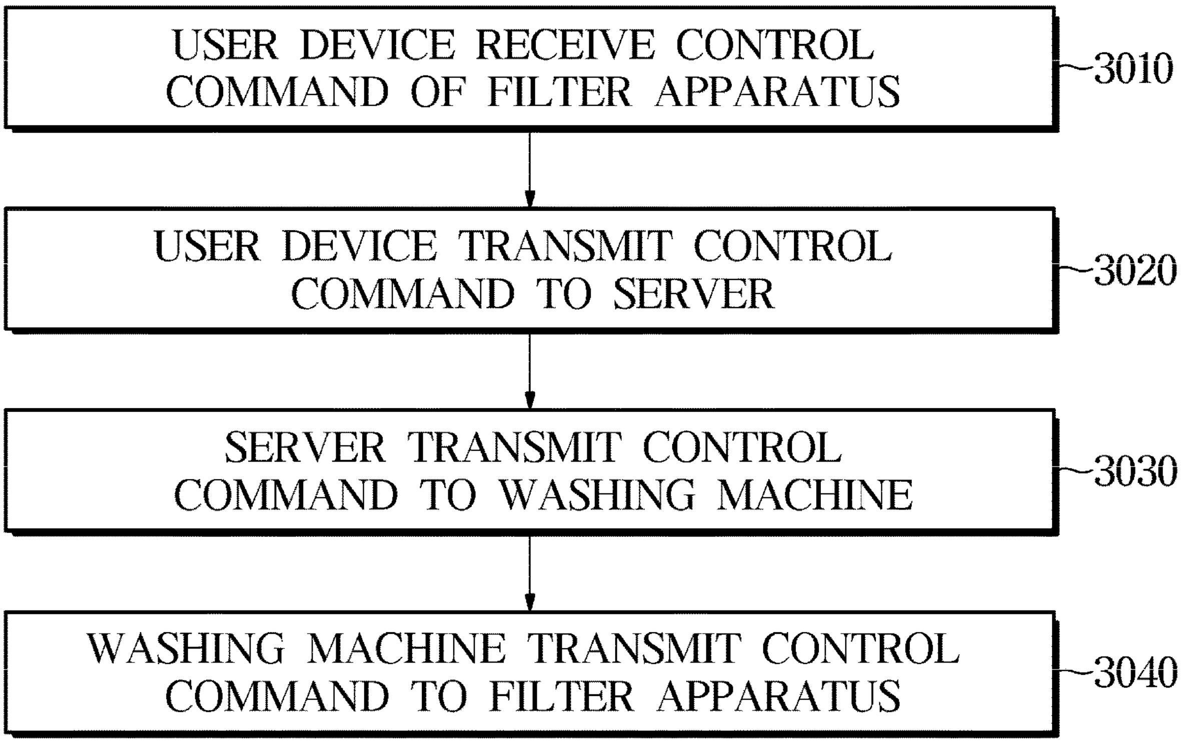
FIG. 30 is a flowchart showing a flow of control commands input through a user device according to an embodiment.

FIG. 30 is a flowchart showing a flow of control commands input through a user device according to an embodiment.

Referring to FIG. 30, the user device 3 may receive a control command of the filter apparatus 100 (3010).

The user device 3 may, in response to reception of the control command of the filter apparatus 100, transmit a control command to the server 2 (3020).

For example, the user device 3 may, in response to a predetermined application being executed, provide a user interface for selecting a device that is to be a control target and a required action of the control target, and the user device 3 may, in response to the filter apparatus 100 being selected as the control target device and a predetermined required action being selected through the user interface device 330, transmit a control command corresponding to the predetermined required action to the server 2.

The server 2 may, in response to the control command of the filter apparatus 100 being received from the user device 3, transmit a control command of the filter apparatus 100 to the washing machine 10 (3030).

The washing machine 10 may transmit the control command of the filter apparatus 100, which is received from the server 2, to the filter apparatus 100 using D2D communication (3040).

According to the disclosure, the filter apparatus 100 incapable of directly communicating with the server 2 may receive a control command from the user device 3 through the server 2 and the washing machine 10.

Figure 31:
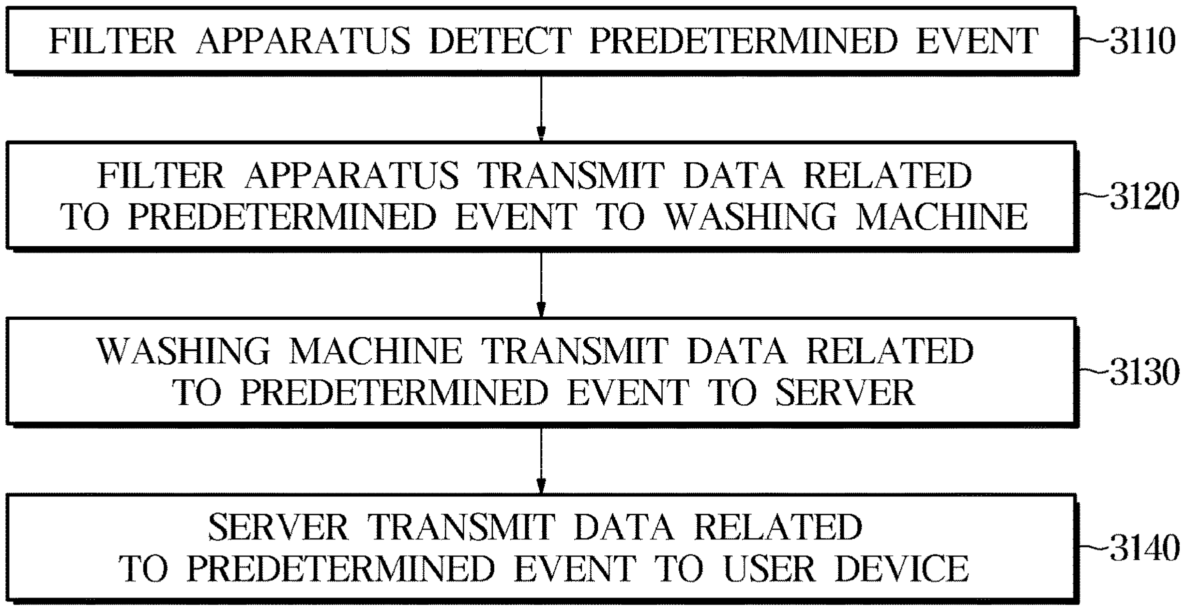
FIG. 31 is a flowchart showing a flow of information obtained from a filter apparatus according to an embodiment.

FIG. 31 is a flowchart showing a flow of information obtained from a filter apparatus according to an embodiment.

Referring to FIG. 31, the filter apparatus 100 may detect a predetermined event (3110).

Descriptions related to the predetermined event are omitted due to the redundancy of those of FIG. 26.

The filter apparatus 100 may, in response to the detecting of the predetermined event, transmit data related to the predetermined event to the washing machine 10 (3120).

In an embodiment, the filter apparatus 100 may transmit the data related to the predetermined event to the washing machine 10 through the first communication module and/or the third communication module.

The washing machine 10 may transmit data related to the predetermined event to the server 2 (3130).

In an embodiment, the washing machine 10 may transmit the data related to a predetermined event, which is received through the first communication module and/or the third communication module, to the server 2 through the second communication module.

The server 2 may, in response to the data related to the predetermined event being received from the washing machine 10, transmit data related to the predetermined event to the user device 3 (3140).

In an embodiment, the server 2 may, in response to data related to a predetermined event being received from the washing machine 10 registered in the first user account, transmit data related to the predetermined event to the user device 3 registered in the first user account.

In an embodiment, the server 2 may, in response to data related to a predetermined event being received from the washing machine 10 registered in the second user account, transmit data related to the predetermined event to the user device 3 registered in the second user account.

Figure 32:
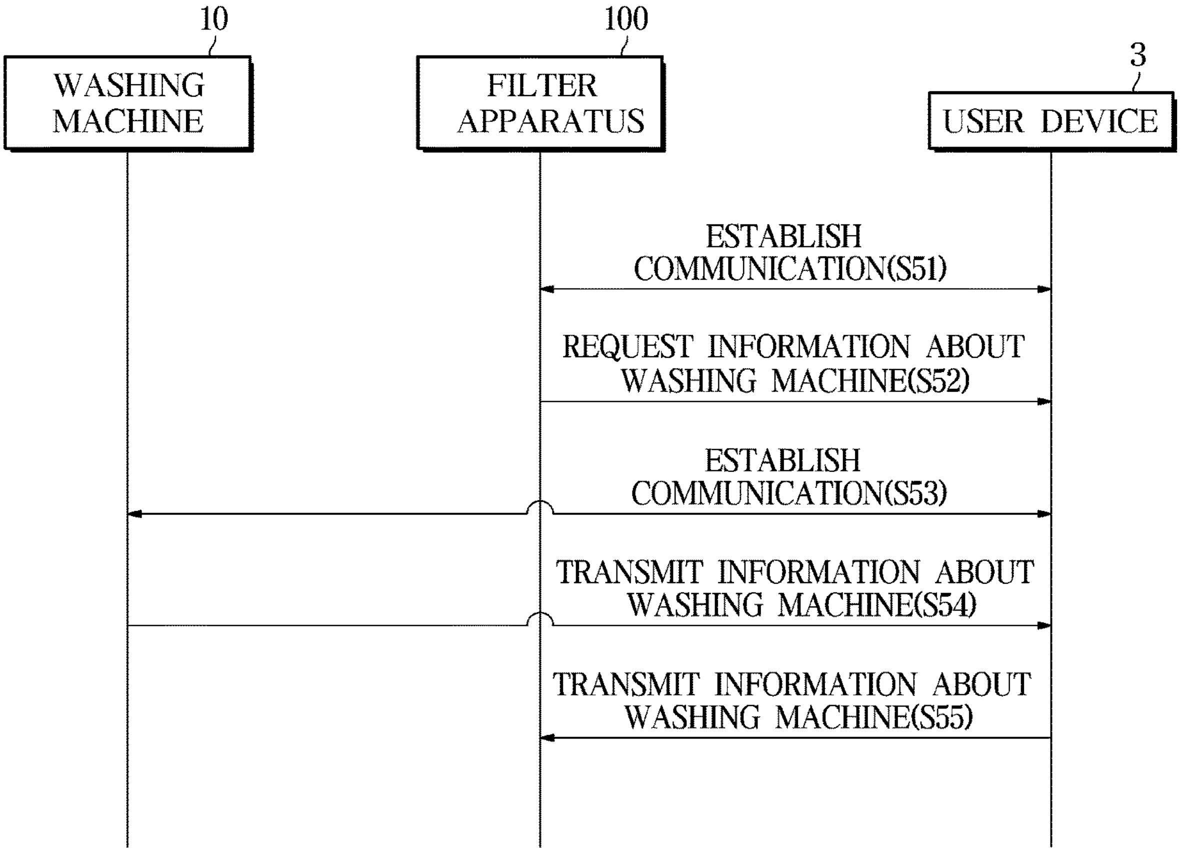
FIG. 32 is a flowchart showing an example of a process in which a filter apparatus receives washing machine information from a user device according to an embodiment.

FIG. 32 is a flowchart showing an example of a process in which a filter apparatus receives washing machine information from a user device according to an embodiment.

In an embodiment, the filter apparatus 100 may establish communication with the user device 3 using the first communication module and/or the third communication module (S51).

For example, the filter apparatus 100 and the user device 3 may be paired with each other using Bluetooth communication. As another example, the filter apparatus 100 and the user device 3 may be connected to each other using wired communication.

The filter apparatus 100 may, in response to communication being established with the user device 3 using the first communication module and/or the third communication module, request the user device 3 for information about the washing machine 10 (S52).

In an embodiment, the filter apparatus 100 may, in the case of absence of information about the washing machine 10 stored in the memory 191*b*, request the user device 3 for information about the washing machine 10.

The user device 3 may, in response to a request for information about the washing machine 10 being received from the filter apparatus 100, switch to enable communication with the washing machine 10.

For example, the user device 3 may activate the second communication module (e.g., Wi-Fi Direct) while maintaining communication with the filter apparatus 100 using the first communication module and/or the third communication module.

As another example, the user device 3 may disconnect communication with the filter apparatus 100 established using the first communication module and/or the third communication module, and search for a communication target using the first communication module and/or the third communication module.

The user device 3 may establish communication with the washing machine 10 (S53).

For example, the user device 3 may establish communication with the washing machine 10 through the second communication module (e.g., Wi-Fi Direct) while maintaining communication with the filter apparatus 100 using the first communication module and/or the third communication module.

As another example, the user device 3 may disconnect communication with the filter apparatus 100 established using the first communication module and/or the third communication module, and establish communication with the washing machine 10 using the first communication module and/or the third communication module.

The user device 3 may, 10 in response to communication with the washing machine 10 being established with the washing machine 10, transmit an information request signal to the washing machine 10.

The washing machine 10 may, in response to the information request signal of the washing machine 10 being received from the user device 3, transmit information about the washing machine 10 to the user device 3 (S54).

According to various embodiments, the washing machine 10 may transmit information about the washing machine 10 to the user device 3 using the first communication module, the second communication module, or the third communication module.

The information about the washing machine 10 may include identification information about the washing machine 10.

The user device 3 may, in response to the information about the washing machine 10 being received from the washing machine 10, transmit the information about the washing machine 10 to the filter apparatus 100 (S55).

For example, the user device 3 may, upon receiving information about the washing machine 10 from the washing machine 10 through the second communication module (e.g., Wi-Fi Direct) while maintaining communication with the filter apparatus 100 using the first communication module and/or the third communication module, transmit the information about the washing machine 10 to the filter apparatus 100 through the first communication module and/or the third communication module.

As another example, the user device 3 may, upon receiving information about the washing machine 10 using the first communication module and/or the third communication module, disconnect the communication with the washing machine 10 and transmit the information about the washing machine 10 to the filter apparatus 100 using the first communication module and/or the third communication module.

According to the disclosure, even when communication between the filter apparatus 100 and the washing machine 10 is not allowed, information about the washing machine 10 may be transmitted to the filter apparatus 100 using the user device 3 without intervention of the server 2.

Figure 33:
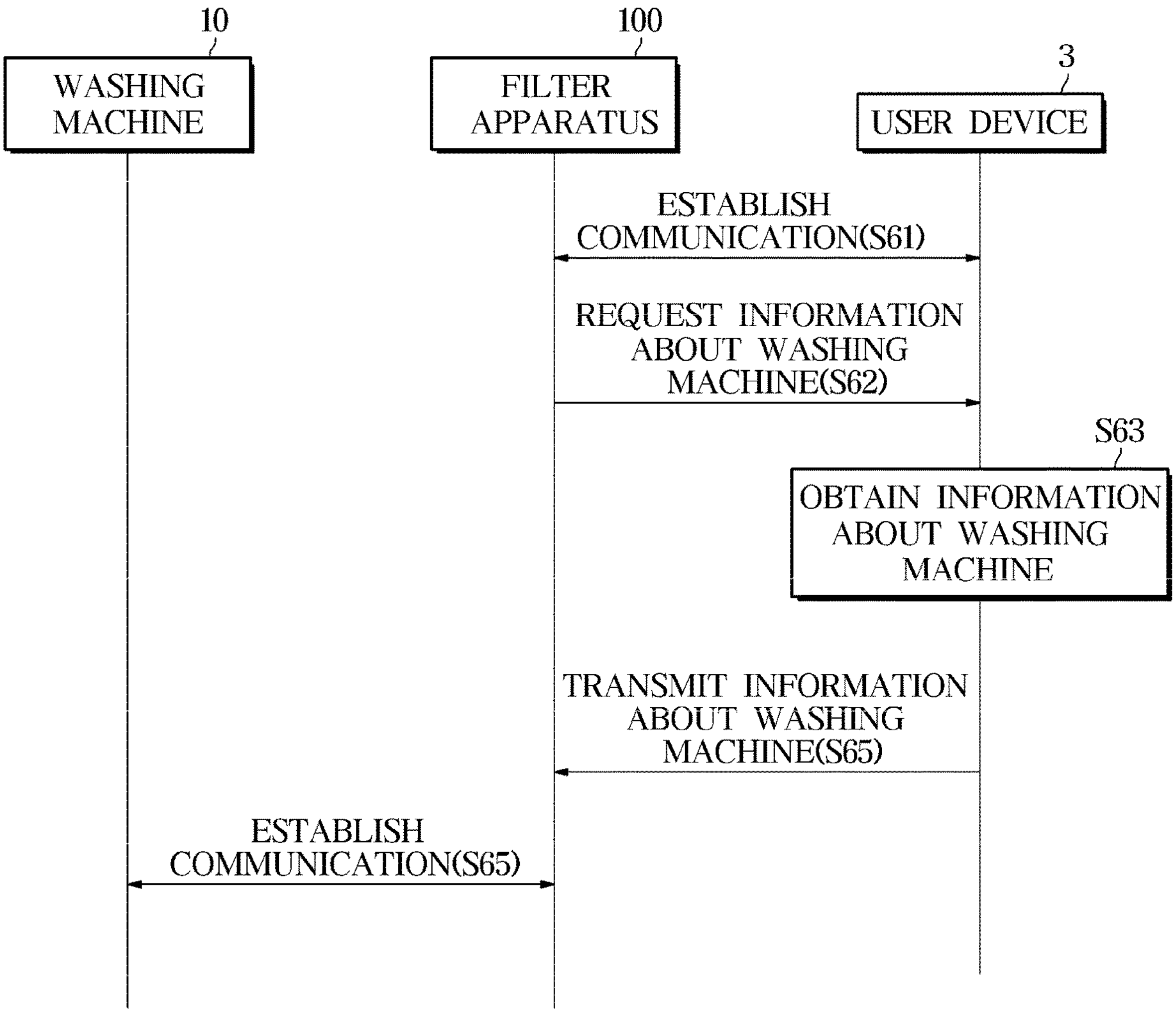
FIG. 33 is a flowchart showing an example of a process in which a filter apparatus receives washing machine information from a user device according to an embodiment.

FIG. 33 is a flowchart showing an example of a process in which a filter apparatus receives washing machine information from a user device according to an embodiment.

In an embodiment, the filter apparatus 100 may establish communication with the user device 3 using the first communication module and/or the third communication module (S61).

For example, the filter apparatus 100 and the user device 3 may be paired with each other using Bluetooth communication. As another example, the filter apparatus 100 and the user device 3 may be connected to each other using wired communication.

The filter apparatus 100 may, in response to communication being established with the user device 3 using the first communication module and/or the third communication module, request the user device 3 for information about the washing machine 10 (S62).

In an embodiment, the filter apparatus 100 may request the user device 3 for information about the washing machine 10 in the case of absence of information about the washing machine 10 stored in the memory 191*b*.

The user device 3 may, in response to a request for information about the washing machine 10 being received from the filter apparatus 100, provide a user interface for inputting information about the washing machine 10.

The user interface for inputting information about the washing machine 10 may be the same as the user interface described with reference to at least one of FIG. 23A, 23B, 23C, or 23D.

The user device 3 may obtain information about the washing machine 10 as described in operation S6 of FIG. 20 (S63).

The user device 3 may, in response to the obtaining of the information about the washing machine 10, transmit the information about the washing machine 10 to the filter apparatus 100 (S64).

According to various embodiments, the information about the washing machine 10 may include identification information about the washing machine 10.

The filter apparatus 100 may establish communication with the washing machine 10 based on the identification information of the washing machine 10 (S65).

For example, the filter apparatus 100 may, in response to the identification information of the washing machine 10 being received, disconnect communication with the user device 3 and establish communication with the washing machine 10.

According to the disclosure, information about the washing machine 10, which is to be a communication target of the filter apparatus 100, may be transmitted to the filter apparatus 100 through the user device 3, and thus the filter apparatus 100 may be prevented from communicating with other devices than the washing machine 10.

Figure 34:
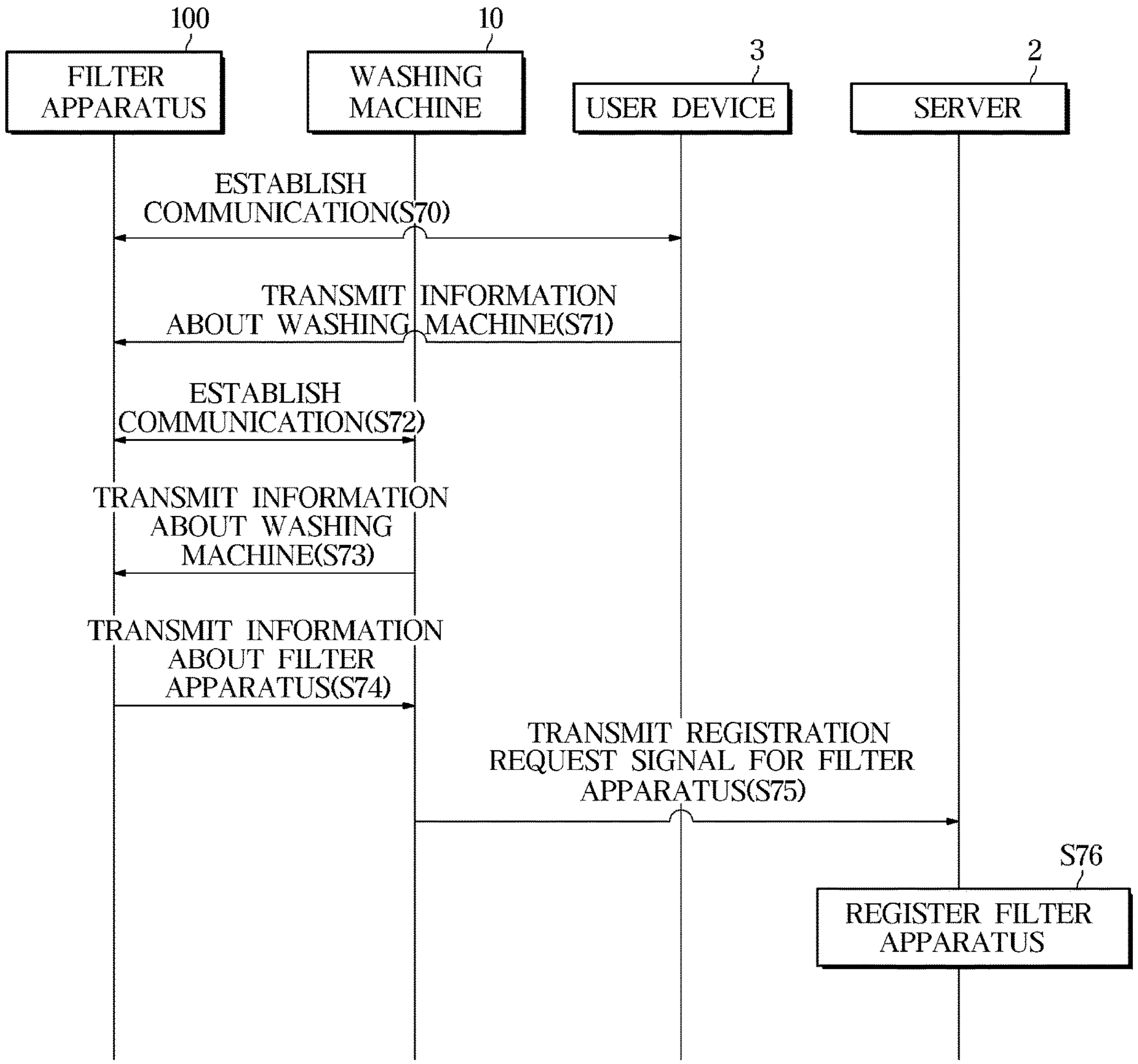
FIG. 34 is a flowchart showing an example of a method of registering a filter apparatus in a server according to an embodiment.

FIG. 34 is a flowchart showing an example of a method of registering a filter apparatus in a server according to an embodiment.

Referring to FIG. 34, communication between the filter apparatus 100 and the user device 3 may be established (S70).

The user device 3 may transmit information about the washing machine 10 to the filter apparatus 100 (S71).

The filter apparatus 100 may establish communication with the washing machine 10 based on the information about the washing machine 10 (S72).

Since some operations S70, S71, and S72 shown in FIG. 34 are the same as some operations S61, S62, and S64 described with reference to FIG. 33, descriptions thereof will be omitted.

The washing machine 10 having established communication with the filter apparatus 100 may transmit information about the washing machine 10 to the filter apparatus 100 (S73). The information transmitted from the washing machine 10 to the filter apparatus 100 may include operation information of the washing machine 10. The operation information of the washing machine 10 is different from identification information of the washing machine 10, and may include information about a progress of an operation of the washing machine 10.

For example, the operation information of the washing machine 10 may include information about an ongoing operation of the washing machine 10, information about whether the drain pump 73 of the washing machine 10 is operating, and the like.

The filter apparatus 100 having established communication with the washing machine 10 may transmit information about the filter apparatus 100 to the washing machine 10 (S74).

The information about the filter apparatus 100 may include identification information of the filter apparatus 100 and/or operation information of the filter apparatus 100.

The washing machine 10 may, in response to the identification information of the filter apparatus 100 being received from the filter apparatus 100, transmit a registration request signal for the filter apparatus 100 including the information about the filter apparatus 100 to the server 2. (S75).

The server 2 may, in response to a request for registration of the filter apparatus 100 being received from the washing machine 10, register the filter apparatus 100 (S76).

According to the disclosure, even when the filter apparatus 100 may not communicate with the server 2, the filter apparatus 100 may be registered in the server 2.

According to the disclosure, since the filter apparatus 100 may omit some communication modules, the production cost of the filter apparatus 100 may be reduced.

Figure 35:
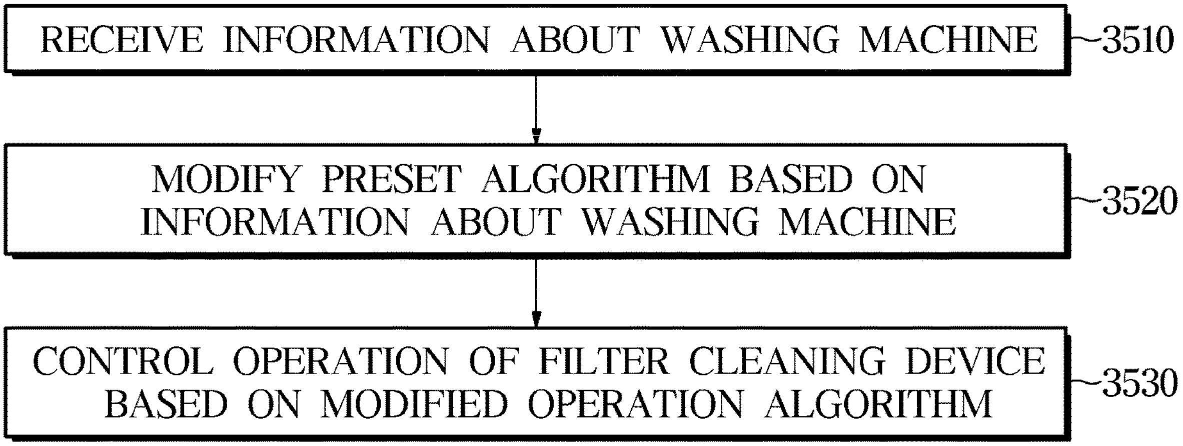
FIG. 35 is a flowchart showing an example of a method of controlling a filter apparatus according to an embodiment.

FIG. 35 is a flowchart showing an example of a method of controlling a filter apparatus according to an embodiment.

The filter apparatus 100 may receive information about the washing machine 10 (3510).

According to various embodiments, the filter apparatus 100 may directly receive the information about the washing machine 10 from the washing machine 10, or receive the information about the washing machine 10 from the server 2 through the user device 3, or may directly receive the information about the washing machine 10 from the user device 3.

The information about the washing machine 10 may include identification information about the washing machine 10.

The filter apparatus 100 may modify a predetermined operation algorithm based on the information about the washing machine 10 (3520). The filter apparatus 100 may control the operation of the filter cleaning device 130 based on the operation algorithm modified based on the information about the washing machine 10 (3530).

The operating of the filter cleaning device 130 based on the operation algorithm modified based on the information about the washing machine 10 may include adjusting an operation rate of the filter cleaning device 130.

The preset operation algorithm may be stored in the memory 191*b*.

For example, the operation algorithm of the filter apparatus 100 may be preset to, in response to draining of the washing machine 10 being detected, operate the filter cleaning device 130 according to a preset operation rate, and in response to a stop of draining of the washing machine 10 being detected, stop operating the filter cleaning device 130.

Meanwhile, the washing machine 10 may have a different drain algorithm depending on its model, and there is a need for an operation algorithm of the filter apparatus 100 optimized for various drain algorithms.

For example, in the washing machine 10 of the first model, the RPM of the drain pump 73 may be relatively low for two minutes after draining starts and the RPM of the drain pump may be relatively high for subsequent 3 minutes. In the washing machine 10 of the second model, the RPM of the drain pump 73 may be relatively high for two minutes after draining starts, and the RPM of the drain pump 73 may be relatively low for subsequent three minutes.

When the filter cleaning device 130 is operated with a uniform algorithm regardless of whether the filter apparatus 100 is connected to which one of the first model washing machine 10 and the second model washing machine 10, it may be difficult to maximize the filtering effect with minimal energy.

According to the disclosure, the filter apparatus 100 may receive information about the washing machine 10 connected thereto and modify the preset operation algorithm based on the information about the washing machine 10, and thus maximized filtering effect may be expected using minimal energy.

FIG. 36 illustrates an example of a lookup table for modifying an operation algorithm of a filter apparatus according to an embodiment.

Referring to FIG. 36, a lookup table for modifying an operation algorithm of the filter apparatus 100 may be stored in the server 2, the washing machine 10 and/or the filter apparatus 100.

According to various embodiments, when the lookup table for modifying the operation algorithm of the filter apparatus 100 is stored in the server 2 and/or the washing machine 10, information about the washing machine 10 transmitted to the filter apparatus 100 may include operation algorithm information of the filter apparatus 100 corresponding to the information about the washing machine 10.

On the other hand, when the look-up table for modifying the operation algorithm of the filter apparatus 100 is stored in the filter apparatus 100, the filter apparatus 100 may utilize operation algorithm information of the filter apparatus 100 corresponding to information about the washing machine 10.

The look-up table for modifying the operation algorithm of the filter apparatus 100 may include identification information (e.g., a model name or a serial number) of the washing machine 10 and an operation algorithm of the filter apparatus 100 corresponding to the identification information of the washing machine 10.

The operation algorithm of the filter apparatus 100 may include at least one of an operation start time of the filter cleaning device 130, an operation rate of the filter cleaning device 130, or an operation end time of the filter apparatus 100.

The operation start time of the filter cleaning device 130 may be set based on the drain start time of the washing machine 10.

The operation rate of the filter cleaning device 130 may be set based on the RPM of the drain pump 73 corresponding to the model of each of the plurality of washing machines 10. The operation rate of the filter cleaning device 130 refers to the on/off duty of the cleaning motor 136 of the filter cleaning device 130. For example, when the operation rate of the filter cleaning device 130 is 70%, the cleaning motor 136 may repeat on/off operations based on a time ratio of 7:3.

The operation end time of the filter cleaning device 130 may be set based on the drain end time of the washing machine 10.

For example, an operation algorithm of the filter cleaning device 130 corresponding to a washing machine model A1 in which the drain pump 73 is driven at the maximum RPM from the start of draining to the end of draining may be as follows.

[Operation Algorithm of the Filter Cleaning Device 130 Corresponding to Washing Machine Model A1]

A) Operation start time of the filter cleaning device 130: the point in time when an inflow of water is detected by the water supply sensor 182

B) Operation rate of the filter cleaning device 130: 100%

C) Operation end time of the filter cleaning device 130: the point in time when the stop of inflow of water is detected by the water supply sensor 182

As another example, an operation algorithm of the filter cleaning device 130 corresponding to a washing machine model A2, in which the RPM of the drain pump 73 is gradually increased after draining starts, and the RPM of the drain pump 73 is general, may be as follows.

[Operation Algorithm of the Filter Cleaning Device 130 Corresponding to Washing Machine Model A2]

A) Operation start time of the filter cleaning device 130: the point in time when an inflow of water is detected by the water supply sensor 182+ten seconds B) Operation rate of the filter cleaning device 130: 50%

C) Operation end time of the filter cleaning device 130: the point in time when the stop of an inflow of water is detected by the water supply sensor 182

As another example, an operation algorithm of the filter cleaning device 130 corresponding to a washing machine model A3, in which the RPM of the drain pump 73 is gradually increased after draining starts, but the RPM of the drain pump 73 is relatively small, and the operation of the drain pump 73 is stopped after five minutes from the start of draining regardless of the water level may be as follows.

[Operation Algorithm of the Filter Cleaning Device 130 Corresponding to Washing Machine Model A3]

A) Operation start time of the filter cleaning device 130: the point in time when an inflow of water is detected by the water supply sensor 182+five seconds B) Operation rate of the filter cleaning device 130: 30%

C) Operation end time of the filter cleaning device 130: the point in time when an inflow of water is detected by the water supply sensor 182+five minutes The operation algorithm of the filter cleaning device 130 is not limited to the above example, and may be set to an algorithm capable of performing the optimal filtering operation according to the draining operation profile of the washing machine 10.

The operation algorithm of the filter cleaning device 130 may be calculated by a machine-trained learning model or may be calculated through repeated experiments by an experimenter.

According to the disclosure, the filter apparatus 100 may perform an optimized operation according to identification information of the washing machine 10.

A method of managing a filter apparatus 100 disposed according to an embodiment of the disclosure may include: storing, by a server 2, information about the washing machine 10; registering, by the server 2, the filter apparatus 100 in a user account based on receiving a registration request signal for the filter apparatus 100; and transmitting, by the server 2, information about the washing machine 10 to the filter apparatus 100 based on the filter apparatus 100 being registered in the user account.

In addition, the method managing the filter apparatus 100 may include: establishing, by the washing machine 10, communication with the server 2; transmitting, by the washing machine 10, a registration request signal for the washing machine 10 including the information about the washing machine 10 to the server 2; and registering, by the server 2, the washing machine 10 in the user account.

In addition, the method of managing the filter apparatus 100 may further include: obtaining, by a user device 3, the information about the washing machine 10; and transmitting, by the user device 3, the information about the washing machine 10 to the server 2.

In addition, the method of managing the filter apparatus 100 may further include: transmitting, by the server 2, a signal requesting the information about the washing machine 10 to the user device 3 based on receiving the registration request signal for the filter apparatus 100; and providing, by the user device 3, a user interface for inputting the information about the washing machine 10 based on receiving the signal requesting the information about the washing machine 10.

In addition, the obtaining, by the user device 3, of the information about the washing machine 10 may include photographing, by the user device 3, a visual indicator representing the information about the washing machine 10 using a camera.

In addition, the obtaining, by the user device 3, of the information about the washing machine 10 may include receiving, by the user device 3, the information about the washing machine 10 from the washing machine 10 through a short-range communication module.

In addition, the method of managing the filter apparatus 100 may further include: the filter apparatus 100 operating in a soft access point (Soft AP) mode; receiving, by the filter apparatus 100, access point information for connecting to a wireless access point apparatus from a user device 3 while operating in the soft AP mode; establishing, by the filter apparatus 100, communication with the wireless access relay apparatus based on the access point information; and transmitting, by the filter apparatus 100, the registration request signal for the filter apparatus 100 to the server 2 based on the communication being established with the wireless access point apparatus.

In addition, the method of managing the filter apparatus 100 may further include modifying, by the filter apparatus 100, a preset operation algorithm based on the information about the washing machine 10.

In addition, the modifying of the preset operation algorithm based on the information about the washing machine 10 may include adjusting an operation rate of a filter cleaning device 130 based on the information about the washing machine 10.

In addition, the method of managing the filter apparatus 100 may further include, based on the server 2 receiving a drain start signal from the washing machine 10 registered in the user account, transmitting, by the server 2, the drain start signal to the filter apparatus 100 registered in the user account.

In addition, the method of managing the filter apparatus 100 may further include, based on the server receiving a drain detection signal from the filter apparatus 100 registered in the user account, transmitting, by the server 2, the drain detection signal to the washing machine 10 registered in the user account.

In addition, the method of managing the filter apparatus 100 may further include, based on the server receiving a filter clogging signal from the washing machine 10 registered in the user account, transmitting, by the server 2, the filter clogging signal to the filter apparatus 100 registered in the user account.

In addition, the method of managing the filter apparatus 100 may further include, based on the server 2 receiving a filter clogging signal from the filter apparatus 100 registered in the user account, transmitting, by the server 2, the filter clogging signal to the washing machine 100 registered in the user account.

A method of managing a filter apparatus 100 according to an embodiment of the disclosure includes: establishing, by the washing machine 10, communication with the filter apparatus 100 through a wired communication module or a short-distance communication module; receiving, by the washing machine 10, information about the filter apparatus 100 from the filter apparatus 100; transmitting, by the washing machine 10, information about the washing machine 10 to the filter apparatus 100; transmitting, by the washing machine 10, a registration request signal of the filter apparatus 100 including the information about the filter apparatus 100 to the server 2; and registering, by the server 2, the filter apparatus 100 in a user account based on receiving the registration request signal for the filter apparatus 100;

In addition, the method of managing a filter apparatus 100 may further include: based on the washing machine 10 receiving a filter clogging signal from the filter apparatus 100, transmitting, by the washing machine 10, the filter clogging signal to the server 2; and based on the server 2 receiving the filter clogging signal from the washing machine 10, transmitting, by the server 2, the filter clogging signal to a user device 3 corresponding to the user account.

In addition, the method of managing the filter apparatus 100 may further include: based on the washing machine 10 receiving a drain detection signal from the filter apparatus 100, transmitting, by the washing machine, the drain detection signal to the server 2; and based on the server 2 receiving the drain detection signal from the washing machine 10, transmitting, by the server 2, the drain detection signal to the user device 3 corresponding to the user account.

In addition, the method of managing the filter apparatus 100 may further include: transmitting, by the user device 3 corresponding to the user account, a control signal for controlling the filter apparatus 100 registered in the user account to the server 2; based on the server 2 receiving the control signal from the user device 3, transmitting, by the server 3, the control signal to the washing machine 10 registered in the user account; and based on the washing machine 10 receiving the control signal from the server 2, transmitting, by the washing machine 10, the control signal to the filter apparatus 100.

In addition, the method of managing the filter apparatus 100 may further include modifying, by the filter apparatus 100, a preset operation algorithm based on the information about the washing machine 10.

In addition, the modifying of the preset operation algorithm based on the information about the washing machine 10 may include adjusting an operation rate of a filter cleaning device 130 based on the information about the washing machine 10.

A filter apparatus 100 according to an embodiment of the disclosure may include: a housing 101; a filter case 110 provided inside the housing 101 and having an inlet 112*a* and an outlet 111*b*; a filter 120 detachably mounted to the filter case 110; a filter cleaning device 130 including a cleaning member 131 configured to rotate while in contact with a surface of the filter 120 on which foreign substances are filtered and a cleaning motor 136 configured to rotate the cleaning member 131; and circuitry 190*a* located between the housing 101 and the filter case 110 and including a controller 191 and a communicator 199, wherein the controller 191 is configured to receive Information about a washing machine 10 from external devices 2 and 3 through the communicator 199, and control an operation of the filter cleaning device 130 based on the information about the washing machine 10.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

In addition, the computer-readable recording medium may be provided in the form of a non-transitory storage medium. Here, when a storage medium is referred to as "non-transitory," it may be understood that the storage medium is tangible and does not include a signal (electromagnetic waves), but rather that data is semi-permanently or temporarily stored in the storage medium. For example, a "non-temporary storage medium" may include a buffer in which data is temporarily stored.

According to an embodiment, the methods according to the various embodiments disclosed herein may be provided in a computer program product. The computer program product may be traded between a seller and a buyer as a product. The computer program product may be distributed in the form of a machine-readable storage medium (e.g., compact disc read only memory (CD-ROM)), or may be distributed through an application store (e.g., Play Store™) online. In the case of online distribution, at least a portion of the computer program product may be stored at least semi-permanently or may be temporarily generated in a storage medium, such as a memory of a server of a manufacturer, a server of an application store, or a relay server.

Although embodiments of the disclosure have been described with reference to the accompanying drawings, those skilled in the art will appreciate that these inventive concepts may be embodied in different forms without departing from the scope and spirit of the disclosure, and should not be construed as limited to the embodiments set forth herein.

What is claimed is:

1. A method of managing a filter apparatus positionable outside a washing machine and connectable to a drain device of the washing machine to filter water discharged from the washing machine, the method comprising:

storing, by a server, information of the washing machine, the information being at least one of a model name of the washing machine and an identification number of the washing machine;

registering, by the server, information of the filter apparatus in association with a user account based on receiving a registration request signal having identification information, the identification information being at least one of a model name of the filter apparatus and an identification number of the filter apparatus; and transmitting, by the server, the information of the washing machine to the filter apparatus based on the filter apparatus being registered in association with the user account such that an operation algorithm of the filter apparatus is set based on the information of the washing machine.

2. The method of claim 1, further comprising:

establishing, by the washing machine, a communication with the server;

transmitting, by the washing machine, a registration request signal to register the washing machine including the information of the washing machine to the server; and registering, by the server, the washing machine in association with the user account thereby linking the information of the washing machine and information of the filter apparatus with each other through the user account.

3. The method of claim 1, further comprising:

obtaining, by a user device, the information of the washing machine; and transmitting, by the user device, the information of the washing machine to the server.

4. The method of claim 3, further comprising:

transmitting, by the server, a signal requesting the information of the washing machine to the user device based on the registration request signal to register the filter apparatus being received; and providing, by the user device, a user interface for inputting the information of the washing machine based on the signal requesting the information of the washing machine being received.

5. The method of claim 3, wherein the obtaining, by the user device, the information of the washing machine includes photographing, by the user device, a visual indicator representing the information of the washing machine using a camera.

6. The method of claim 3, wherein the obtaining, by the user device, the information of the washing machine includes:

receiving, by the user device, the information of the washing machine from the washing machine through a short-range communication module.

7. The method of claim 1, further comprising:

the filter apparatus operating in a soft access point mode;

receiving, by the filter apparatus, access point information to connect the filter apparatus to a wireless access point apparatus from a user device while filter apparatus is operating in the soft access point mode;

establishing, by the filter apparatus, a communication with a wireless access relay apparatus based on the access point information received; and transmitting, by the filter apparatus, the registration request signal to register the filter apparatus to the server based on the communication being established with the wireless access point apparatus.

8. The method of claim 1, further comprising:

modifying, by the filter apparatus, a preset operation algorithm based on the information of the washing machine.

9. The method of claim 8, wherein the modifying of the preset operation algorithm based on the information of the washing machine includes:

adjusting an operation rate of a filter cleaning device based on the information of the washing machine.

10. The method of claim 1, further comprising:

based on the server receiving a drain start signal from the washing machine registered in association with the user account, transmitting, by the server, the drain start signal to the filter apparatus registered in association with the user account.

11. The method of claim 1, further comprising:

based on the server receiving a drain detection signal from the filter apparatus registered in association with the user account, transmitting, by the server, the drain detection signal to the washing machine registered in association with the user account.

12. The method of claim 1, further comprising:

based on the server receiving a filter clogging signal from the washing machine registered in association with the user account, transmitting, by the server, the filter clogging signal to the filter apparatus registered in association with the user account.

13. The method of claim 1, further comprising:

based on the server receiving a filter clogging signal from the filter apparatus registered in association with the user account, transmitting, by the server, the filter clogging signal to the washing machine registered in association with the user account.

14. A method of managing a filter apparatus positionable outside a washing machine and connectable to a drain device of the washing machine to filter water discharged from the washing machine, the method comprising:

establishing a communication between the filter apparatus and the washing machine through a wired communication module or a short-distance communication module;

receiving, by the washing machine, information of the filter apparatus from the filter apparatus through the communication established with the filter apparatus by the washing machine, the information of the filter apparatus including identification information having at least one of a model name of the filter apparatus and an identification number of the filter apparatus;

transmitting, by the washing machine, information of the washing machine to the filter apparatus, the information of the washing machine being at least one of a model name of the washing machine and an identification number of the washing machine;

transmitting, by the washing machine, a registration request signal to register the filter apparatus including the information of the filter apparatus to a server; and registering, by the server, the filter apparatus in association with a user account based on receiving the registration request signal to register the filter apparatus such that an operation algorithm of the filter apparatus is set based on the information of the washing machine.

15. The method of claim 14, further comprising:

based on the washing machine receiving a filter clogging signal from the filter apparatus, transmitting, by the washing machine, the filter clogging signal to the server; and based on the server receiving the filter clogging signal from the washing machine, transmitting, by the server, the filter clogging signal to a user device associated with the user account.

* * * * *